United States Patent [19]

Spilo et al.

[11] 3,886,496

[45] May 27, 1975

[54] TRAFFIC CONTROLLER EMPLOYING A DIGITAL COMPUTER

[75] Inventors: Richard A. Spilo, Davenport, Iowa; Frank W. Hill, Moline; Larry O. Hoffman, Rockford, both of Ill.

[73] Assignee: Gulf & Western Industries, Inc., New York, N.Y.

[22] Filed: Feb. 20, 1974

[21] Appl. No.: 444,122

Related U.S. Application Data

[63] Continuation of Ser. No. 289,312, Sept. 14, 1972, abandoned.

[52] U.S. Cl. .............................. 340/41 R; 340/41 R

[51] Int. Cl. .............................. G08g 1/00

[58] Field of Search .............................. 340/41 R

[56] References Cited

UNITED STATES PATENTS 3,810,084 5/1974 Hoyt .............................. 340/41 R

*Primary Examiner*—Thomas B. Habecker
*Attorney, Agent, or Firm*—Meyer, Tilberry & Body

[57] ABSTRACT

A traffic controller employing several circuit means for providing information to and from a digital compupter for controlling signalization at an intersection including two or more movements of traffic. A first of the circuit means includes circuits for inputting manual commands to the computer and for displaying the existence of such commands and others on a board associated with each of the movements of traffic. A second circuit means is provided for creating a timing function for use in controlling the signalization, and third circuit means is provided for displaying and changing the time duration of several functions in each of the separate movements of traffic.

45 Claims, 45 Drawing Figures

| EXECUTIVE PROGRAM | | |
|---|---|---|
| ADDRESS | FUNCTION | FUNCTION |
| 300 | | ORG .EXEC, 0 |
| | | START |
| 300 | C32E | JPC INIT INITIALIZE SYSTEM |
| | | RESET "INITIALIZE SYSTEM" FF |
| 302 | 58BE | X1 SER XYZ |
| 304 | 511D | EXC 0,29 |
| | | UPDATE PANEL |
| 306 | E8B0 | JMC .PAN |
| | | LOOK FOR INTERRUPTION FROM TELETYPE |
| 308 | 4A04 | X3 SRN |
| | | MONITOR REAL TIME CLOCK |
| 30C | 5017 | SEN 0,23 |
| 30E | 4B02 | SSS |
| 310 | C308 | JPC X3 WAIT FOR 1/10 SECOND |
| 312 | 5137 | EXC 1,23 ACKNOWLEDGE CLOCK |
| | | UPDATE INPUTS FROM SCAN DETECTOR |
| 314 | E380 | JMC .SCD |
| 316 | ED0C | JMC .OMS JUMP TO OMIT SKIP OPTION |
| | | UPDATE PHASE TIMINGS |
| 318 | E4D0 | JMC .PUP |
| | | CHECK STOP TIME INPUT (BIT 0 = 0 TO RUN) |
| 31A | 5014 | SEN 0,20 |
| 31C | 4A02 | SSN SKIP IF NO STOP TIME |
| 31E | C326 | JPC X2 JUMP TO EFFECT STOP TIME |
| 320 | EC40 | JMC .MAN JUMP TO MANUAL OPTION |
| | | SELECT A NEW PHASE (S) |
| 322 | EAC0 | JMC .PSL |
| | | ADVANCE FROM RED |
| 324 | E6E0 | JMC .AFR |
| | | UPDATE DISPLAY |
| 326 | E760 | X2 JMC .DUP |
| | | UPDATE PHASE STATUS DISPLAY |
| 328 | E7B0 | JMC .PO |
| 32A | C302 | JPC X1 CONTINUE IN EXECUTIVE PROGRAM |

FIG. 2E

FIG. 2F
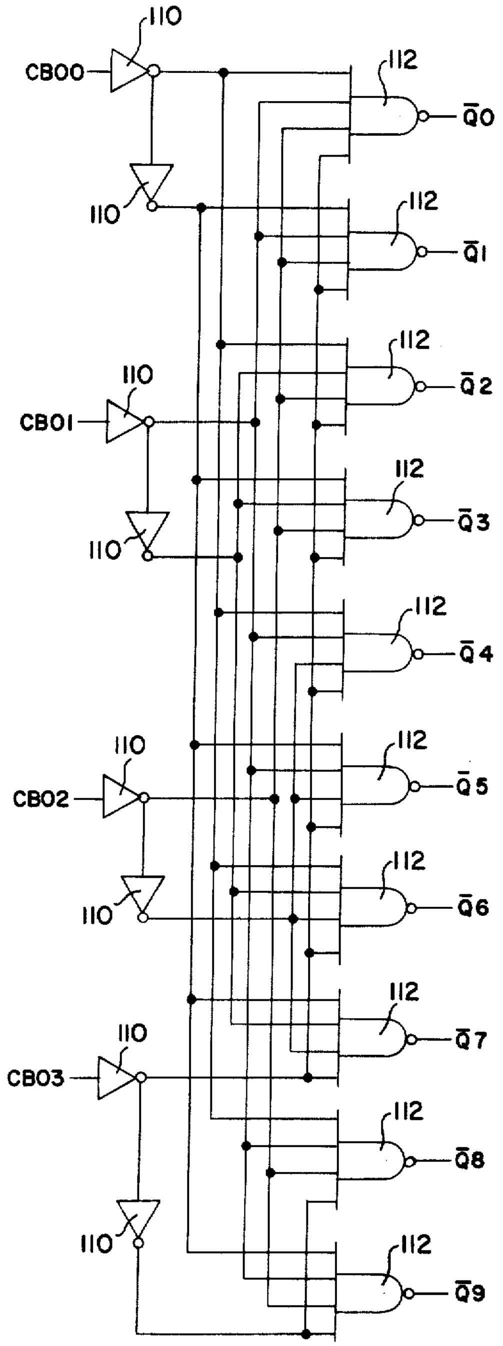
FIG. 2G
| INPUTS (CB) | | | | OUTPUTS (Q̄) | | | | | | | | | |
|---|---|---|---|---|---|---|---|---|---|---|---|---|---|
| 00 | 01 | 02 | 03 | 0 | 1 | 2 | 3 | 4 | 5 | 6 | 7 | 8 | 9 |
| L | L | L | L | L | H | H | H | H | H | H | H | H | H |
| L | L | L | H | H | L | H | H | H | H | H | H | H | H |
| L | L | H | L | H | H | L | H | H | H | H | H | H | H |
| L | L | H | H | H | H | H | L | H | H | H | H | H | H |
| L | H | L | L | H | H | H | H | L | H | H | H | H | H |
| L | H | L | H | H | H | H | H | H | L | H | H | H | H |
| L | H | H | L | H | H | H | H | H | H | L | H | H | H |
| L | H | H | H | H | H | H | H | H | H | H | L | H | H |
| H | L | L | L | H | H | H | H | H | H | H | H | L | H |
| H | L | L | H | H | H | H | H | H | H | H | H | H | L |
| H | L | H | L | H | H | H | H | H | H | H | H | H | H |
INPUT CODES BEYOND THIS POINT
CAUSE NO OUTPUT CHANGE
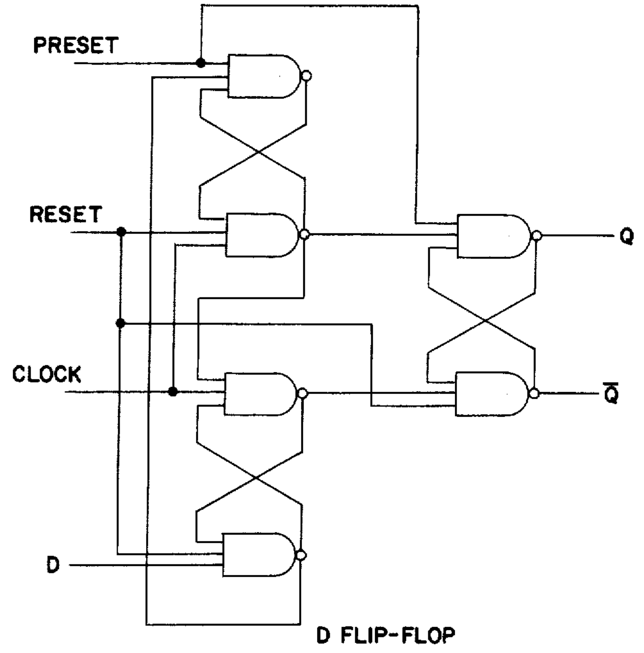
FIG. 2H FIG. 2I
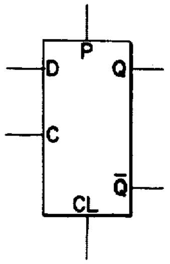
FIG. 2J
| tn | tn + 1 | |
|---|---|---|
| INPUT D | OUTPUT Q | OUTPUT $\bar{Q}$ |
| L | L | H |
| H | H | L |
tn = BIT STATE BEFORE CLOCK PULSE
tn+1 = BIT STATE AFTER CLOCK PULSE
PRESET LOW SETS Q TO HIGH
RESET LOW SETS Q TO LOW
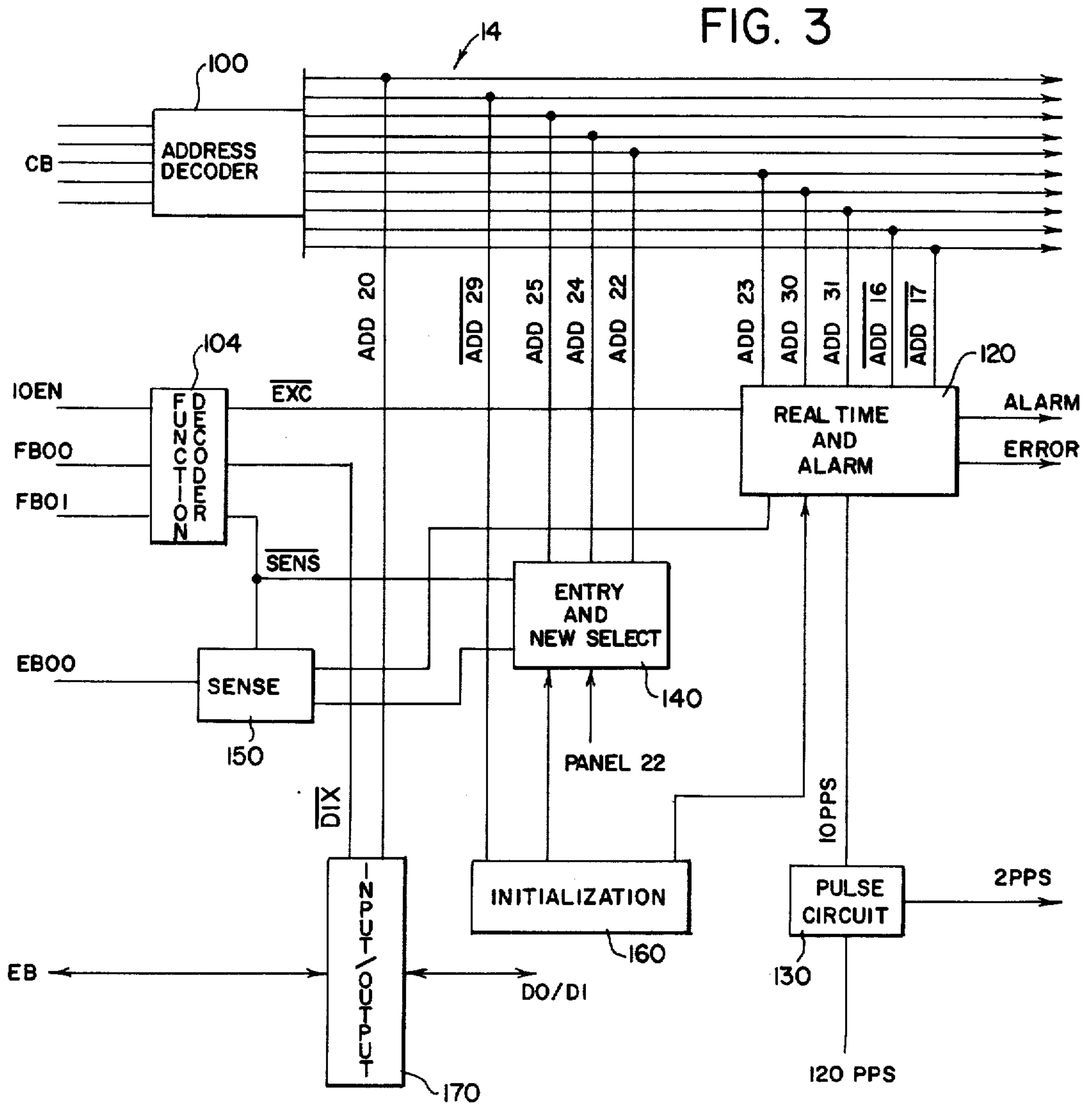
FIG. 3

FIG. 5

210 212 214 216

| CB INPUTS 04 | 03 | 02 | 01 | 00 | ADD | FBOO=H, FBOI, IOEN, IOST=L DATA INPUT (DI) | FBOO, FBOI, IOEN, IOST=L DATA OUTPUT (DO) | ADD | FBOO=L, FBOI=H, IOEN, IOST=L EXTERNAL CONTROL (EXC) | FBOO, FBOI=H, IOEN, IOST=L SENSE (SEN) | ADD |
|---|---|---|---|---|---|---|---|---|---|---|---|
| H | H | H | H | H | 0 | RESERVED (TTY) | RESERVED (TTY) | 0 | | | 0 |
| H | H | H | H | L | 1 | Ø1 MODULE SWITCHES | Ø1 MODULE INDICATOR LAMPS | 1 | | | 1 |
| H | H | H | L | H | 2 | Ø2 | Ø2 | 2 | | | 2 |
| H | H | H | L | L | 3 | Ø3 | Ø3 | 3 | | | 3 |
| H | H | L | H | H | 4 | Ø4 | Ø4 | 4 | | | 4 |
| H | H | L | H | L | 5 | Ø5 | Ø5 | 5 | | | 5 |
| H | H | L | L | H | 6 | Ø6 | Ø6 | 6 | | | 6 |
| H | H | L | L | L | 7 | Ø7 | Ø7 | 7 | | | 7 |
| H | L | H | H | H | 8 | Ø8 | Ø8 | 8 | | | 8 |
| H | L | H | H | L | 9 | Ø9 | Ø9 | 9 | | | 9 |
| H | L | H | L | H | 10 | Ø10 | Ø10 | 10 | | | 10 |
| H | L | H | L | L | 11 | Ø11 | Ø11 | 11 | | | 11 |
| H | L | L | H | H | 12 | Ø12 | Ø12 | 12 | | | 12 |
| H | L | L | H | L | 13 | Ø13 | Ø13 | 13 | | | 13 |
| H | L | L | L | H | 14 | Ø14 MODULE SWITCHES | Ø14 MODULE INDICATOR LAMPS | 14 | | | 14 |
| H | L | L | L | L | 15 | FEATURE-PED, DEMAND, GAP, VAR INIT, SPECIAL | LAMPS 4 THRU 7 | 15 | | | 15 |
| L | H | H | H | H | 16 | | RING STATUS NO. 1 | 16 | SET ERROR MONITOR TRIP CKT | | 16 |
| L | H | H | H | L | 17 | | RING STATUS NO. 2 | 17 | RESET ERROR MONITOR TRIP CKT | | 17 |
| L | H | H | L | H | 18 | PHASE AND FUNCTION SWITCHES | RING STATUS NO. 3 | 18 | EXC-IOST SET MAX | | 18 |
| L | H | H | L | L | 19 | TIME UNITS & TENS | NEW DATA-PREPARE FOR NEW DATA STROBE | 19 | EXC-IOST CLEAR MAX | Q HUNDREDS FF | 19 |
| L | H | L | H | H | 20 | GENERAL | LOAD SWITCHES 1 THRU 8 | 20 | RESET DECIMAL POINT | DI-OO DATA IN & STOP TIME IND. | 20 |
| L | H | L | H | L | 21 | DETECTORS 1 THRU 8 | 9 THRU 16 | 21 | READOUT BLANKING | | 21 |
| L | H | L | L | H | 22 | 9 THRU 16 | 17 THRU 24 | 22 | RESET NEW-SELECT FF | NEW SELECT | 22 |
| L | H | L | L | L | 23 | 17 THRU 24 | 25 THRU 32 | 23 | REAL TIME CLOCK RESET | REAL TIME CLOCK | 23 |
| L | L | H | H | H | 24 | 25 THRU 32 | 33 THRU 40 | 24 | RESET ENTER TIME FF | ENTER TIME | 24 |
| L | L | H | H | L | 25 | 33 THRU 40 | 41 THRU 48 | 25 | RESET ENTER FEATURE FF | ENTER FEATURE | 25 |
| L | L | H | L | H | 26 | 41 THRU 48 | 49 THRU 56 | 26 | | | 26 |
| L | L | H | L | L | 27 | 49 THRU 56 | 57 THRU 64 | 27 | | | 27 |
| L | L | L | H | H | 28 | 57 THRU 64 | 65 THRU 72 | 28 | | | 28 |
| L | L | L | H | L | 29 | 65 THRU 72 | 73 THRU 80 | 29 | INITIALIZE | | 29 |
| L | L | L | L | H | 30 | 73 THRU 80 | 81 THRU 88 | 30 | SET ERROR MONITOR-RESET CKT | | 30 |
| L | L | L | L | L | 31 | DETECTORS 81 THRU 88 | LOAD SWITCHES 89 THRU 96 | 31 | RESET ERROR MONITOR-RESET CKT | | 31 |

| FUNCTION DECODER | | | | | |
|---|---|---|---|---|---|
| FB | | OUTPUT | | | |
| 01 | 00 | $\overline{DOX}$ | $\overline{DIX}$ | $\overline{EXC}$ | $\overline{SEN}$ |
| L | L | L | H | H | H |
| L | H | H | L | H | H |
| H | L | H | H | L | H |
| H | H | H | H | H | L |
| IEON = LOW | | | | | |

ENTER TIME CIRCUITS

ENTER FEATURE CIRCUITS

NEW SELECT CIRCUITS

TRAFFIC CONTROLLER EMPLOYING A DIGITAL COMPUTER

This is a continuation of application Ser. No. 289,312 filed Sept. 14, 1972.

This invention relates to the art of controlling signalization at a traffic intersection and more particularly to a controller for such purpose.

1. FIELD OF INVENTION

The invention is particularly applicable for controlling signalization of a full-actuated intersection including at least four movements of traffic through the intersection, and it will be described with particular reference thereto; however, it should be appreciated that the invention has much broader applications and may be used in other types of traffic control installations such as semi-actuated, demand, pretimed, and coordinated, to mention a few. In addition, traffic movements may be greater than two at a single intersection and a single ring, dual ring or triple ring may be incorporated into the controlling function. Of course, when multiple rings are used, there can be multiple entry into the various rings as is known in the traffic control art.

2. DESCRIPTION OF PRIOR ART

Controlling the traffic at intersections, especially intersections having several movements of traffic therethrough, has been accomplished by several types of traffic controllers. Basically, a traffic controller allocates signal durations to the various traffic movements in a selected sequence so that each movement can have access through the intersection. Ideally, access through the intersection by the several movements should be controlled in a manner to handle efficiently the traffic load at the intersection and prevent undue congestion. At first, traffic controllers for multiple movement intersections were generally pretimed so that the signalization followed a preset pattern giving access through the intersection to the various phases in a mechanically controlled pattern. Such pattern had to be set for a fictitious traffic condition; therefore, often congestion would occur. These units were then modified so that they would change their timing function at various periods when unusual traffic conditions normally occurred. Thereafter, with the advent of traffic detectors, these traffic controllers were modified to be semi-actuated or fully actuated so that the signalization to the several movements of traffic would have a relationship to the actual traffic demands at any given time. This type of equipment became quite complex and was somewhat inflexible in its application because it was primarily a modification of the pretimed traffic controller to be varied by electrical circuits in accordance with traffic actuations.

Thereafter, the pretimed type of traffic controller was generally superseded at complex intersections by analog controllers which could be pretimed, semi-actuated, or fully actuated. These analog controllers included analog circuits for receiving conditions of traffic. The signalization was then controlled in accordance with the particular inputted information. Such traffic controllers have been quite successful and are still widely used, especially at complicated intersections. However, the analog circuits of these controllers are factory installed, and therefore they limit the control possible by a traffic engineer at the intersection. Also, the analog type of controller can respond to only certain variables which are constructed into the several hard wired, thus inflexible, analog circuits involved in the controller. Because of the cost of the analog circuits, such a system constructed to provide the large number or circuits for controlling many parameters is generally prohibitive. The same was true of hard wired digital controllers.

SUMMARY OF INVENTION

The present invention relates to a traffic controller which overcomes the difficulties of the previous pretimed, modified pretimed, analog and hard wired digital controllers. Basically, the present invention relates to certain control circuits to input information to and from a standard digital computer, of the type known as a mini computer, so that the signalization at an intersection can be controlled by the output of the mini computer, which is a shelf item. In this manner, the timing functions, changes in the control signalization, and responses to variations in traffic conditions can be handled conveniently and efficiently with a very small digital responsive controller.

In accordance with the present invention, there is provided a traffic controller for controlling traffic at a multiple movement intersection which controller incorporates several input and output circuits for directing information to and from a digital computer. One of the circuit means includes a phase module for each of the various traffic movements within the intersection. Each of these modules includes circuits for inputting information to the computer and for displaying information indicative of computer conditions. This module circuitry includes the coding means for identifying the particular traffic movement for which information is being inputted to the computer and displayed by the module and logic circuits for allowing two way movement to and from the module unit for each phase or traffic movement.

In accordance with the invention, there is provided another circuit means to assure that the computer is cycled in a known time and means for allowing this known time to be used in the timing functions of the controller.

In accordance with another aspect of the invention, there is provided an initialization circuit for starting the digital computer, which initialization circuit includes circuit means for setting properly the flip-flops in the control circuitry at the start of the controller operation.

In accordance with another aspect of the invention, there is provided circuitry for selectively displaying each of the various timing functions for each phase of traffic movement through the intersection and circuit means for manually changing the displayed timing function for future use in the controller. This circuit involves means for displaying a timing function at a particular location in the computer memory, means for changing the display, and means for then inserting the new timing function back into the computer memory for future use.

The primary object of the present invention is the provision of a traffic controller for a multiple traffic movement intersection, which controller employs a standard digital computer and circuits for inputting the information to and from the computer for controlling the signalization of the intersection.

Another object of the present invention is the provision of a controller for a multiple traffic movement intersection, which controller includes circuitry associated with a digital computer for displaying a timing function within a computer memory and for changing this timing function manually for future use in the controller.

Another object of the present invention is the provision of a controller for controlling a multiple movement traffic intersection, which controller includes circuitry associated with a digital computer for inputting the information to and from the computer upon decoded command from the computer.

BRIEF DESCRIPTION OF VIEWS OF THE DRAWINGS

These and other objects and advantages will become apparent from the following description taken together with the accompanying drawings in which:

FIG. 2E is a simplified executive program for the computer, schematically represented in FIG. 2 and used with the other circuitry associated with the controller represented in FIG. 2;

FIG. 2F is a schematic representation of the logic circuit for decoding the address to be used in the circuits associated with the digital computer, as illustrated in FIG. 2;

FIG. 2G is a basic truth table for the logic circuit shown in FIG. 2F;

FIG. 2H is a logic diagram for a D flip-flop as used in the various circuits of the present invention;

FIG. 2I is a block diagram of the flip-flop shown in FIG. 2H;

FIG. 2J is a basic truth table for the flip-flop shown in FIGS. 2H, 2I;

FIG. 3 is a block diagram, simplified drawing of the circuits contained in the decoder and control unit shown in FIG. 2;

FIG. 5 is a chart showing the various addresses used in the external circuits and the functions created thereby for four separate function codings from the computer;

FIGS. 20A–C are schematic logic diagrams showing various conditions of one unit illustrated in FIG. 4A; and, FIG. 21 is a block diagram illustrating schematically the time display and changing function performed in accordance with the present invention.

DESCRIPTION OF PREFERRED EMBODIMENT

Figure 1:
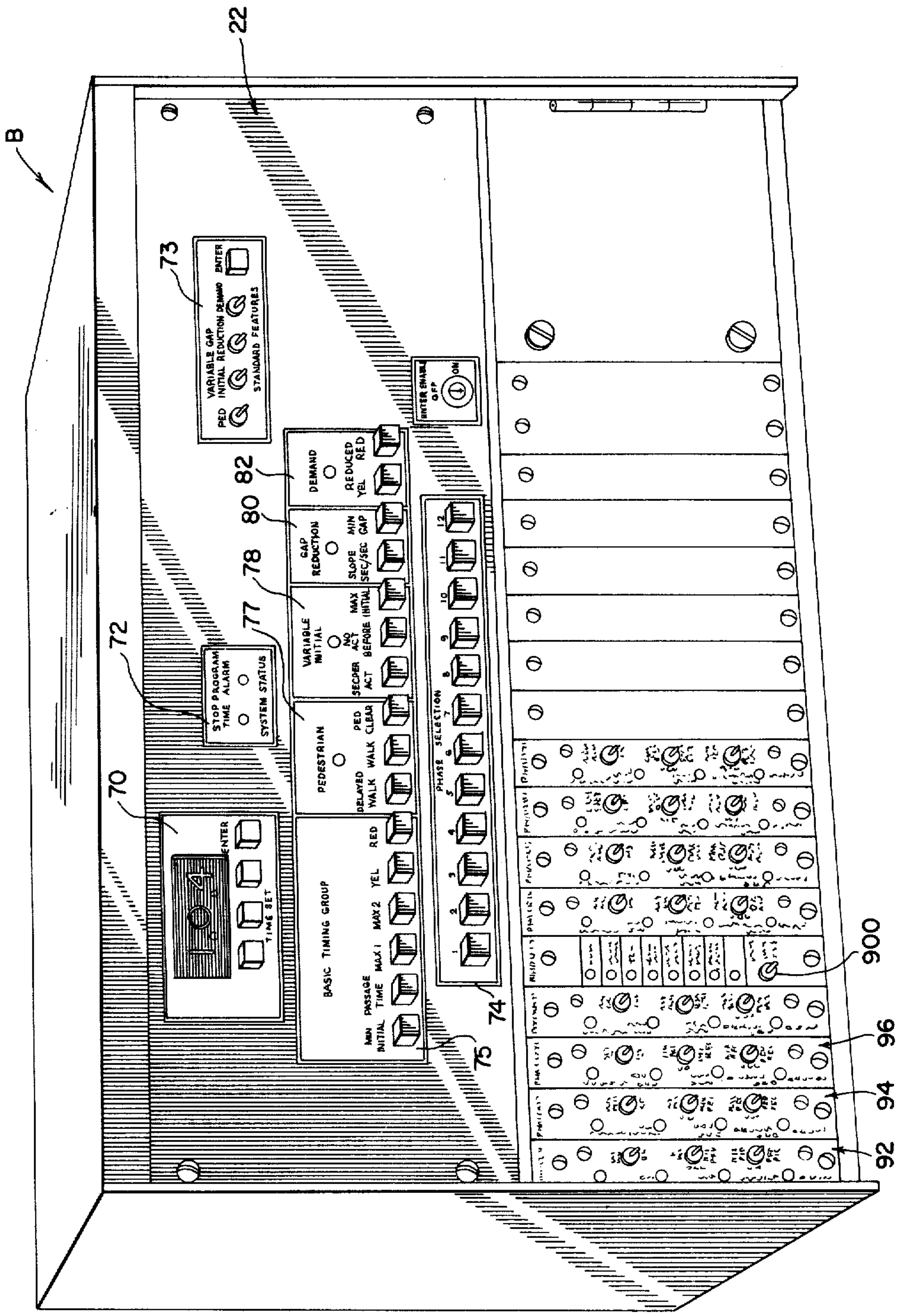
FIG. 1 is a pictorial view showing a controller of the type constructed in accordance with the present invention.
Figure 1A:
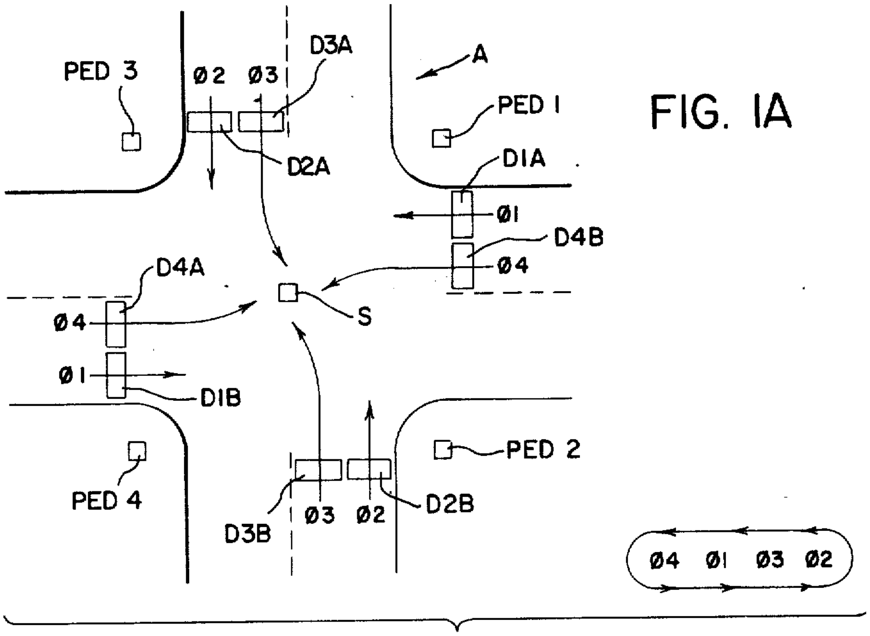
FIG. 1A is a schematic drawing of an intersection being controlled in accordance with the present invention.

Referring now to the drawings wherein the showings are for the purpose of illustrating a preferred embodiment of the invention only, and not for the purpose of limiting same, FIG. 1 shows a controller employing the present invention. FIG. 1A shows a simplified traffic intersection A to be controlled by the controller shown in FIG. 1 and having four traffic movements designated as phases 1, 2, 3 and 4. Each of these phases is to be controlled separately, and in accordance with actuation of detectors D1A, D1B, D2A, D2B, D3A, D3B, D4A and D4B. These detectors may be treadles, looped detectors or other well known vehicle detector devices for sensing the existence and/or passage of a vehicle across or into the monitored area of the detectors. The illustrated intersection includes four phases which can be full-actuated. Also, there are provided pedestrian call actuators PED1, PED2, PED3, amd PED4. It is appreciated that the present invention can be used with more or less phases than illustrated in the representative intersection A. In addition, the invention can be used in the full-actuation, semi-actuation, demand, pretimed, coordinated or any other appropriately selected mode of operation well known in the traffic control field. FIG. 1A also illustrates a ring indicating the progression of the cycle from phase to phase at the intersection A. As will be appreciated later, this ring may be modified. In addition, it is possible to employ more than a single ring at an intersection with multiple entry into the rings as long as conflicting traffic movements are prohibited. This concept is well known in the traffic control art.

GENERAL DESCRIPTION OF CONTROLLER

Figure 2:
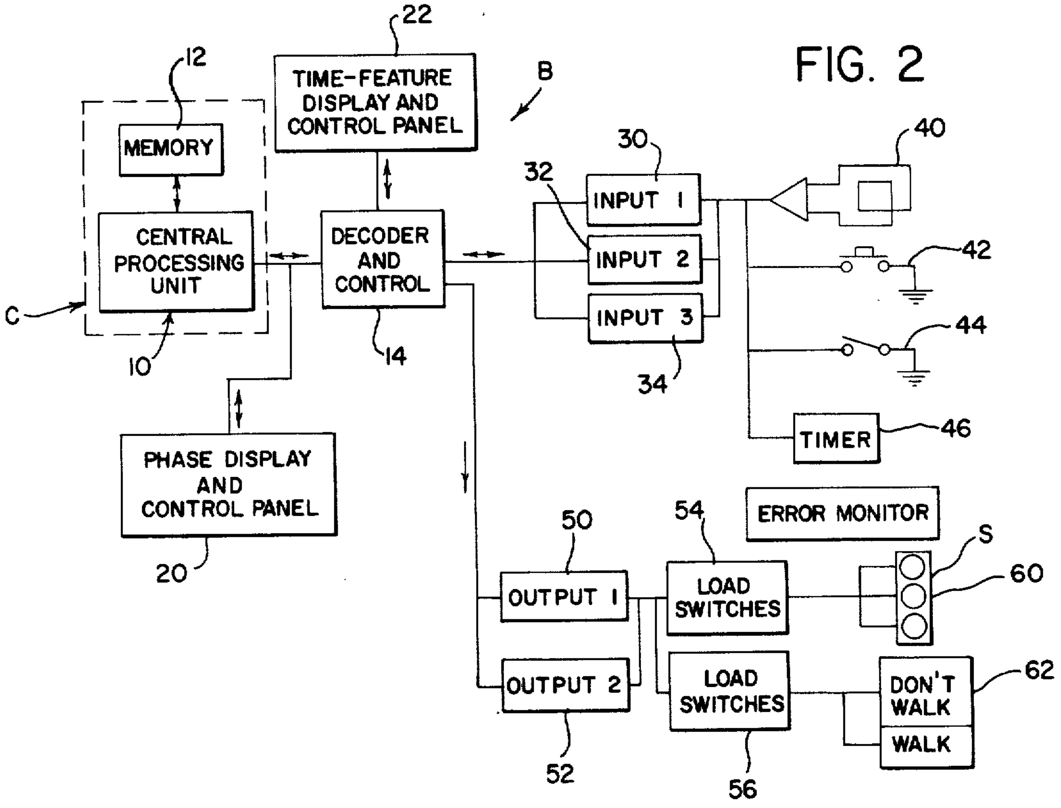
FIG. 2 is a block diagram view showing schematically the arrangement of the preferred embodiment of the present invention.

Referring now to FIG. 2, there is provided a block diagram representation of several elements employed in a traffic controller B for controlling the actuation of signal S in the intersection A, as schematically illustrated in FIG. 1A. A digital computer C including a central processing unit 10 and an appropriate memory 12 provides information and command to and from a decoder and control unit 14. Digital instructions from the central processing unit 10 are decoded by unit 14 programmed control of the signal S in accordance with input information directed to the central processing unit 10 from the decoder and control unit 14. In accordance with the invention, the central processing unit 10 is also interconnected with the phase display and control panel 20 for feeding certain information to the computer from this control panel and for reading the instantaneous condition of the central processing unit 10, so that this panel can display certain characteristics of the controller B at various instances. The phase display and control panel 20 is primarily a monitoring unit although it does have the capabilities of inserting certain limited information into the computer for processing and for control of the signal S. Connected with the decoder and control unit 14 is a time-feature display and control panel 22. This control panel forms an important aspect of the present invention and allows display of the time setting for various features of the controller B and provides unique circuits for changing the several timing functions and other functions without requiring interruption of the controller operation.

Decoder and control unit 14 receives inputs from input boards 30, 32, 34 connected to appropriate input devices such as a loop detector 40, a pedestrian button 42, a detector 44 or a timer 46. In addition, other appropriate input arrangements could be used for inputting information to the decoder and control unit 14 for assistance in the total operation of the controller B. Also, output boards 50, 52 are connected to appropriate load switches 54, 56 for controlling the signals 60, 62. Signal 60 may be the signal S of FIG. 1A and signal 62 may be a walk, don't walk signal for use at the intersection A as shown in FIG. 1A.

FIG. 2 clearly illustrates the general arrangement of the preferred embodiment of the present invention wherein a digital computer C including a central processing unit 10 having the common registers and controlling equipment is used with memory 12 to control traffic signals at intersection A. The invention relates to the circuitry and components external of the computer which allows the digital computer to perform necessary traffic controlling functions. Being more specific, certain aspects of the invention relate to the novel circuitry in the decoder and control unit 14, the phase display and control panel 20, and the time-feature display and control panel 22. These components together with the other external components which are adapted to be connected with the input-output circuits of the computer will be hereinafter described in detail. It should be appreciated that the memory 12 can be programmed to include the controlling function of controller B together with the timing functions and other necessary information to perform the desired input-output functions for use at the intersection A. This feature will also be described in more detail in the later description of the controller B.

GENERAL DESCRIPTION OF THE TIME-FEATURE DISPLAY AND CONTROL PANEL

Figure 2A:
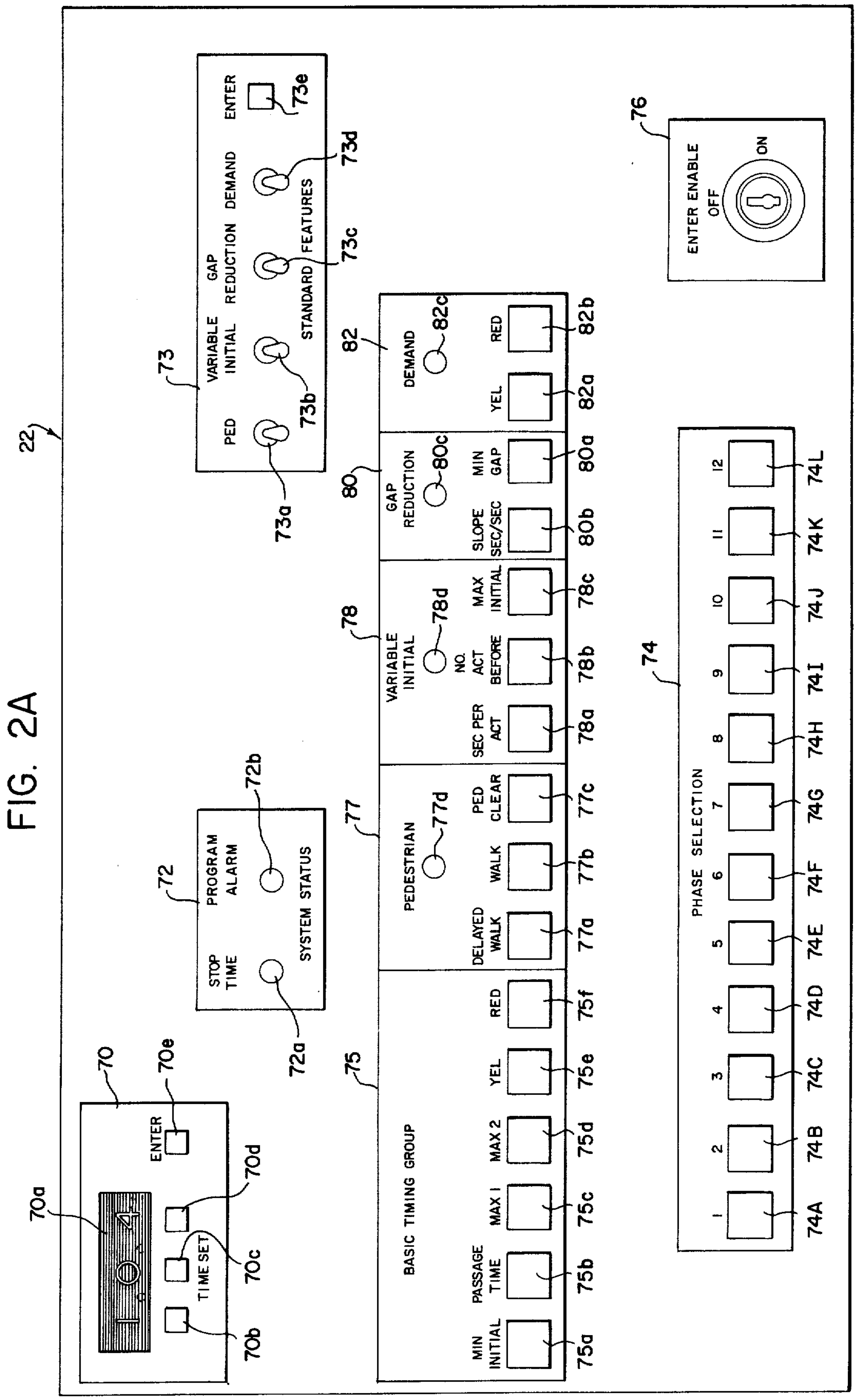
FIG. 2A is a schematic view illustrating the time-feature display and control panel of FIG. 2.

Referring now to FIG. 2A, time-feature display and control panel 22 includes certain switches and lights. The circular configurations represent lights while the generally square elements represent push button switches for control functions to be described later. Also on this display panel there are certain toggle switches having function which will also be explained in connection with both the panel 22 and the internal circuitry activated by the switches.

The subpanel 70 is employed for checking the time set within memory 12 and for externally changing this memory time setting when desired. Window 70*a* displays the particular time, or ratio or count, set into the memory 12 for a particular phase and function of the controller B. After this memory readout is displayed within window 70*a*, push buttons 70*b*, 70*c*, and 70*d* may be depressed to change the setting of the respective displayed digits. After the indicated time or counts or ratio has been changed, button 70*e* is depressed to enter the new set value into the memory 12.

Referring now to the system status subpanel 72, it includes two lights 72*a*, 72*b*. The first is a stop time light, and the second is a program alarm light. The stop time light 72*a* is actuated when the controller B is being timed by some external device such as timer 46 shown in FIG. 2. The program alarm light 72*b* is lighted when the control 14 indicates that the program of computer C has required an excessive cycle time. when this light is actuated, the signal S is generally placed into flashing condition either yellow or red, according to the particular desired arrangement. Consequently, program alarm light 70*b* is actuated when computer C has not completed a single program cycle is a desired time. This feature, as the other features of panel 22, will be described at more length in the detailed description of the circuits included in the controller B.

Standard features subpanel 73 allows operation of controller B in accordance with certain standard subroutine programs, which may or may not be used at any selected intersection. by shifting one of the toggles 73*a*, 73*b*, 73*c*, and 73*d* into the upper position and pushing button 73*e*, a particular standard subroutine will be incorporated into the program of computer C during its next cycle. This is accomplished, in accordance with normal computer technology by sensing the actuation of one of the toggle switches and diverting the program through a subroutine upon such sensing. In other words, the toggle switches 73*a–d* allow insertion or removal of subroutines within the program being progressed during a cycle of digital computer C. Of course, various standard features could be incorporated within subpanel 73, as long as the digital computer is provided with a corresponding programmed subroutine. Button 73e is depressed to enter the selected feature.

In accordance with the illustrated embodiment, four standard features are employed by controller B. Toggle 73*a* is used for actuating the pedestrian subroutine program and may be used either with the demand mode of toggle 73*d* or by an actuated type program controlled by the actuators D1A–D4B of FIG. 1. Toggle 73*b* initiates the variable initial subroutine of the program which allows the sensing of vehicle actuations for a particular phase when the phase is inactive. The actuation by detected vehicles will extend the initial green interval to a maximum time which will be explained in connection with another of the subpanels of panel 22. In a like manner, the gap reduction toggle 73*c* allows insertion of the gap reduction feature into the program of digital computer C. A demand mode can be inserted within the program by actuation of toggle 73*d* and actuation of the enter feature button 73*e*. When put into the demand mode, the controller B is sensitive to the presence of a vehicle in any particular inactive phase. In this mode, a relatively large loop is necessary and it should be located relatively close to the intersection. If either the variable initial or gap reduction toggle switch is actuated, demand can not be actuated. This is accomplished by the interrelation of switches 73*b–d*, in a manner to be discussed later. Variable initial, gap reduction or pedestrian features can be inserted together or independently as desired.

In summary, the standard features subpanel 73 provides a manner for inserting a standard subroutine within the general program of digital computer C when such a standard feature is desired at the intersection A. If no such feature is desired, then the toggles are in the downward position and the button 73 is depressed to assure removal of each of the standard features.

Referring now to subpanel 74, this subpanel includes a plurality of push buttons 74A–74L which are used to select the particular phase being displayed in subpanel 70. In intersection A, shown in FIG. 1, only four phases are used; however, generally eight separate phases are employed in controller B. This could be accomplished by assigning a separate phase to each of the traffic movements indicated in FIG. 1, instead of assigning a single phase to two like movements. Of course, a variety of phases can be employed in the controller B, and each would include its respective push button on subpanel 74.

Referring now to subpanel 75, switches 75*a*–75*f* control display of the basic timing functions of controller B. Generally each phase of a signal includes a green, yellow and red period. The minimum initial button 75*a*, the passage time button 75*b*, the MAX 1 button 75*c* and the MAX 2 button 75*d* all relate in some manner to the duration of the green signal in a particular phase. Button 75e displays the yellow duration, and button 75*f* displays the red duration for a phase. By depressing a phase button in subpanel 74 and one of the buttons in subpanel 75, subpanel 70 displays in window 70*a* the time for the selected function and phase as contained in the memory 12. For instance, assume that the red signal time set in memory 12 for phase one was to be interrogated. The operator would depress button 74A in subpanel 74 and button 75*f* in subpanel 75. In window 70*a*, the duration of the red signal would be displayed. This display does not affect the operation of the controller B. If it is desired to change the duration of the red signal in phase two, the buttons 70*c* and 70*d* are depressed to change the display in window 70*a*. Still there has been no effect upon the controller B or the memory 12 of digital computer C. Even if the enter button 70*e* is depressed, no change is made. In order to make a change and set the time to the new time now displayed in window 70*a*, an enabling switch 76, controlled by a key, must be shifted to the on position. When this happens, the enter button 70*e* can be depressed. This removes the previous time from memory 12 and inserts the new time in its place. Thereafter, the controller is operated in accordance with the new set time.

The minimum initial button 75*a* has a range of 0–99 seconds in 1 second increments; therefore, no decimal points are displayed for this particular function. As is well known, minimum initial indicates the minimum green time interval sufficient to allow the desired number of vehicles to enter into an intersection from a standing start. The passage time feature displayed by button 75*b* is used in connection with a gap reduction function in the controller B. Basically, passage time indicates a time which is reset to zero upon each actuation by a vehicle and then times out. The range of this function is 0–9.9 seconds in 0.1 second increments. Buttons 75*c* and 75*d* relate to the maximum time of the active green duration in a selected phase. MAX 1 is set to the maximum overall green duration. MAX 2 requires some type of external enabling source to become effective. The ranges of these two buttons are 0–199 seconds in 1 second increments. Yellow and red buttons 75*e*, 75*f*, respectively, are self explanatory, and their displays have ranges of 0–9.9 seconds in 0.1 second increments. In accordance with the preferred embodiment, the next phase is selected upon the start of the yellow clearance interval corresponding to the time displayed upon actuation of switch 75*e*. The time displayed upon actuation of switch 75*f* is the red clearance time for a given phase. Of course, any phase will be red when another conflicting phase is green. The time displayed in response to button 75*f* relates to the clearance time for the red signal which is the time when conflicting movements may each receive a red signal.

Subpanel 77 includes push buttons 77*a*, 77*b*, and 77*c* and light 77*d*. If the pedestrian feature has been entered by subpanel 73 for a particular phase selected on subpanel 74, light 77*d* is actuated. When this happens, the buttons 77*a*–77*c* may be depressed to enter, into the window 70*a* of subpanel 70, the particular times for the features indicated above the buttons. In accordance with normal practice, the delayed walk button 77*a* provides a time delay to allow right turns of vehicles before the walk signal is actuated. The range of this timing is 0–99 seconds in 1 second increments. The walk button 77*b* displays the time of the basic walk signalization. This time is in the range of 0–99 seconds in 1 second increments. A person should be able to at least reach the middle of the intersection before this feature times out. Pedestrain clearance button 77$c$ has a range of 0–99 seconds in one second increments and allows the pedestrian to progress beyond the center of the intersection before the next phase is actuated. Again, if the time displayed in window 70$a$ is to be changed for any of the features in the pedestrian subpanel 77, it can be done by pressing buttons 70$c$–70$d$ and depressing button 70$e$ after actuation of switch 76. Button 70$b$ is not used because the range of times is 99 seconds. Only MAX 1 and MAX 2 use the third digit.

Subpanel 78 relates to the variable initial feature which may be inserted by switch 73$b$ of subpanel 73. This subpanel includes push buttons 78$a$–78$c$ and an indicator light 78$d$. If the particular phase selected on subpanel 74 includes the variable initial feature, light 78$d$ is actuated. By then pushing one of the buttons 78$a$–78$c$, the particular value for that feature in the memory 12 will be displayed in window 70$a$. Referring first to switch 78$b$, this switch relates to the number of actuations before the variable initial feature is employed. The number of pulses or actuations set into this feature of the controller B for a given phase will allow the minimum initial time at the start of the green interval. After the number of actuations, set into the feature displayed upon actuation of button 78$b$, have been sensed by the appropriate vehicle detector, the variable initial feature will be actuated. Switch 78$a$ relates to the amount of extension of the initial duration for the green of a particular phase upon detection of a vehicle exceeding the number set into the feature displayed by button 78$b$. For instance, if 3.0 seconds is set into the memory for the time displayed upon actuation of switch 78$a$, every vehicle detected beyond the number set into the feature displayed by button 78$b$ will increase the minimum initial green for that phase by 3.0 seconds. The third push button 78$c$ causes a display in window 70$a$, which display is the maximum initial for the particular phase selected in subpanel 74. After this time has been reached, the initial portion of the green duration for the given phase is terminated and the active green portion of the duration is started. As an example, assume that the maximum initial time is 36 seconds, the seconds per actuation is 3.0 seconds and the number of actuations before varying the initial time is zero. Also, assume that the minimum initial is 6 seconds. If 10 vehicles are detected, the seconds per actuation feature will vary the initial duration by 30 seconds. Taking this with the minimum initial, which is always included, the variable initial will be at the maximum of 36 seconds. If fewer vehicles have been detected, each reduced vehicle actuation will reduce the variable initial by 3.0 seconds. The feature displayed by depressing push button 78b is primarily used when a sufficient number of vehicles can be detected and still enter the intersection during the minimum initial displayed by depressing button 75$a$. Of course, as previously described, the number or times displayed in the window 70$a$ by depressing one of the buttons on subpanel 78 for a given phase may be changed by the buttons 70$c$–70$d$. This new value may be entered into memory 12 by depressing button 70$e$ when switch 76 is closed.

If the gap reduction feature has been entered into the operation of controller B in a particular phase which has been selected by a switch in subpanel 74, subpanel 80 becomes active. This subpanel includes push buttons 80$a$, 80$b$ and an indicator light 80$c$. This indicator light is activated when the selected phase includes the gap reduction feature. Gap reduction is employed with the passage time feature displayed upon actuation of button 75$b$ in subpanel 75. Passage time measures the time after each actuation by a vehicle and times out at a time set within the memory 12. Push button 80$a$, when depressed, causes minimum gap setting to appear within window 70$a$. The slope in sec/sec displayed by depressing push button 80$b$ is a calculation involving three values, i.e. the passage time, minimum gap and desired time to reduce to minimum gap. These values are known features in traffic control. The minimum gap is subtracted from the passage time, and the result is divided by the time to reduce. This is represented graphically in FIG. 2B. If the passage time is 7.0 seconds, the minimum gap is 2.0 seconds and the time to reduce is 50 seconds. The calculated slope is that shown in FIG. 2B. The slope is shown as a straight line; however, it is decremented during each program cycle, i.e. every 0.1 second, and is actually a sawtooth curve with 100 decrements between each 10 second vertical line. A controller having this slope and the values indicated will gap out and terminate the active green of a selected phase when the time between two vehicles in the active phase exceeds the value indicated by this slope. After fifty seconds, the phase will gap out if there is a spacing of more than 2 seconds between successive vehicles. Of course, the total maximum green duration is controlled by MAX 1 or MAX 2.

When controller B is operating in the demand mode, subpanel 82 is employed for indication of the reduced red and yellow in a particular phase selected on subpanel 74. In the demand mode, loop detectors are used. The should extend to within six feet of the intersection cross street curb line. Preferably, these loop detectors extend a few feet into the intersection. In this mode, a call is directed to the controller B as long as the vehicle is within the field of influence of the loop detector for a particular phase. Generally, the green interval is extended as long as the vehicle is present in the active phase; however, the maximum green interval is used so that the other phases can be serviced. Subpanel 82 includes push buttons 82$a$, 82$b$ and an indicator light 82$c$. This light is actuated to indicate that the demand mode is operating for a particular phase selected on subpanel 74. As in the other subpanels, depressing one of the buttons 82$a$, 82$b$ will exhibit the reduced yellow or red times for the demand mode of a given phase. These times are employed when a call exists on an inactive phase when no vehicle is present in the loop detector of the active phase. In such a situation, the reduced yellow and red timing are effective. If a call from the active phase occurs during the time when the reduced yellow clearance interval is being timed, the controller B will automatically shift to normal red and yellow intervals for the active phase. If a call comes into the active phase during the reduced red interval, the controller will automatically shift to the normal red clearance interval for the active phase. In a situation where a late call appears in the active phase prior to a call in an inactive phase, the active phase green interval will be extended at least the time that the new vehicle in the active phase is in the loop detector. Of course, these are preferred modes of operation of the demand mode and the features indicated on the demand subpanel 82 are only used to modify the normal demand operation of controller B.

In summary, the time-feature display and control panel 22 is used to display the time, counts or other values within memory 12 by proper selection of the phase and function to be exhibited. This value can be changed and the memory can be reset by the actuation of enter push button 70*e*. If various features are to be incorporated into the controller B, this can be accomplished by actuating the toggle switches in subpanel 73 and entering the feature into the program by push button 72*e*. This inserts a subroutine into the basic program being followed by digital computer C which subroutine is initiated by sensing the actuation of one of the switches on the subpanel 73 and its subsequent entry into the computer. Other time functions and control functions could be monitored and changed by the concept employed in panel 22. The particular traffic functions and features contained in the described embodiment of panel 22 are those used in the preferred embodiment; however, other combinations of functions or features could be used. The details of the operation of this panel will be explained later when the circuitry of the controller B is described.

PHASE DISPLAY AND CONTROL PANEL

Figure 2C:
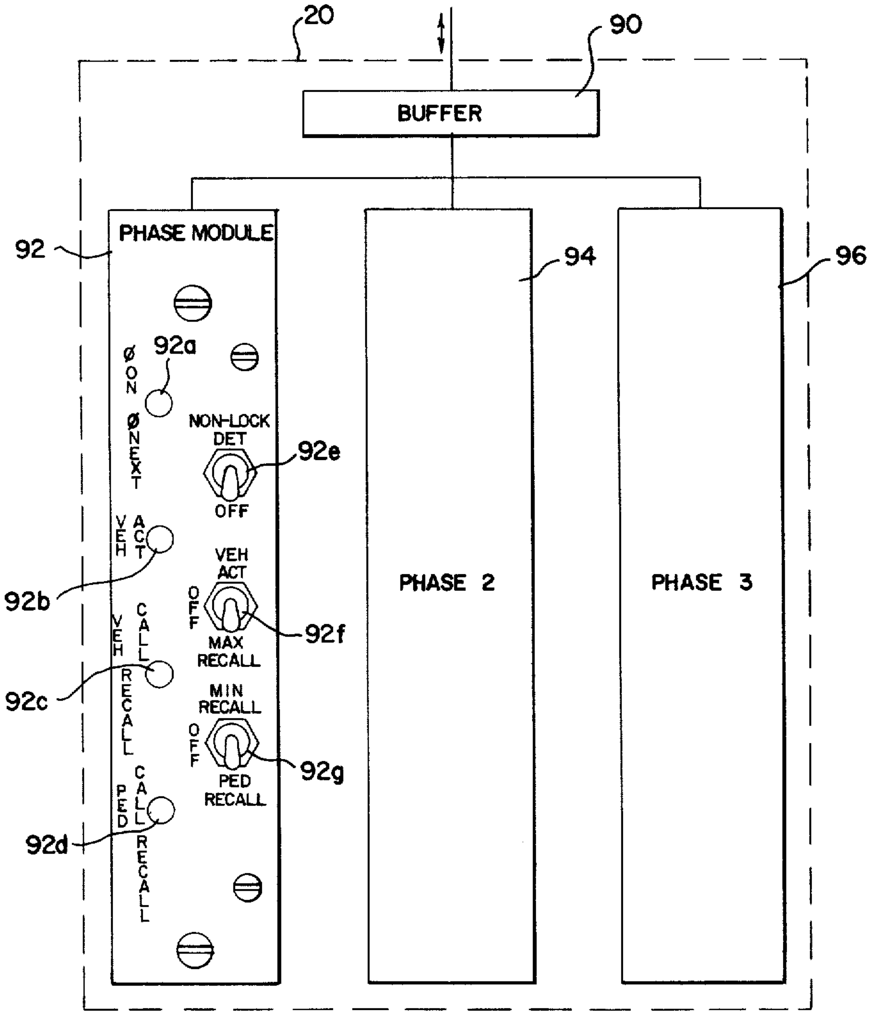
FIG. 2C is a schematic representation of the phase display and control panel illustrated in FIG. 2.
Figure 2B:
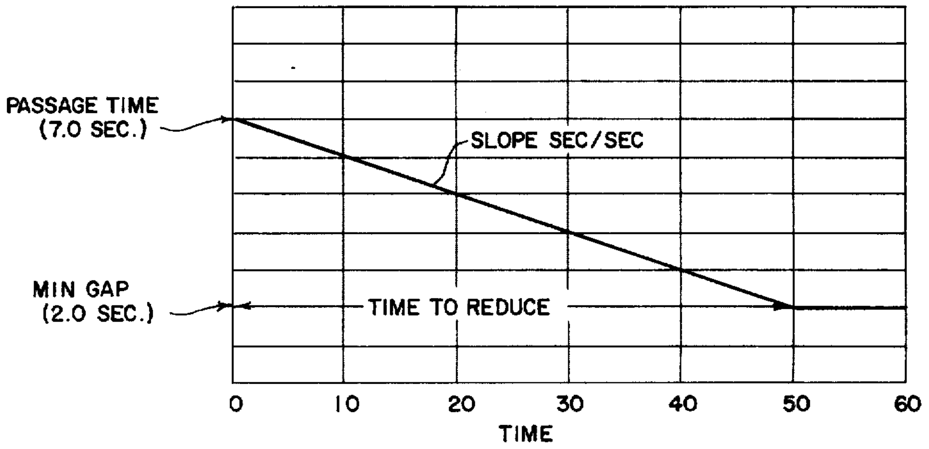
FIG. 2B is a graph showing one operating characteristic of the controller constructed in accordance with the present invention.

Referring now to FIG. 2C, there is schematically illustrated the phase display and control panel 20 which includes a buffer circuit 90 connected to a plurality of parallel phase modules 92, 94 and 96. In accordance with the preferred embodiment of the present invention, each of these phase modules is identical; therefore, only the details of phase module 92 are illustrated. It is appreciated that FIG. 2C represents only that portion of the phase module 92 which is visible to a person viewing controller B. The circuitry involved in the phase display module is explained in detail later. Referring now to the illustrated phase module 92, there are four lights 92*a*–92*d* and three toggle switches 92*e*–92*g*. In accordance with the operation of controller B, each of these lights and toggle switches shows a condition of the controller B or are capable of actually providing input information to digital computer C from this front phase module. It is noted that there is no enabling key for the phase module; therefore, the input information from this module to the digital computer is inputted without preventing inadvertent entry. From the following explanation of the various features of module 92, it will be appreciated that the input features are not such to change the basic concept of the controller B but only to input certain relatively minor control information.

The indicator lights 92*a*–92*d* have a steady state condition and a flashing condition. The steady state condition relates to the upper indicia located adjacent the particular light, while the flashing condition relates to the lower indicia. For instance, light 92*a* is actuated when the particular phase corresponding to module 92, i.e. phase 1 module, is active. Observation of activated light 92*a* indicates the active phase. In a single ring arrangement, only one phase is active at any given time. Consequently, only one of the lights 92*a* and the various phase modules will be on steady state. When this light is flashing, this indicates that the phase to which the particular module relates has been selected as the next phase to be actuated. Light 92*b* has only a single condition. When a vehicle is detected by an appropriate detector in this particular phase, this light is actuated momentarily. When light 92*c* is in the steady state condition, a call from a vehicle on the associated phase is indicated. If the phase is active, this light need not be operating since the vehicles are given clearance to pass. When light 92*c* is flashing, this indicates that toggle 92*f* is in the lower position or toggle 92*g* is in the upper position. These are recall conditions and allow the controller B to return to the designated phase for either a minimum or maximum green signal according to which of the two recall switches are actuated. This operates without any vehicle detector actuation. Light 92*d* functions similarly to the vehicle call or recall light 92*c* and relates to pedestrian actuation. The steady condition of light 92*d* indicates that a pedestrian call has been placed in the memory of the digital computer. During the walk period for this particular phase, this lamp is extinguished. When lamp 92*d* is flashing, this indicates that toggle 92*g* is placed in the downward position for a pedestrian recall. In this condition, the controller will return to the particular phase for a walk and pedestrian clearance interval without actuation from any pedestrian detector.

Referring now more particularly to the switches 92*e* and 92*g*, switch 92*e* has only an upper active position. When the switch is in its active upper position, it prevents vehicle detections on the particular phase of the module from being entered into the computer memory for future use. This feature is employed in certain instances where a vehicle may cross a detector but exit prior to reaching the intersection. When using this concept, it is necessary to provide a loop detector at the intersection relating to the phase so that a vehicle remaining in the phase will maintain a call on the controller B for that phase. When this switch is activated, vehicle call light 92*c* will not be actuated unless the vehicle remains in the loop detector. Referring now to toggle switch 92*f*, this switch has three positions with the extreme positions being active and the center position being off. The upper position has a spring return and its manual actuation is recorded in the controller as vehicle call in the associated phase. Every time it is actuated, an additional call or actuation is recorded into memory 12. This switch enables an operator to insert detections for a particular phase into the memory of the digital computer manually for testing or for other purposes. When switch 92*f* is in the downward position, light 92*c* will be flashing and the controller B will return to the associated phase at least once during each cycle and will cause the phase to time green duration to MAX 1 or MAX 2 according to which is being employed. The up position of switch 92*g* has a similar function. When the switch is up, the associated phase will be serviced at least once during each cycle and this phase will not be skipped during the operation of the controller irrespective of the traffic conditions. At least the minimum initial green duration will be timed for the phase when it is actuated in the cycle. Of course, if a detector is installed in that particular phase, the variable initial, passage time, gap reduction and maximum timing feature will also be effective when the phase is again recalled for actuation by position of switch 92 *g*. It is appreciated that the recall switches prevent skipping of a selected phase when controller B is programmed to skip phases according to traffic conditions. The down position of switch 92*g* relates to pedestrian recall. When this position is selected, controller B will return to this phase during each cycle and will actuate the vehicle and pedestrian signals. If there is no vehicle extension calls in the recall phase and a call exists on another phase, the vehicle green interval will be the time allocated to the delay, walk and pedestrian clearance interval only. Consequently, the green duration will be controlled by the pedestrian timing of the particular phase having a pedestrian recall.

In summary, the toggle switches 92*e*–92*g* put into the controller B certain information which overrides actual detection information to assure certain operation of the phase. It is noted that if these particular features are employed it does not seriously affect the overall operation of the controller B in its primary objective of signalization at intersection A.

THE DIGITAL COMPUTER

Before explaining the invention which relates to unique circuitry for adapting a standard digital computer to a traffic controller, a brief description of the digital computer employed in the preferred embodiment of the present invention is hereinafter set forth. Of course, other digital computers could be employed in using the present invention in the same manner. In accordance with the preferred embodiment of the present invention, digital computer C, including a central processing unit 10 and memory 12, is a MICRO 400 mini-computer sold by Micro Data Corporation, 644 East Young Street, Santa Ana, Calif., Zip Code 92705. This computer is considered to be a "mini-computer" because of its relatively small size, versatility and low cost. The details of the computer are well known in the computer art and are set forth in several publications, including the MICRO 400 COMPUTER REFERENCE MANUAL Copyrighted in 9171 by Micro Data Corporation and dated March 1971. Although this computer is well known in the art and includes standard digital computer components and operations, a discussion of certain features and terminology of this digital computer will be useful in the later description of the present invention.

Figure 2D:
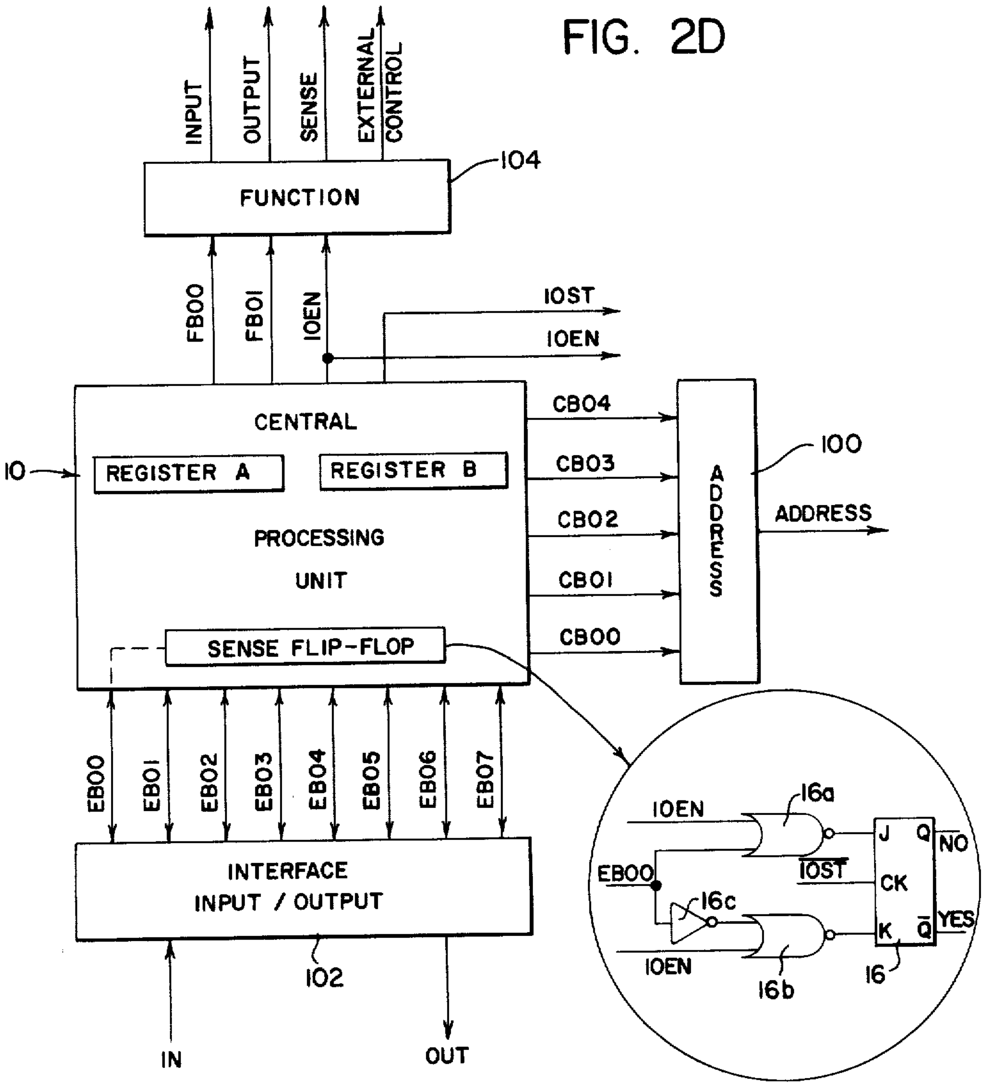
FIG. 2D is a schematic view illustrating the input and output lines for the central processing unit shown in FIG. 2.
Figure 8:
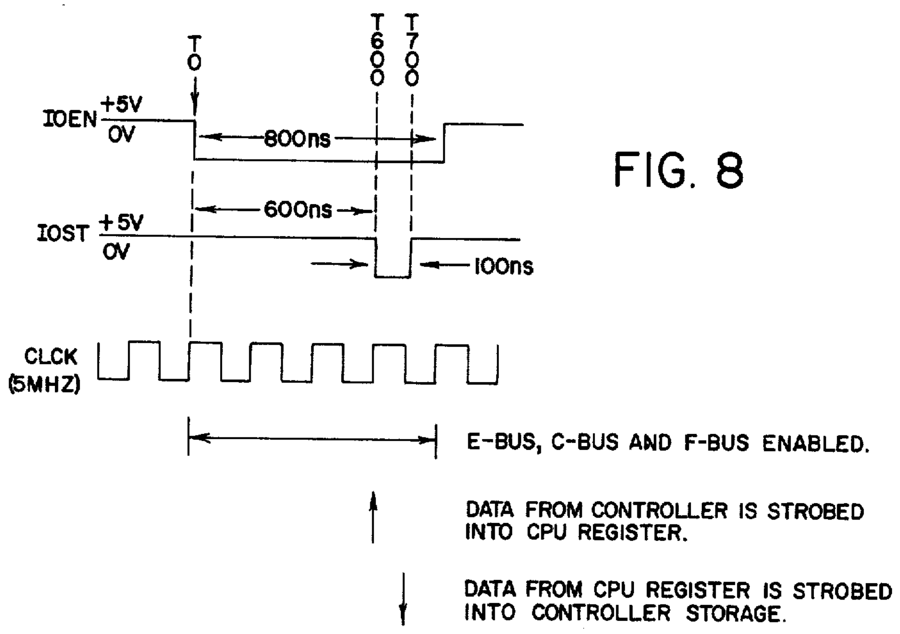
FIG. 8 is a pulse wave form illustrating the strobing function of the computer as used in accordance with the preferred embodiment of the present invention.

Referring now to FIG. 2D, the basic control lines connected to the central control unit 10 of computer C are schematically illustrated. These are the lines or busses which interconnect the central processing unit with the circuitry constructed in accordance with the present invention to perform externally associated functions, i.e. input, output, external and sense. The line designations contained on the illustration of FIG. 2D will be maintained throughout the further description of the present invention. Buses or lines CB00–CB04 are uni-directional address lines directed toward an address decoder 100 for developing a particular address to be used at various stages in the operation of controller B. These addresses are used to control or guide the operation of the computer at certain stages of the program cycle when used in conjunction with circuitry external of unit 10. Buses or lines EB00–EB07 are data buses for developing an 8 bit word. These lines are bi-directional and allow the input of information to the central processing unit or output from the central processing unit. The same lines are used in a multiplex input and output mode with the control being accomplished by appropriate strobing and controlled by the function control unit 104. This control unit decodes digital information contained on uni-directional lines FB00–FB01. These lines have four binary conditions representing function commands of input, output, sense and external. When the input command is decoded, interface 102 allows input to the central processing unit. In a like manner, when the output command is decoded by function decoder 104, interface 102 is used for outputting information from the central processing unit 10. Line IOEN is the input-output enabling negative pulse. IOST is the input-output strobe. Both of these lines, as the other lines of unit 10, are ground true, or negative logic with the other circuits of controller B having positive logic. Consequently, these pulses are generally referred to as $\overline{IOEN}$ and $\overline{IOST}$ in the circuits of controller B. These two lines first enable an external operation and then executes the external operation upon the existence of IOST. These two pulses are clearly illustrated in FIG. 8. The internal clock of the computer is a 5.0 MHz clocking pulse. The IOEN pulse or window is 800ns wide to provide a relatively large enabling position for each external operation of the computer. The IOST is only 100ns wide and occurs after 600ns of the IOEN has passed. This gives sufficient time for stabilizing the computer before the IOST strobes the information into or out of the computer or performs other external functions.

As mentioned before, the MICRO 400 computer is operated as a ground true logic with the untrue being 5 volts D.C. This is a negative logic which is quite common in computers. External circuits, constructed in accordance with the present invention, are positive logic; therefore, throughout the description of the present invention, logic, especially when related to the unit 10, will generally be indicated as L when it is low and H when it is high. Low is any potential less than approximately 0.4 volts D.C. and high is a potential above 4.3 volts D.C. By using the designations L, H, instead of the normal logic 1, logic 0, in certain areas of the controller circuits, confusion which may result from the interrelationship between negative and positive logic is overcome.

Throughout the description of the invention "EXC" refers to a function controlled by a negative pulse on the external control line which refers to an operation controlled external of the computer. The pulses on lines from decoder 104 appear with IOEN.

The MICRO 400 includes five 8 bit registers, two 12 bit registers and one 16 bit register. Information transmitted to and from the registers and to and from memory 12 is transmitted in parallel on a single data bus. The data on this bus at any one time are under the control of logic in the central processing unit 10. When the contents of one register are placed on the bus, they are presented to the input of all registers and memory and are strobed into the proper designation by the control unit. This organization between registers and memory reduces the lapsed time between successive bus transfers. The central processing unit is the control unit for the entire digital computer. It governs all peripheral input and output equipment, performs all the arithmetic, logical and data handling operations, and sequences of the program. This unit is connected to the memory 12 by the appropriate bus and to the peripheral equipment by the buses or leads shown in FIG. 2D. The central processing unit handles words of 8-bits which are stored in memory with a maximum capacity of 65,536 words in memory. The words in memory are used by the central processing unit as instructions to any program, as addresses, or as operands, i.e. data from the program. The central processing unit performs a program by executing instructions received from consecutive memory locations as counted by a 12 bit program counter within the unit. At the end of each memory cycle, the program counter is incremented by one so that the next word is normally taken from the next consecutive location in the memory. Sequential program flow is altered by changing the contents of the program counter, either by incrementing two extra times in a skip instruction, or by replacing its contends with a value specified by a jump instruction. This is all common knowledge within the computer art. The other internal registers in the central processing unit include two accumulators, known basically as A register and B register for use in programming. These registers are schematically illustrated in FIG. 2D. Data can be shifted in either direction between any memory location and either accumulator. All arithmetic and logical operations are performed on the operands contained in the accumulators with the result appearing in one of the two accumulators. Associated with the accumulators is an overflow flip-flop which indicates when an arithmetic overflow occurs out of the most significant bit during an arithmetic operation. Also associated with the accumulators is a standard link flip-flop which indicates that a carry-over occurs out of the most significant register position. Transfer to and from peripheral devices are also made from the accumulators themselves by connection with the lines in FIG. 2D.

Instructions that move data to and from the memory 12 or to and from peripheral circuits, use one of the accumulators, registers A or B, as a source or destination while addressing a memory location or an input-output device as the other destination or source. The arithmetic and logic instructions do not have to reference memory, they simply address the two accumulators, either or both of which may supply operands, and one of which may receive the results. Therefore, the memory is used for storage for the program and permanent data. All calculations are carried in the accumulators. This reduces the amount of data movement as compared with single accumulator systems and reduces the number of instructions required in the program. The MICRO 400 employs hexadecimal numbers. Computer words are represented by two hexadecimal digits with the decimals 10-15 being represented by A–F.

As shown in FIG. 2D, the mini-computer includes an internal flip-flop which interrogates line EB00 during the sense operation of the central processing unit 10. This flip-flop is set in accordance with flip-flops in the decoder and control unit 14 to sense the existence of an external condition, such as a request to insert data into window 70a and to change data in this window. The computer then reads the set condition of its internal flip-flop at an appropriate time in the program cycle and takes action in accordance with the set condition.

This internal sense flip-flop of the central processing unit may take a variety of structural forms; however, one of these forms is shown in the circled portion of FIG. 2D. A standard J-K flip-flop 16 is controlled by the information input line EB00, the enabling strobe line IOEN and the actual strobe line IOST. The computer operates on negative logic and the NOR gates 16*a*, 16*b* and inverter 16*c* controls the flip-flop 16 in accordance with information on line EB00 when a negative pulse is created on strobe IOST. Since negative logic is used in the computer, the flip-flop 16 is in the set condition when a logic 0 is applied to the information line EB00. When the logic 0 appears in lines IOEN and EB00, a logic 1 is created at the output of NOR gate 16*a*. Consequently, terminal J of flip-flop 16 is at logic 1. Because of the inverter 16*c*, the output of NOR gate 16*b* is a logic 0. This is applied to terminal K of flip-flop 16. The IOST negative pulse is a shorter pulse than IOEN pulse and appears during the IOEN pulse. Consequently, when a negative pulse is created on the IOST of the computer, the input of the clocking terminal CK of flip-flop 16 is a logic 1. This clocks the information from terminals J, K to the terminals Q, $\bar{Q}$, respectively. Consequently, a logic 1 appears at the terminal Q and a logic 0 appears at the $\bar{Q}$ terminal. Since negative logic is used, this indicates true at the $\bar{Q}$ or yes terminal. If the information on line EB00 were a logic 1, which would be the untrue condition, the logic on the Q or no terminal would be a logic 0. This would show that the no side of the flip-flop 16 is true. The yes or no condition of flip-flop 16 performs the well known function of a digital computer to inform the computer regarding future action or response. In this manner, flip-flop 16 is set according to information received on line EB00 which is used in the sensing function of the computer in a manner to be described later in detail.

By control of an external real time clock, computer C processes the complete program cycle every 0.1 second. During this time all function commands of the program are performed. This provides an appearance of simultaneous action of all information input and output functions. The time for a single memory step is approximately 1.6 $\mu$s, (micro seconds) and generally each command can be done in a maximum of three steps. Since controller B requires only about 10% to 15% of the cycle time of 0.1 seconds, computer C is basically waiting or resting a majority of the time. This allows for substantial additional operations as required.

This has been a description of the computer used in the preferred embodiment; however, it is appreciated that other digital computers can be used in practicing the invention which relates to the external circuitry for using standard digital computer operations for controlling traffic signalization. Other computers have the same basic lines as shown in FIG. 2D; however, they may have different nomenclature.

GENERAL PROGRAM

Although a variety of programs can be used in controlling the traffic controller B, the general program format is illustrated in FIG. 2E in somewhat simplified form. The terminology within this program is self explanatory. The address on the left column indicates the address in memory of the instructions. The function indicates the function to be performed from the memory instruction. The function is in hexadecimal numbers. For simplification, two functions are generally given together and they relate to consecutive memory positions. for instance, at memory position 300 there is instruction C3. At memory position 301 there is function 2E. For that reason, memory position 301 is omitted from the program for simplification. The executive program illustrated in FIG. 2E is progressed through once each 0.1 seconds with the memory locations scanned in consecutive order. The designation JMC indicates a jump and mark in current page which means that if the particular labeled function is required the computer jumps from the executive program illustrated in FIG. 2F to some subroutine. For instance, if phase timing is to be changed at memory position 318, the computer will jump into an update phase timing subroutine. This subroutine will be performed, and then the program will return to the executive program.

One feature of the general executive program relates to the real time clock concept which will be described later. At memory position 30E in the program, the process step SSS is performed. This senses the condition of the computer internal flip-flop 16 within the central processing unit to determine whether or not it has been set. If not set, the step at position 310 is performed. This is a jump in current page (JPC) back to step X3 at memory position 308. This cycling from 310 to 308 is continued until the internal flip-flop 16 of the computer is sensed in a set condition. At that time, the instruction SSS indicates a skip of the jump operation at memory position 310 and causes an external control in position 312. This allows continuation of the execute program through the remaining steps. This significance of this particular program characteristic will be explained later in the timing functions of controller B. It is noted that at position 31C there is another skip sense instruction. This is SSN. If the internal flip-flop 16 is not set, step 31E is skipped to progress through the executive program. If the internal flip-flop is set at this particular instance in the program, step 31E is performed which is a stop time function which will be explained later. When position 32A is reached, the executive program has been completed and the program is set to jump to position X1 which is position 302 for a second cycling of the executive program excluding the initialization step at position 300 which is performed only at program start up.

During each cycle of the computer program, the program decides which of the various functions of controller B are required and performs these functions. If all program functions are required during a given cycle, they are all performed in substantially less time than 0.1 second. Consequently, the circuits forming the present invention and which will be explained later can all be used during each program cycle. For this reason, the circuits can be explained separately, and it can be assumed that they operate generally in no specific sequence. The sequence of operation is not important. Indeed, to the human observer, it appears that all functions are accomplished simultaneously. Even though the lights on panel 92 shown in FIG. 2C are actually actuated, when appropriate, once each 0.1 second as the program provides the data to actuate the lights, it appears that the lights are continuously actuated. This is true of all other input and output to and from the computer. This greatly simplifies the explanation of the invention since any sequence of operations is possible by the desire of the programmer without affecting the real time appearing operation of the controller B. Thus, each circuit operation can be explained separately with the understanding that it will be operated, if called upon, during the computer cycle. In the preferred embodiment this cycle is 0.1 second.

This has been a general description of the program employed in the present invention and its general use in controller B; however, various changes may be made in the program without departing from the intended spirit and scope of the invention as clearly disclosed in the description of the invention which relates to circuitry incorporated with the digital computer for the purpose of controlling traffic signalization.

GENERAL DISCUSSION OF COMPONENTS

The circuitry used in accordance with the preferred embodiment of the invention employs certain standard logic circuitry which will be mentioned below for use in consideration of the actual circuitry. The various integrated circuit devices used in the logic of the controller B are transistor-transistor logic (TTL or $T^2L$) operating from a 5 volt power supply ($V_{cc}$). Where discrete components are used, the voltage and characteristics are illustrated on the drawing.

The NOR gates are used to hold an output low whenever a high logic is presented on any of the input leads to the NOR gate. This provides a decoder having a single output and multiple inputs. A similar device is the NAND gate which is used when it is desired to have a low output when all of the inputs are high. These are standard gates in a transistor-transistor logic circuit.

When it is necessary to decode a binary coded decimal word to a particular decimal output, a standard decoder is employed having several inputs and several outputs. According to the binary code on the inputs, a selected one of the outputs is low. Such a decoder for the address lines of computer C is illustrated in FIG. 2F wherein line CB00–CB03 are directed into a circuit including inverters 110 and NAND gates 112. The outputs of the NAND gates represent decimals 0–9. Of course additional similar circuits could be incorporated to expand this type of decoding. The truth table for the decoder illustrated in FIG. 2F is shown in FIG. 2G.

A number of flip-flops are used in the external circuitry in controller B; however, the operation of the flip-flops is generally included with the description of the circuit involving the same. Irrespective of this, the standard D flip-flop logic circuit is illustrated in FIG. 2H. FIG. 2I illustrates the block diagram of this type flip-flop. A general truth table for the D-type flip-flop is illustrated in FIG. 2J. It is noted that the flip-flop has a high logic on terminal Q when preset by a low logic on the preset terminal P. A low logic appears at the Q terminal when a low signal is directed to the reset or clear terminal CL of the D-type flip-flop. When the clocking pulse into the clocking terminal moves positive, the condition of the D terminal of the flip-flop is transferred to the Q terminal. Of course, the Q terminal is the opposite of the Q terminal.

This type of flip-flop is placed in series to provide binary counting in accordance with the normal binary counting practice. This counting can divide a clocking pulse or can actually count pulses and provide a binary coded output representing the number of input pulses. All of this is common practice in the general logic art using integrated circuits or other similar logic components.

GENERAL DESCRIPTION OF DECODER AND CONTROL CIRCUITRY

Figure 3A:
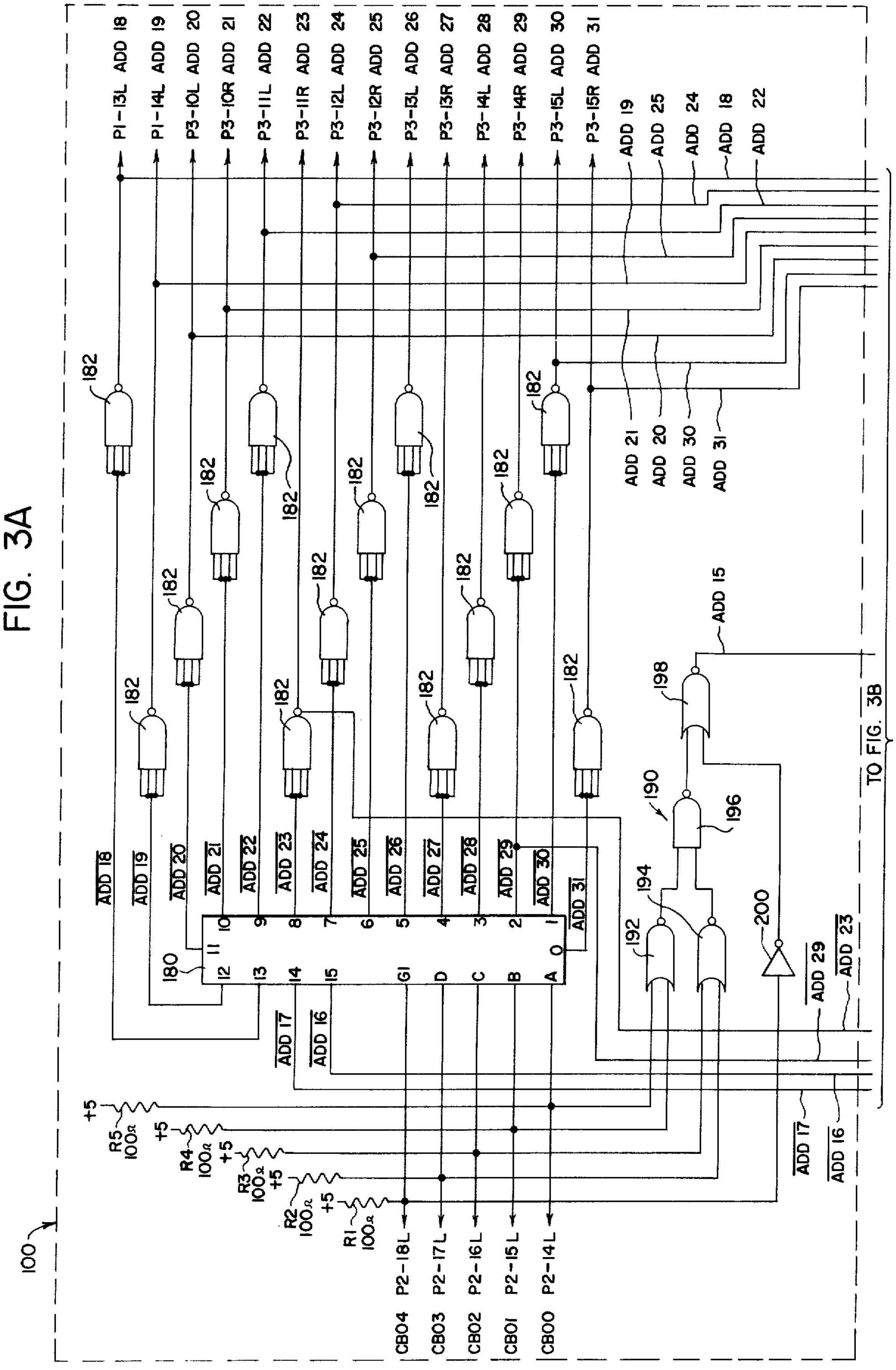
FIGS. 3A–E are circuit diagrams of the decoder and control unit shown in FIG. 2 and schematically represented in FIG. 3.
Figure 3B:
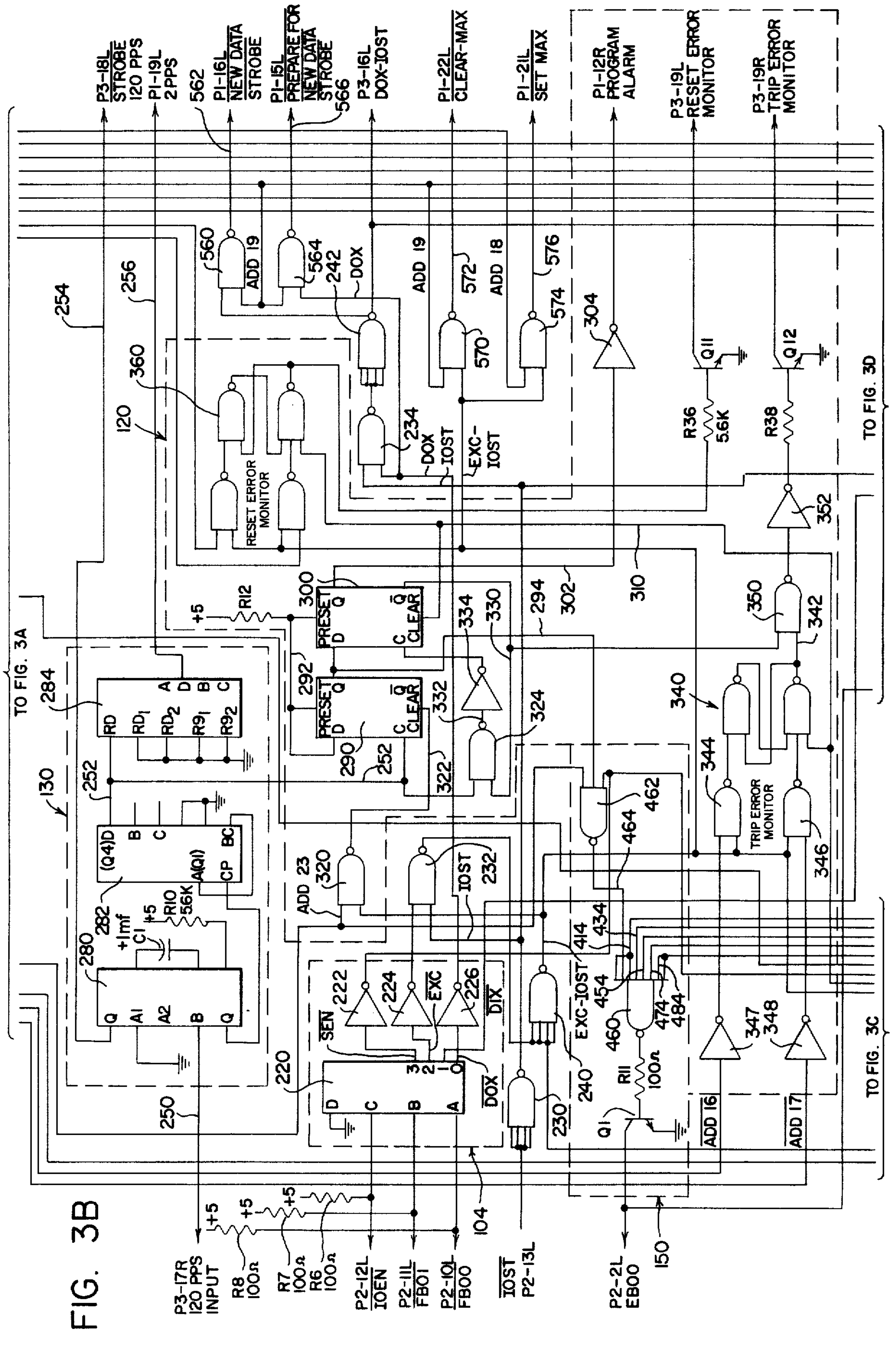
Figure 3C:
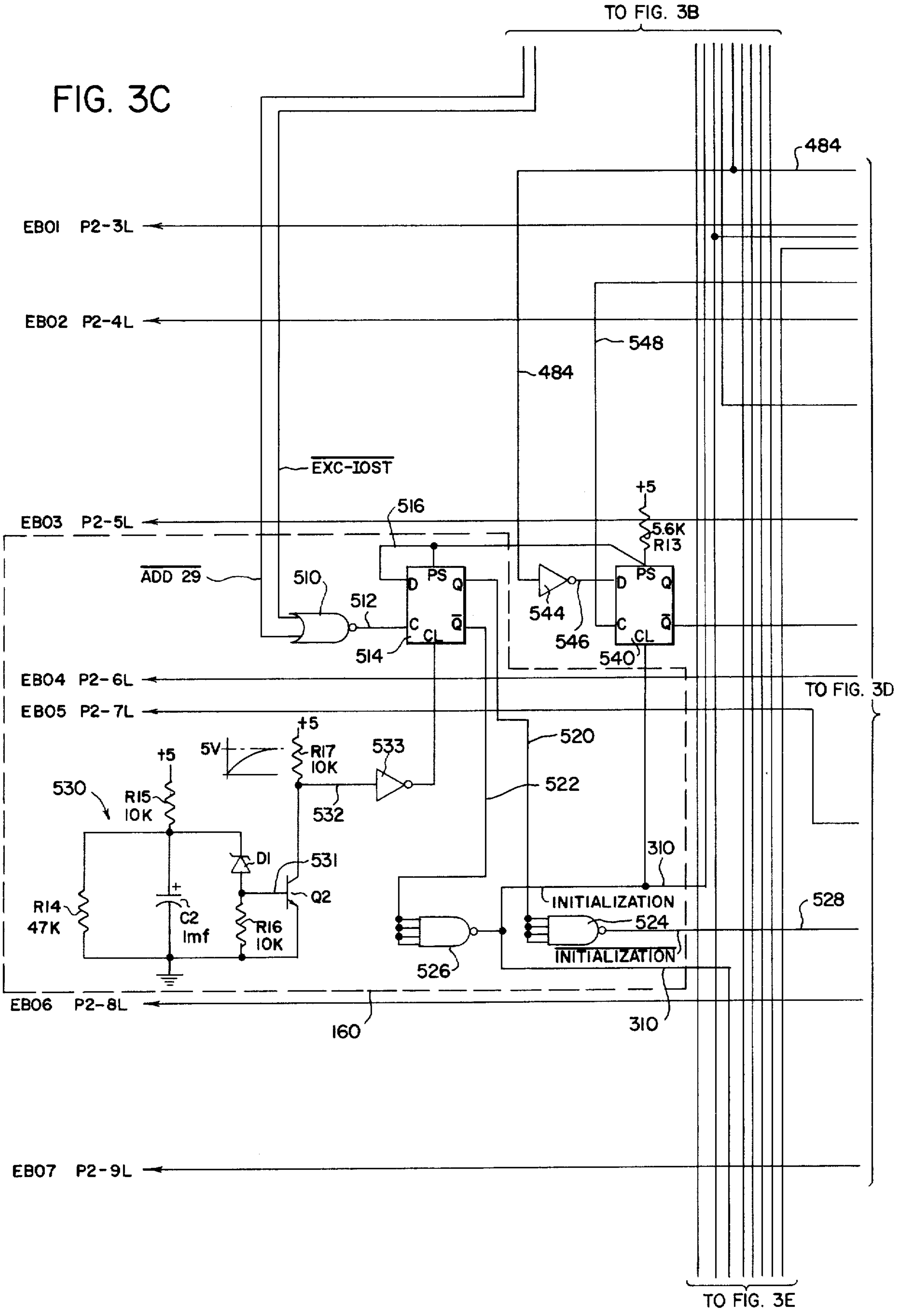
Figure 3D:
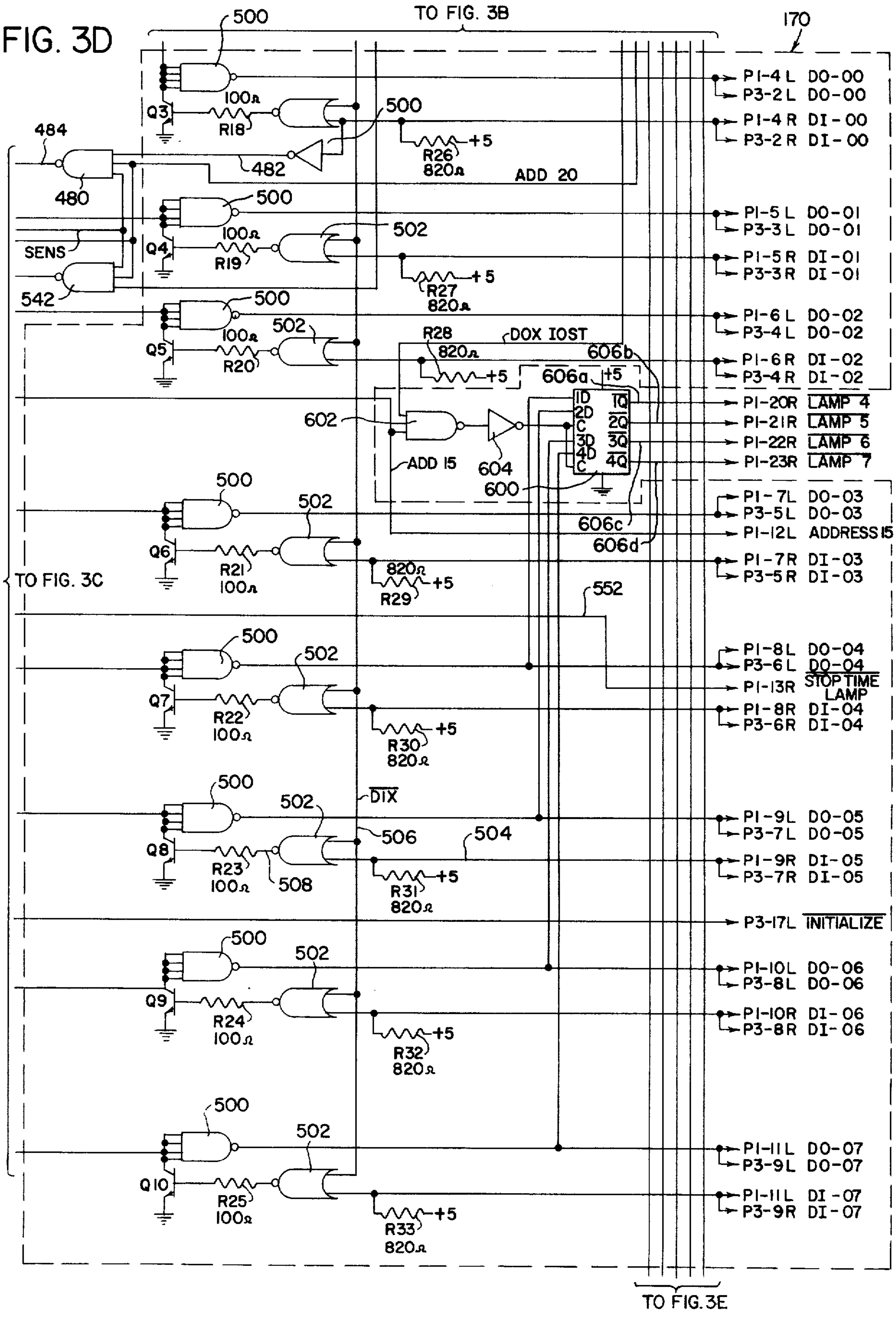

The decoder and control unit 14 is illustrated generally in FIG. 3 and specifically in FIGS. 3A–E. In these figures, the lines are generally labeled according to the information provided on the line. For instance, ADD 29 indicates that this line provides address 29 from decoder 100 previously described. Data output lines are labeled DO-00 through D0-07 and have the same logic at any given instance. The input lines are D1-00 through D1-07, also having the same instantaneous logic. These lines are used to direct information to or from unit 14 and are not connected directly to computer C. Lines to or from the computer bear the previously discussed coding, i.e. EBOO, FB01, IOEN, IOST etc. The terminals, especially in FIGS. 3A–E are indicated by terminal number, such as P1–4L and by an identification label, such as D0-00. This particular terminal is shown in FIG. 3D. It is appreciated that FIGS. 3A–E are segmented and can be assembled to include the total circuitry of the unit 14. It is noted that terminal PI-4L is also connected to terminal P3–2L. This indicates that the data output line DO-00 is connected to two different sources simultaneously. This same plan is continued through FIGS. 3A–E and 4A–C which shows the time-feature display panel circuitry. In this manner, it is quite easy to see how the various circuits of FIGS. 3A–E and FIGS. 4A–C are interconnected.

Referring now to FIG. 3 which is a greatly simplified version of FIGS. 3A–E, when taken together, it is noted that the decoder and control unit 14 includes an address decoder 100 and a function decoder 104. These have been previously discussed. Also, there is provided a real time clock and alarm circuit 120, a pulsing circuit 130, a new data entry and select circuit 140, a sense circuit 150, an initialization circuit 160 and input-output circuit 170. The real time clock and alarm circuit is used in connection with the sense circuit 150 for assuring that the program has been scanned properly every 0.1 second. If not, the program alarm and external error monitor is actuated. When the FB00 and FB01 are properly coded to request input information, the input-output, circuit 170 is energized to allow input of information through the EB lines into the central processing unit 10. At other times, this same circuit is used for outputting information which will be explained later. The sense circuit 150 also senses the entry and new select circuit 140 to indicate during the progression of the program that new data is to be entered and the panel 22 is to be updated. The initialization circuit 160 is used for setting all flip-flops to a prescribed condition prior to starting the programming cycle. All of these particular circuits and their functions within the preferred embodiment of the present invention will be explained in detail with respect to FIGS. 3A–E. The components shown in FIG. 3 are the basic components of the decoder and control unit 14; however, when considering FIGS. 3A–E certain less significant components will be considered as they relate to these primary components. For the purposes of simplicity, the various basic circuits of FIG. 3 have been separated by dotted lines in FIGS. 3A–E.

ADDRESS DECODER

FIG. 3A shows circuit 100 which includes a 15 output BCD to decimal decoder 180 having inputs P2–14L to P2–18L connected, respectively, to address lines CB004–CB04 from the central processing unit 10. The outputs are all negative logic and are therefore coded in inverted form for use in the positive logic circuits external of the digital computer C. The particular addresses of each terminal from the decoder are labeled. Address lines $\overline{\text{ADD 18–31}}$ include power inverters 182 for placing these lines in their non-inverted form for use in the external circuits. Addresses 16 and 17 are directed from the decoder circuit 100 in their inverted form for subsequent inversion. It is noted that the addresses from the decoder are labeled 16–31. To provide the 17th address which is ADD 15, a separate circuit 190 is employed. This circuit includes parallel NOR gates 192, 194 connected to the input of a NAND gate 196 having an output connected to the input of NOR gate 198. An inverter 200 is connected to line CB04 which inverts the condition of this line and directs it to NOR gate 198. Binary logic for decimal 15 is 01111 from right to left. In the negative logic designation from computer this would be HLLLL for lines CB04–CB00, respectively. It will be seen that this later logic when applied to logic circuit 190 will produce a logic 1 or H at the output. This corresponds to ADD 15. In this manner, seventeen addresses are obtained from the decoder circuit 100.

The truth table for the addresses of decoder circuit 100 is set forth in FIG. 5 which shows the CB inputs at the left and the corresponding decoded address in the next column. Only addresses 15–31 are involved in decoder 100. Addresses 1–14 are used for the phase module located within phase display and control panel 20. Columns 210, 212, 214 and 216 of FIG. 5 relate to the particular operation for a given address when the FB00–FB01 lines are in a particular logic in the upper portion of each column. In other words, by viewing FIG. 5, it is possible to determine, knowing the condition of the function lines FB00 and FB01 exactly what the separate addresses are to accomplish in the external circuits of controller B. It is apparent that a given address can have four separate and distinct functions when the enabling window IOEN appears. This truth table can be used to analyze each of the various circuits knowing the condition of the function lines. It is apparent that there are several empty spaces in addresses 15–31 which can be used to expand the operation of the controller. Of course, it is also possible to provide additional addresses by increasing the number of CB lines. In the MICRO 400 computer there are three additional lines which are not used in accordance with the preferred embodiment of the present invention. These additional lines could provide several additional addresses for expanded use of the controller.

FUNCTION DECODER CIRCUIT

Figure 6:
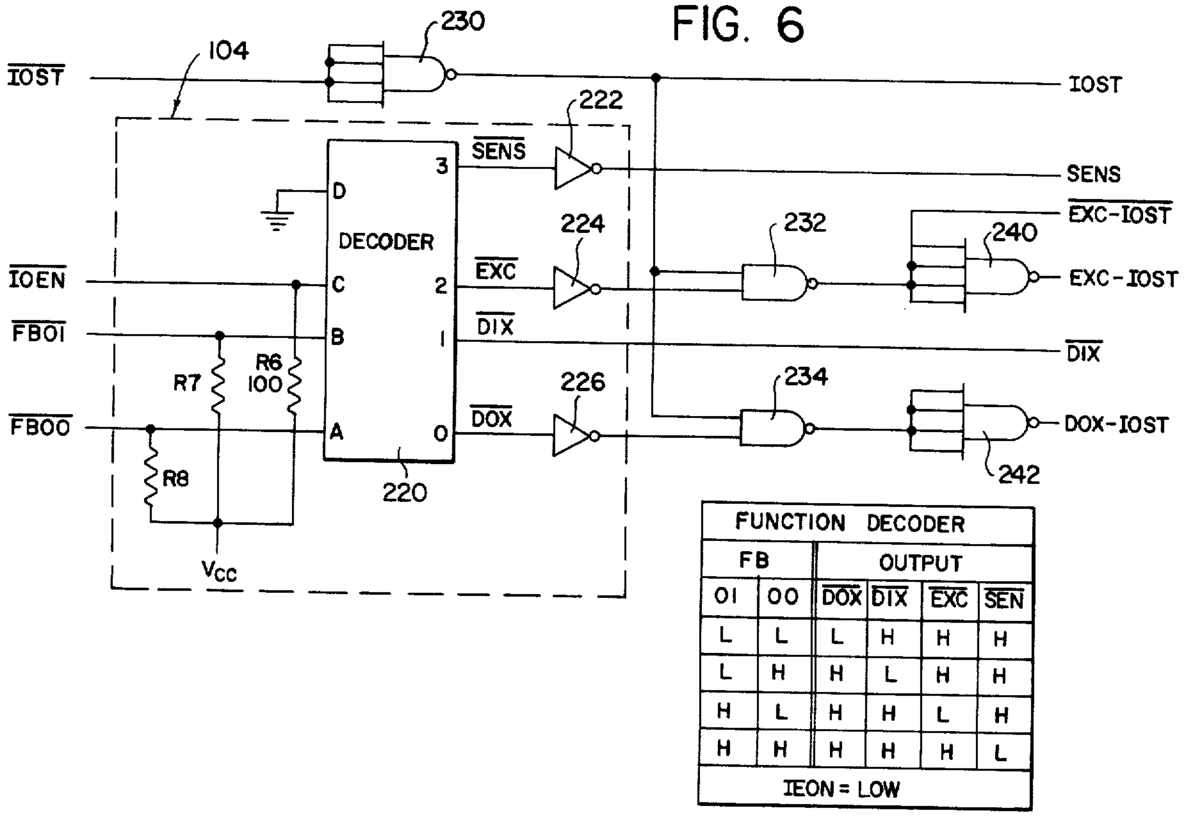
FIG. 6 is a simplified logic diagram illustrating the function decoder of the decoder and control unit shown in FIGS. 2 and 3.

The function decoder 104 shown in FIG. 3B is more clearly illustrated in FIG. 6. Decoder 220 has inputs $\overline{\text{IOEN}}$, $\overline{\text{FB01}}$ and $\overline{\text{FB00}}$ in positive logic. In the negative logic of computer C, these values would be in non-inverted form. The truth table is found in the lower portion of FIG. 6. The output of decoder 220 is coded lines $\overline{\text{SENS}}$, $\overline{\text{EXC}}$, $\overline{\text{DIX}}$, and $\overline{\text{DOX}}$. SENS relates to a sensing function. EXC relates to an external command operation. DIX relates to a data input command. DOX relates to an output command. When these features are compared with columns 210, 212, 214 and 216 of FIG. 5 it is clear what type of command is being executed when these particular signals appear concurrently with a particular address from the address decoder circuit 100, shown in FIG. 3A. Inverters 222, 224 and 226 invert the condition of lines at terminals 3, 2, and 0, respectively of decoder 220. For providing certain synchronization, the $\overline{\text{IOST}}$ strobe is inverted by power inverter 230 and directed to NAND gates 232, 234. These NAND gates receive the EXC and DOX condition, respectively, to compare the existence of a strobing pulse with the two respective outputs of the decoder. The outputs of NAND gates 232, 234 are inverted by power inverters 240, 242 to produce the outputs indicated in FIG. 6 when these various conditions exist.

So far, the address in computer line CB and the function in computer lines FB has been decoded. Of course, only one address and one function exist at any one time. The particular function performed at this instance by the external circuitry is generally set forth in the truth table of FIG. 5. The only remaining information for a particular instance in the computer program is the data information, either input or output, appearing at the EB line. Before considering the input-output function of the controller, attention is directed to certain other features of the decoder and control unit 14 as shown in FIGS. 3, 3A–E.

PULSING CIRCUIT

Figure 7:
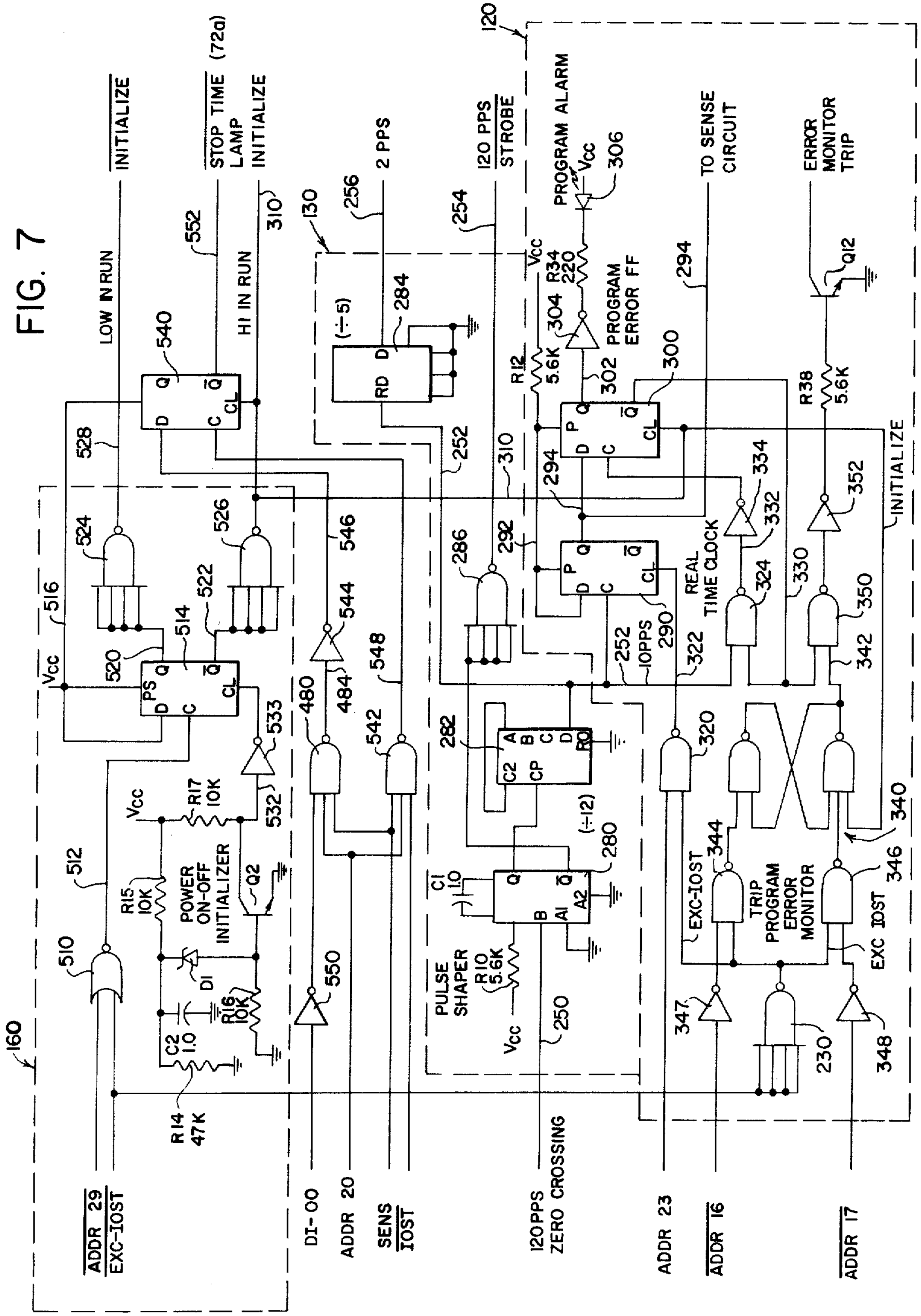
FIG. 7 is a circuit diagram illustrating certain circuits incorporated into the decoder and control unit shown in FIGS. 2 and 3.
Figure 7A:
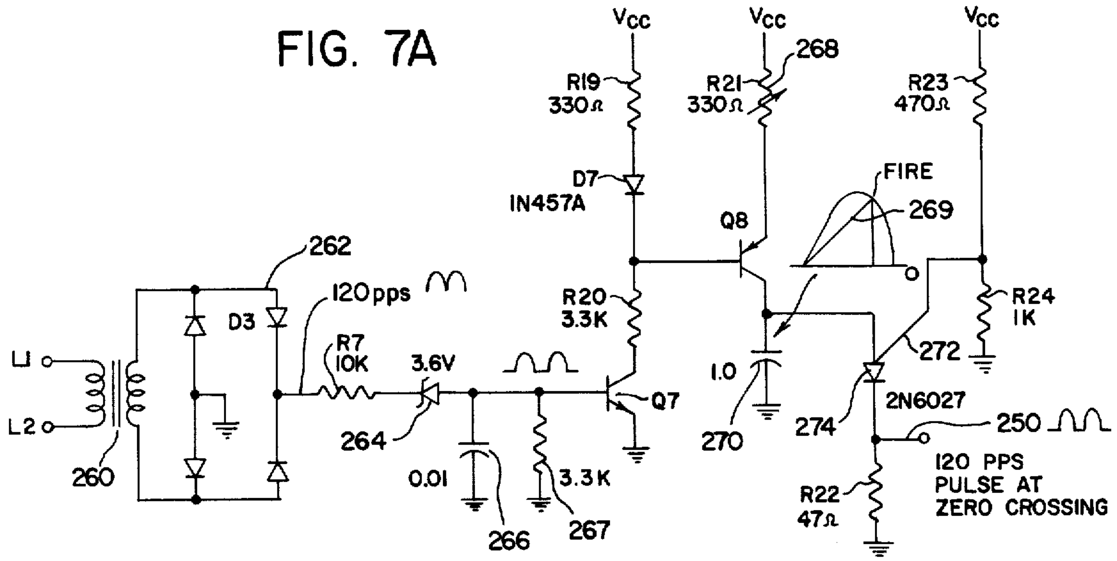
FIG. 7A is a wiring diagram illustrating the input pulse circuit employed in accordance with the preferred embodiment of the present invention.

Pulsing circuit 130 shown in FIG. 3B is shown in more detail in the central portion of FIG. 7. This circuit includes a 120 pps input pulse at line 250. The outputs of this circuit are a 10 pps output on line 252, a 120 pps output board strobe on line 254 and a 2 pps output on line 256. The input to this pulsing circuit is illustrated in FIG. 7A wherein transformer 260 is connected to a full wave rectifier 262 to provide a 120 pps wave form as shown at the output of the rectifier. A chopping Zener diode 264 combines with capacitor 266 and resistor 267 to produce a chopped 120 pps wave shape as shown above the resistor. This controls the bias on transistor Q7 so that it is conductive in accordance with the chopped wave shape. This causes a similar biasing of transistor Q8 having an emitter rheostat 268. As the conductivity of transistor Q8 is varied in accordance with the chopped wave form, capacitor 270 is charged in accordance with line 269 of the super-imposed wave shape. When reaching the upper level of line 269, which is indicated to be the firing level, a PUT (Programmable Unidirectional Transistor) 274 is fired by gate 272. This produces 120 pps pulse at line 250. The pulses are adjacent the zero crossing of the wave shape, as shown in the wave shape diagram including line 269. The peak of this pulse can be adjusted closer to zero crossing by adjusting rheostat 268 so that PUT 274 fires just prior to the zero crossing of the incoming 60 cycle wave. The pulse in line 250 is directed to a monostable multivibrator 280, shown in FIGS. 3B and 7, for shaping the pulses. The pulse is shaped beyond the firing point which causes a pulse to spand to zero crossing of the input power to transistor 260. In this manner, the noise level is low, and there is a reduced tendency to cause unwanted spikes in line 254. The output of the pulse shaping monostable multivibrator 280 is directed to the clocking terminal of a divide by 12 counter 282 which produces a 10 pps signal in line 252. Line 252 is also connected to the input of a divide by 5 counter 284 which produces an output of 2 pps on line 256. The output of the monostable multivibrator 280 is also directed to a power inverter 286 to produce a 120 pps strobe in output line 254. The function of each of these output lines will be further explained in connection with certain other circuitry involved in the present invention.

REAL TIME CLOCK AND ALARM CIRCUITS

The real time clock and alarm circuit 120 is shown in detail in the dashed lines of FIG. 3B and also in the lower portion of FIG. 7. The computer cycles in 1.6 μs from step to step through the memory commands. The real time clock is employed for the purpose of causing the computer to progress through the complete program every 0.1 second. In this manner, the various timing functions of controller B can be performed to an accuracy of approximately 0.1 second. For instance, assume that memory 12 included a time of ten seconds for a particular duration in a selected phase. If the program is completed every 0.1 second, the desired time can be entered into the register and decremented 0.1 of a second during each program cycle. Consequently, the timing function for the individual feature is obtained conveniently. If the timing function is to be with a least significant number of one second, this can be obtained by the operation of the real time clock circuit. Since the program is completed every 0.1 second, the time to the least significant digit of 1 second can be programmed to decrement every 10 cycles of the complete program.

Referring now more particularly to FIG. 7, which is basically identical to the disclosure in FIG. 3B, the real time clock circuit includes a D-type real time flip-flop 290 having a 5 volt power line 292 connected to the D terminal to impose a high logic (logic 1) on the D terminal. In accordance with the operation of a D-type flip-flop, whenever the clocking input from line 252 goes positive, i.e. high, the logic value on the D terminal is shifted to the Q terminal which is connected to output line 294. The input on line 252 is 10 pps so there is a transfer of the high logic to the Q terminal every 0.1 second. To light the program alarm light 72*b*, shown in FIG. 2A, if the program requires substantially more than about 200 milliseconds, or 0.2 seconds, line 294 is connected to the D terminal of D-type alarm flip-flop 300 having an output line 302 connected through an inverter 304 with the alarm light 306 corresponding to panel light 72*b*. At the beginning of the controller operation, alarm flip-flop 300 is cleared by a low signal through an initialization line 310. This occurs only at the start of the controller to assure that the flip-flop is in the proper starting position. This sets a low logic at line 302. If this logic goes high, inverter 302 has a low output which causes actuation of light 306.

The clear terminal or reset terminal of the real time clock flip-flop 290 is connected to the output of NAND gate 320 by output lead 322. The inputs of this NAND gate are ADD 23 and EXC-IOST from the previously mentioned power inverter 230. When ADD 23, which ia indicated in column 214 of FIG. 5 to be the real time clock reset address, and the EXC-IOST leads are both logic 1, i.e. the EXC, ADD 23 command, the output of NAND gate 320 is logic 0. This resets or clears real time clock flip-flop 290 to place a logic 0 at the Q terminal, i.e. line 294. To complete the circuitry involved in operation of flip-flops 290, 300, there is provided a NAND gate 324 having a first input connected to 10 pps line 252 from the pulsing circuit and a second input 330 connected to the $\overline{Q}$ terminal of alarm flip-flop 300. The output of NAND gate 324 is directed through line 332 to an inverter 334 which is connected to the clocking terminal of alarm flip-flop 300.

The real time clock circuit as so far explained has two separate and distinct functions, the first being to perform timing functions for the controller B and the second being for actuating the program alarm light 306.

Figure 9:
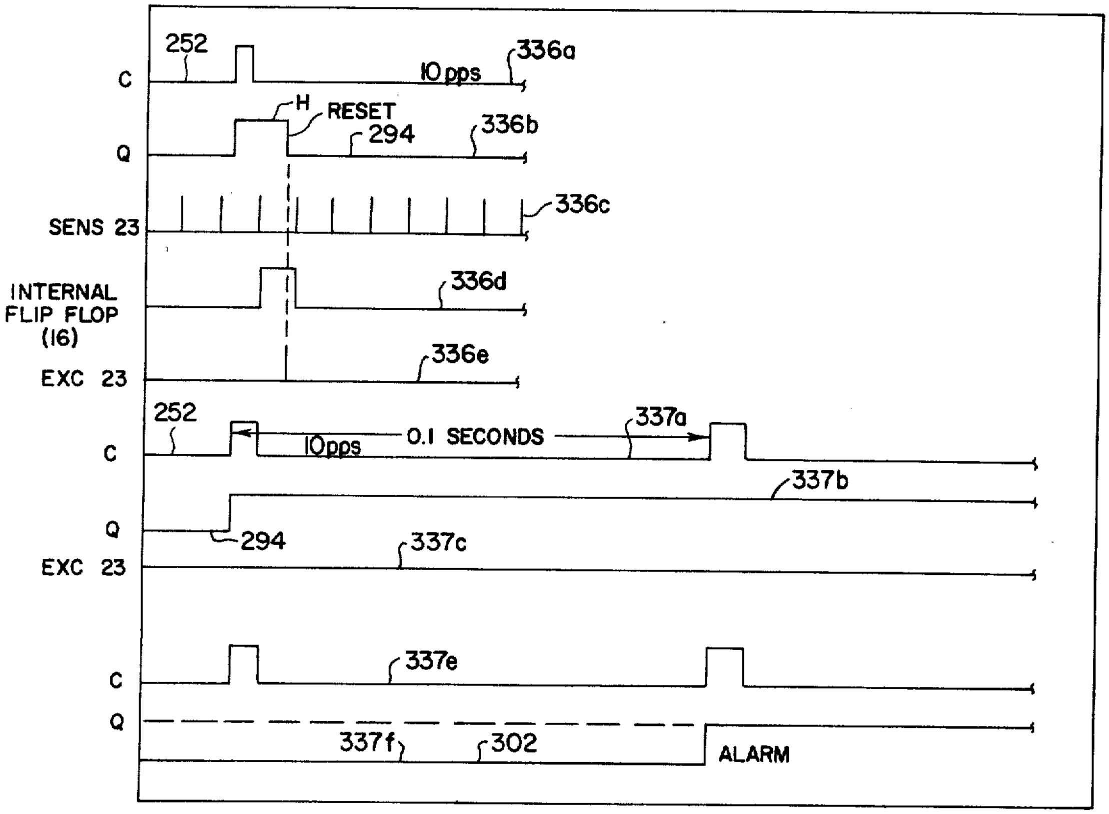
FIG. 9 is a series of graphs or charts showing certain operating characteristics of the real time clock circuit employed in the preferred embodiment of the present invention.

Referring now to the timing function of the real time clock circuit, reference is made to the executive program on FIG. 2E and the wave shapes shown in FIG. 9.

As will be explained in more detail later, the line 294 is connected to the sensing circuit 150 so that when ADD 23 appears with a SENS command from decoder 220, the control flip-flop within the central processing unit 10 checks to determine if the Q terminal, i.e. line 294, of flip-flop 290 is in the high logic state. If it is, the internal flip-flop 16 is set. The following discussion of the real time clock will make the purpose of this SENS, ADD 23 function quite apparent.

Referring now more particularly to FIG. 9, the 10 pps clocking pulse on line 252 is represented as line 336*a*. Since the D terminal of flip-flop 290 is high logic, when the clocking pulse goes positive, the value on the D terminal is shifted to the Q terminal. This is shown in line 336*b*. Referring now to the executive program set forth in FIG. 2E, at position 30C the program commands a SENS, ADD 23. The SENS, ADD 23 pulses are illustrated in chart 336*c* of FIG. 9. They occur quite rapidly because of the rapid progression of the program steps as will be more apparent later. These sense pulses can appear as often as every 14 μs. These sense commands at ADD 23 as set forth in column 216 of FIG. 5, senses whether or not the Q terminal of flip-flop 290 is high. As soon as it is sensed high, the internal flip-flop 16 of the central processing unit 10 is activated as illustrated by the pulse in line 336*d* of FIG. 9. Referring again to the executive program of FIG. 2E, after the sensing step, step 30E, designated SSS, is performed. This step causes the program to skip step 310 of the program when the internal flip-flop is set. When this happens, step 312 is performed. This is EXC, ADD 23. The external command, as found on column 214 of FIG. 5, resets the real time clock. Consequently, when the external command is given at ADD 23, NAND gate 320 receives a high logic from ADD 23 and a high logic from EXC-IOST. This produces a low logic at the reset or clear terminal CL of flip-flop 290 which resets the Q terminal back to a low logic. This is shown on line 336*b* of FIG. 9. Thus, the flip-flop 290 is cleared before the next positive pulse is received from line 252 to trigger flip-flop 290.

If the SENS, ADD 23 command at position 30C of the executive program senses that line 294 is low logic, the internal flip-flop 16 is not set; therefore, at step 30E the skip when flip-flop is set command (SSS) does not come into being. Consequently, the program progresses to step 310 which is a jump command to position 308 of the program. Consequently, the EXC, ADD 23 appears only after a positive pulse in line 252 which occurs only once every 0.1 second. In between these commands, the program circulates in the steps between 308 and 310 awaiting a SENS ADD 23 to sense a setting every 0.1 second. This circulation occurs after the remainder of the program has been completed and assures that the program cycles every 0.1 second.

The EXC, ADD 23 command has been received every 0.1 second, the flip-flop 290 is cleared and the remainder of the program is processed by the digital computer. When completed and returned to the SENS, ADD 23 command the computer again circulates awaiting the resetting of the internal flip-flop by the positive going portion of the clock pulse on line 252.

Since the program progresses completely through the various operations and then rests awaiting the positive going pulse applied to the clock terminal of flip-flop 290, a relatively accurate time function is obtained. A time function can be decremented to the accuracy of 0.1 second. Of course, incrementing or decrementing can be accomplished by proper programming and using the real time clock flip-flop as so far described.

Turning now to the alarm function of real time clock circuit, flip-flop 300 has a low logic at the Q terminal. This provides a high logic at the $\overline{Q}$ terminal. This high logic is applied to NAND gate 324 through line 330. NAND gate 324 thus inverts the clocking pulse of 10 pps on line 252 forming the second input to the NAND gate. Inverter 334 reinverts the clocking pulse to apply it at the clocking terminal of the program error or alarm flip-flop 300. Consequently, when the positive going portion of the clocking pulse is received by flip-flop 290 it is also received by alarm flip-flop 300. If the external ADD 23 command has been received within the 0.1 second between clocking pulses, the Q terminal of flip-flop 290 is forced low by a clearing logic 0 in line 322. The clocking of flip-flop 300 maintains the low logic to line 302. However, if during the 0.1 second the computer program has not been completed and there has been no return to the SENS, ADD 23 command to cause a skip to EXC, ADD 23 for clearing flip-flop 290, line 294 remains high. When the flip-flop 300 is clocked, this high value is directed to line 302 which then activates light 306. The basic wave shapes for this alarm condition are shown in the lower portion of FIG. 9 as graphs 337*a*–337*f*. It is noted that without any external ADD 23 command from the program which occurs only once in each program and after a SENS, ADD 23 command, the program error clocking pulse at 337e will clock into the Q terminal of flip-flop 300 a logic 1. The high condition of the Q terminal of flip-flop 290 is shown in graph 337*b*. This causes the output of flip-flop 300 to go into an alarm condition as shown in chart 337*f*.

It is noted that the real time clock circuit also includes a trip program error monitor 340 associated therewith and shown in the lower portion of FIG. 7. This monitor allows the program to trip an external error monitor whenever such an operation is desired. For instance, the error monitor may control a yellow flashing of the signals at intersection A. At night this flashing condition may be called by the monitor 340. Of course other uses of the error monitor trip may be envisioned. Flip-flop 340 has an output 342 and input NAND gates 344, 346 connected by inverters 347, 348 with the inverted address lines $\overline{\textbf{ADD16}}$, $\overline{\textbf{ADD17}}$. Output line 342 is connected to the input of a NAND gate 350 also having an input connected to line 330 which is the $\overline{Q}$ terminal of flip-flop 300. Consequently, the error monitor may also be tripped by the alarm flip-flop 300 to set the intersection into flashing. The output of NAND gate 350 is inverted by inverter 352 and is directed to the base of transistor Q12. This transistor controls an error monitor trip which is to be actuated by either flip-flop 340 or the flip-flop 300 due to a prolonged program cycle time. When an error exists in the program, a low logic appears on line 330. This causes a high logic from NAND gate 350 which is inverted to a low logic at the plate of transistor Q12. With this low logic, the collector is allowed to float which indicates an error in the program. When NAND gate 346 receives ADD 17 and EXC-IOST, the flip-flop 340 is reset with a high logic on line 342. Trip error monitor uses two addresses so that the output of NAND gate 350 can be held high for a controlled length of time when the error monitor is tripped by a program command. If one address were used, the time could be too short to assure tripping of the error monitor. In operation, NAND gate 350 is controlled by line 330 by the condition of the program error flip-flop 300. Also, the NAND gate is controlled by the computer program. ADD 16 is executed by the program to set flip-flop 340 with a lower output on line 342. This renders the transistor Q12 non-conductive irrespective of the condition of line 330. A similar flip-flop 360 is controlled by ADD 30, ADD 31 as shown in FIG. 3B. This flip-flop is used to reset the error monitor when the flashing condition is to be stopped. The two addresses are used to assure time for resetting.

ENTRY AND NEW SELECT CIRCUIT

The entry and new select circuit 140 is best shown in FIG. 3E and FIGS. 10-12. Basically, this circuit includes three separate flip-flops which are set by manipulation of buttons on the panel shown in FIG. 2A. The set condition of the flip-flops is directed to the internal flip-flop of computer C during a sensing command to indicate that new information is to be displayed on the front panel or that new information is to be inserted into the memory for use on the front panel.

Figure 10:
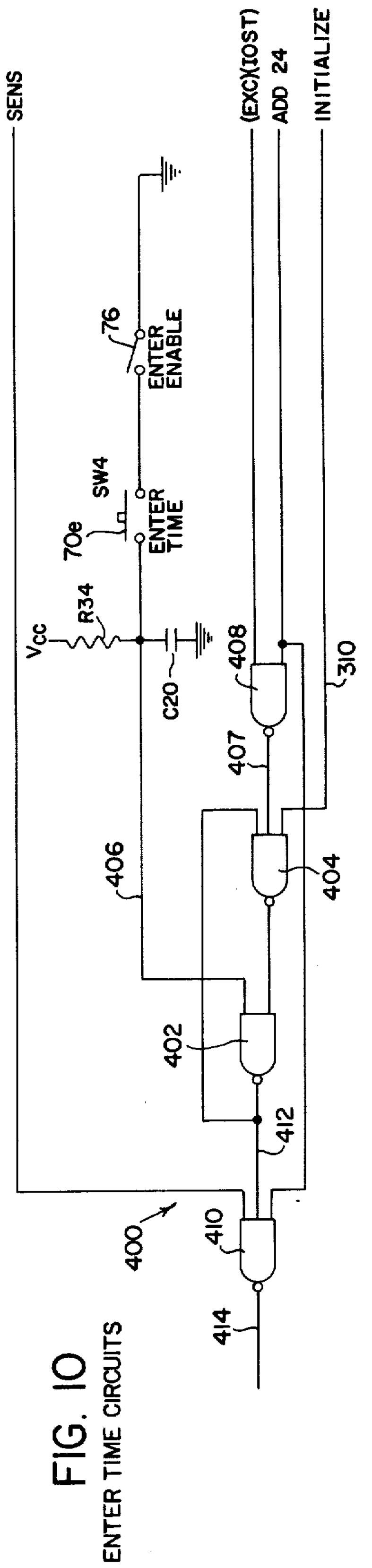
FIG. 10 is a logic diagram showing the enter time circuit employed in accordance with the preferred embodiment of the present invention.

Referring now to the enter time flip-flop 400 best shown in FIG. 10, this flip-flop includes NAND gates 402, 404 which are initially set by an initialization pulse, logic 0, in line 310. The flip-flop is controlled by line 406 connected in series with front panel switch **70*e* and the enter enable switch 76. The resistor R34 causes line 406 to be high when one of the switches 70*e* or 76 is opened. This is accomplished by connection with the 5 volt power supply $V_{cc}$ to resistor R34. Another control line for the flip-flop is line 407 at the output of NAND gate 408 controlled by EXC-IOST and ADD 24.**

In operation, assume that enabling switch 76 has been closed and enter time switch **70*e* has also been closed. This grounds line 406 and places a logic 0 at the input of NAND gate 402. This resets the flip-flop 400 to a logic 1 output. A sensing NAND gate 410 connected by line 412 with NAND gate 402 provides a logic 0 or low logic output when the NAND gate receives a SENS pulse and an ADD 24 pulse. If there had been no closing of both switches 70*e*, 76 a low logic would appear on line 412. Consequently, a high logic would appear on line 414 when a SENS, ADD 24 command is received by NAND gate 410. It is apparent that in the program there is first a SENS, ADD 24 command then an EXC, ADD 24 command to reset the flip-flop 400. If the push buttons are not closed, the SENS, ADD 24 command has no effect on the internal computer flip-flop. If there has been a low logic on line 406, the SENS, ADD 24 command senses a switch closing and updates the information in window 70*a*. The EXC, ADD 24 command then resets flip-flop 400** for the next sense cycle.

Figure 11:
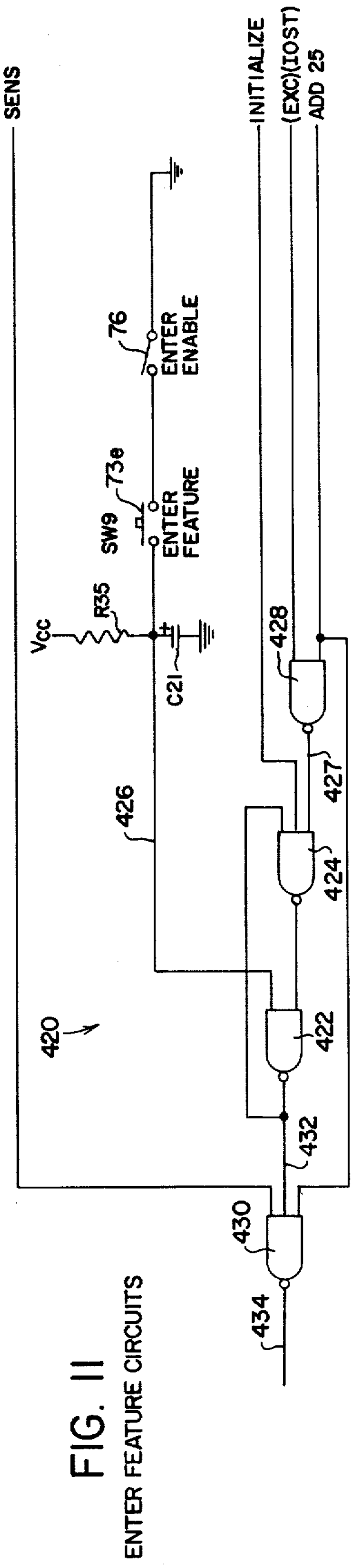
FIG. 11 is a logic diagram showing the enter feature circuit employed in the preferred embodiment of the present invention.
Figure 12:
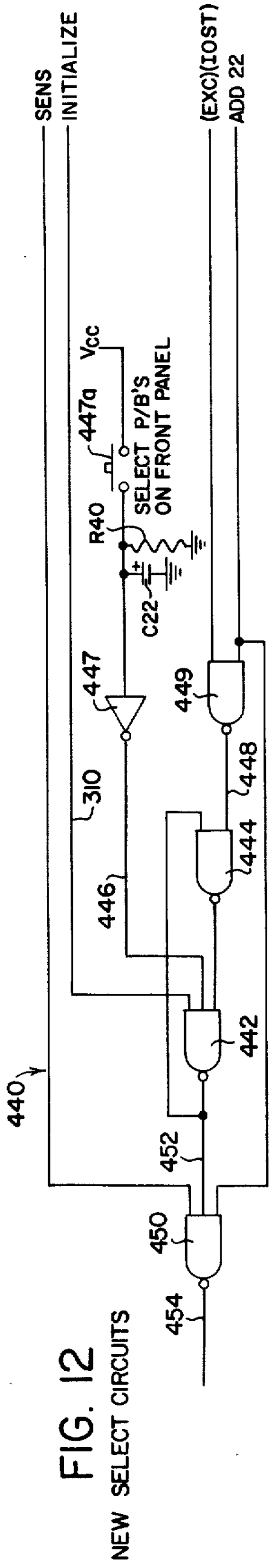
FIG. 12 is a logic diagram illustrating the new select circuit used in accordance with the preferred embodiment of the present invention.

Referring now to the enter feature flip-flop 420, its operation is substantially identical to the operation of the enter time flip-flop. The details of the enter feature flip-flop circuit is shown in FIG. 11 wherein NAND gates 422, 424 form the flip-flops which are controlled by a line 426 connected in series with front panel switch **73*e* and enabling switch 76. Resistor R35 is used in a manner similar to previously mentioned resistor R34. Line 427 connects the output of NAND gate 428 with the input of NAND gate 424. NAND gate 428 is controlled by EXC-IOST and ADD 25. The sense NAND gate 430 has an input 432 and an output 434. If the enter feature push button had been closed and the enabling switch 76 is closed, line 426 is grounded and a logic 1 is applied to NAND gate 430. If the buttons are open, a logic 1 appears at the input of NAND gate 422. A previous EXC, ADD 25 command has reset the other input to NAND gate 422 to a logic 1. This gives a logic 0 output in line 432. Sense NAND gate 430 has a logic 1 or not true output. When the SENS, ADD 25 command appears, the computer is informed that the enter feature switches have not been enabled to enter a new subroutine within the computer program. The sense and external commands are developed in succession so that the flip-flop circuit 420 is reset to a logic 0 on line 432 as soon as the enter feature button is released. Of course, since the buttons may be held for a period exceeding 0.1 second, the SENS, ADD 25 and EXC, ADD 25** may repeatedly operate the internal flip-flop unless programmed otherwise. This will have no effect except to enter the feature several times which is only a redundancy.

It is noted that the indicia at the right of circuits 400, 420 have an inverted form. This indicates that a logic 0 is directed to the circuit from the enter time and enter feature portion of the front panel.

Figure 3E:
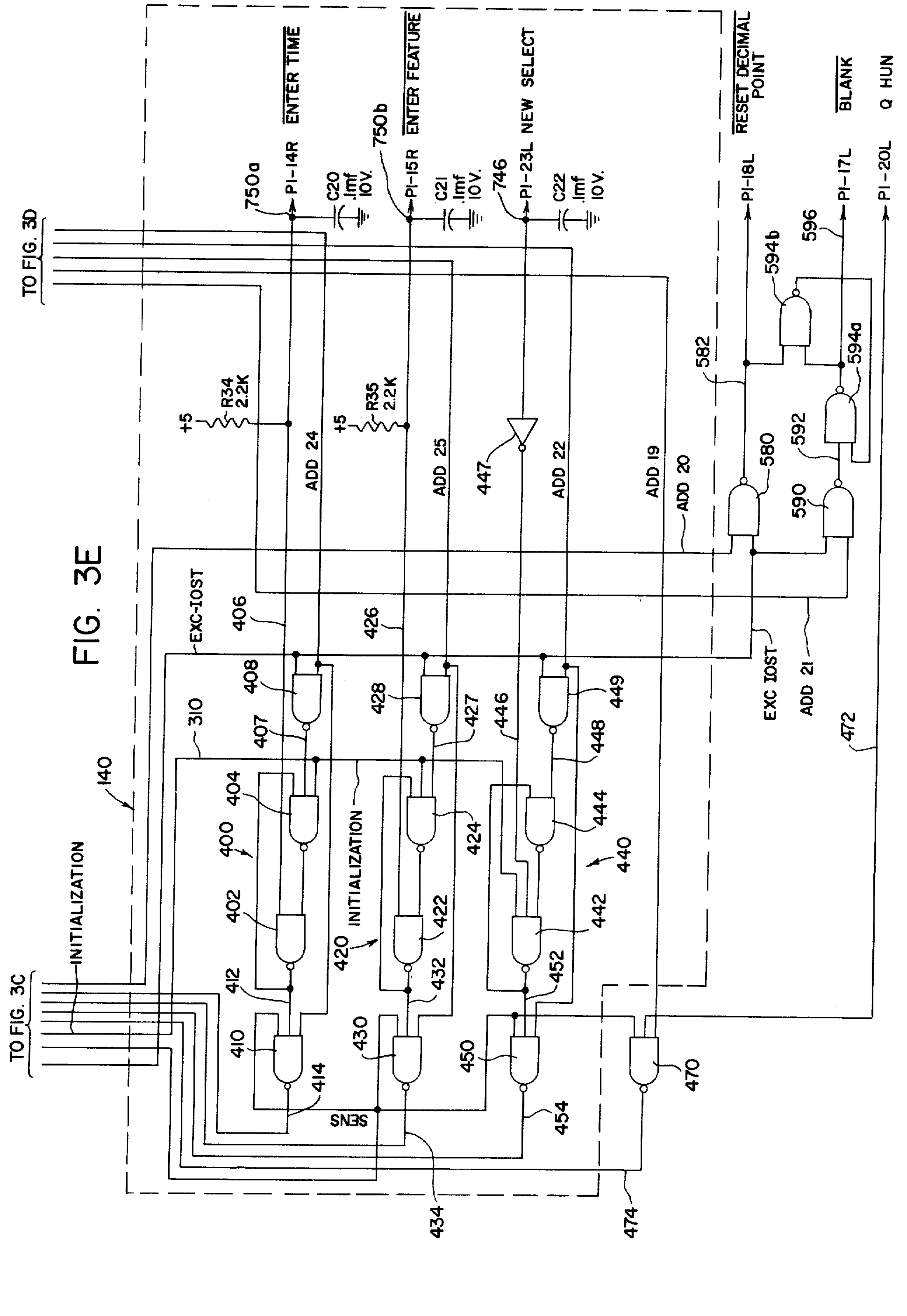

Referring now to the new select flip-flop 440, this flip-flop is somewhat different than the previously described flip-flop. There is no enabling switch 76 within the circuit. This flip-flop circuit includes the flip-flop NAND gates 442, 444 which are controlled initially by the initialization line 310. Line 446 connects the input of NAND gate 442 with an inverter 447 which is in series with a push button **447*a* and power supply $V_{cc}$. See FIG. 12. Because the input is at high logic, the new select indicia on FIG. 3E is not indicated to be in the inverted form. Resistor R30 controls line 446. Another control line to the flip-flop NAND gate is line 448 connected to the output of NAND gate 449. This NAND gate is controlled by an EXC-IOST command and an ADD 22 command. As in the previous flip-flops, there is provided a sense NAND gate 450 having an input line 452 which combines with a SENS command and an ADD 22 command to control the output 454 of NAND gate 450. Basically the operation of flip-flop 440 is similar to the previous flip-flop in that this push button 447*a* is closed, and logic 0 is applied to NAND gate 442. This provides a logic 1 output to the sense NAND gate 450 irrespective of the external ADD 22 command. Upon the SENS, ADD 22 command, line 454 is placed at logic 0. This indicates that the push button 447*a*** has been closed.

The purpose of this particular circuit appearing on decoder and control unit 14 will be explained later in conjunction with a detailed explanation of the front panel of controller B. Basically, when execute addresses ADD 22, ADD 24, and ADD 25 appear in the program the flip-flops of circuits 400, 420, 440 are reset for subsequent sensing.

SENSING CIRCUIT

Figure 13:
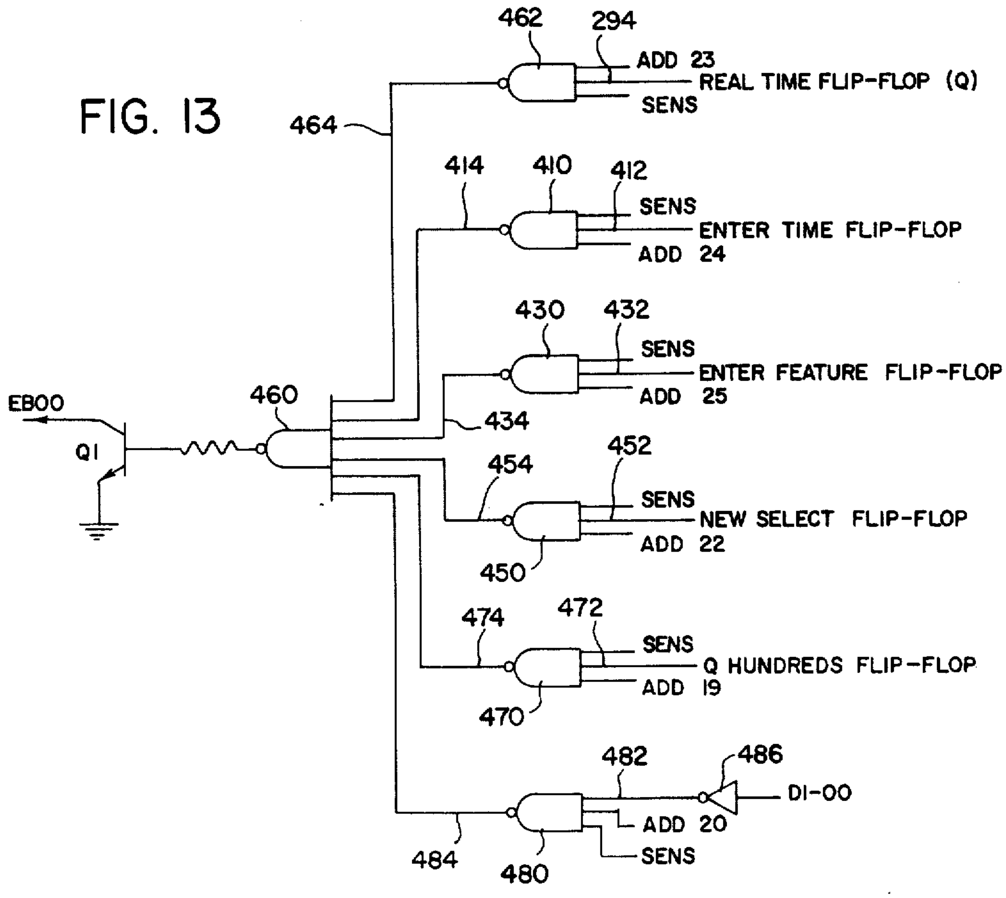
FIG. 13 is a logic diagram illustrating a sensing function of the decoder and control unit as shown in FIG. 3.

The sensing circuit 150 has been briefly mentioned in connection with the real time clock wherein an internal flip-flop within central processing unit 14 is set if the Q terminal of the real time flip-flop is at high logic. Referring now to FIG. 3B, FIG. 3E and FIG. 13, the basic element in the sensing circuit 150 is NAND gate 460 having six separate inputs. If any of the inputs are at low logic, the output of NAND gate 460 has a high logic. This forward biases transistor Q1 and grounds bus EB00. Since the internal logic of the central processing unit 14 is a negative logic, this grounded condition of transistor Q1 is a true condition and sets the internal flip-flop 16 controlled by line EB00 during a sensing function of the digital computer. The six inputs of NAND gate 460 are connected to the output of six separate sense NAND gates, best shown in FIG. 13. NAND gates 410, 430 and 450 have been previously described. NAND gate 462 is controlled by line 294 from the real time clock flip-flop 290 when a SENS, ADD 23 command is made. The output 464 of NAND gate 462 is logic 1 if the logic on line 294 is low. If a high logic appears on line 294, indicating a clocking of flip-flop 290, a low logic appears in output line 464 when a SENS, ADD 23 command is present. This then actuates NAND gate 460 to put a high logic onto the base of transistor Q1. The next sense NAND gate is the Q hundreds flip-flop control NAND gate 470 having an input control line 472 from a hundreds digit flip-flop to be explained later and an output line 474. If a logic 1 appears on line 472 at the same time as a SENS, ADD 19 command is received, a logic 0 appears in output line 474 which actuates NAND gate 460.

The last control NAND gate is a data input NAND gate 480 having control input lines 482 and an output line 484. If there is no input data on the least significant input line DI-00, the logic of this line will be low and line 482 will be high by the action of inverter 486. Consequently, NAND gate 480 senses whether or not there is any logic being introduced into the input line for the decoder and control unit 14.

In operation, lines 294, 412, 432, 452, 472 and 482 will have a logic 1 when there is information to be sensed by the internal flip-flop of computer C. As the program advances through sense functions for addresses ADD 19, ADD 20, ADD 22, ADD 23, ADD 24 and ADD 25, the condition of these respective input lines will be transmitted through bus EB00 to the internal flip-flop which will be set if the respective lines have a logic 1. In this manner, the computer can sense whether the particular monitored circuits are in the activated state for processing by the computer. If they are not in the activated state, the appropriate program command is then provided for either skipping to the next portion of the program or, as in the case of the real time clock function, to jump and recycle in a certain portion of the program awaiting a positive response to a particular sense function.

The sense and external commands are created in succession in the program so that the condition of each particular sense NAND gate is determined at the appropriate time during the program. Thereafter, the controlling flip-flop receives a reset pulse on an external command. If the sense indicates no set of the NAND gate flip-flop, the subsequent external command has no effect. These operations take place at computer rates, thus in essence the flip-flop of the NAND gates receive repeated sense and external commands which have no effect. The only activity occurs on the sense command directly following a set by one of the control lines 294, 412, 432, 452, 472 and 482. The sense is true, the computer flip-flop is set, and the subsequent external resets the controlling flip-flop.

INPUT-OUTPUT CIRCUITS

Figure 14:
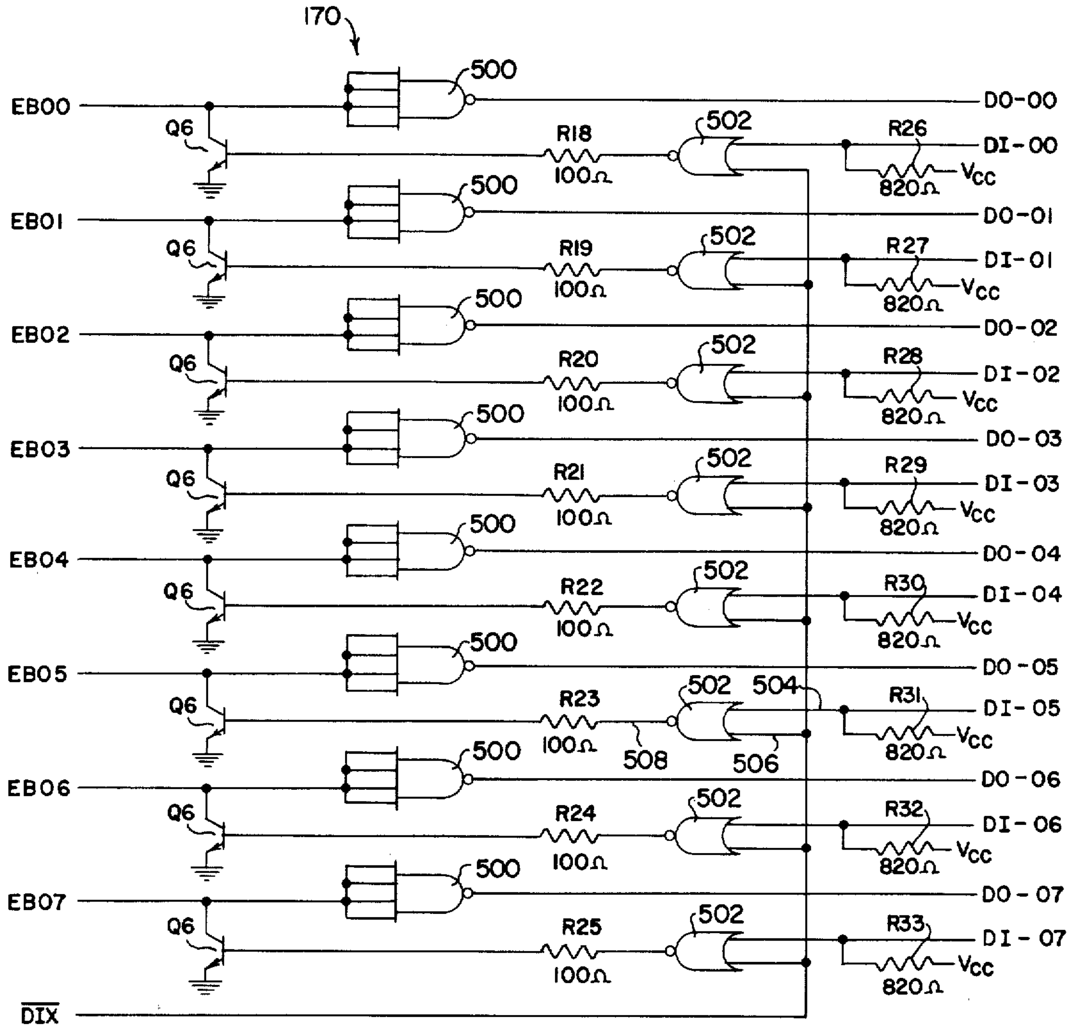
FIG. 14 is a logic diagram illustrating input-output circuit of the decoder and control unit as shown in FIG. 3.
Figure 17:
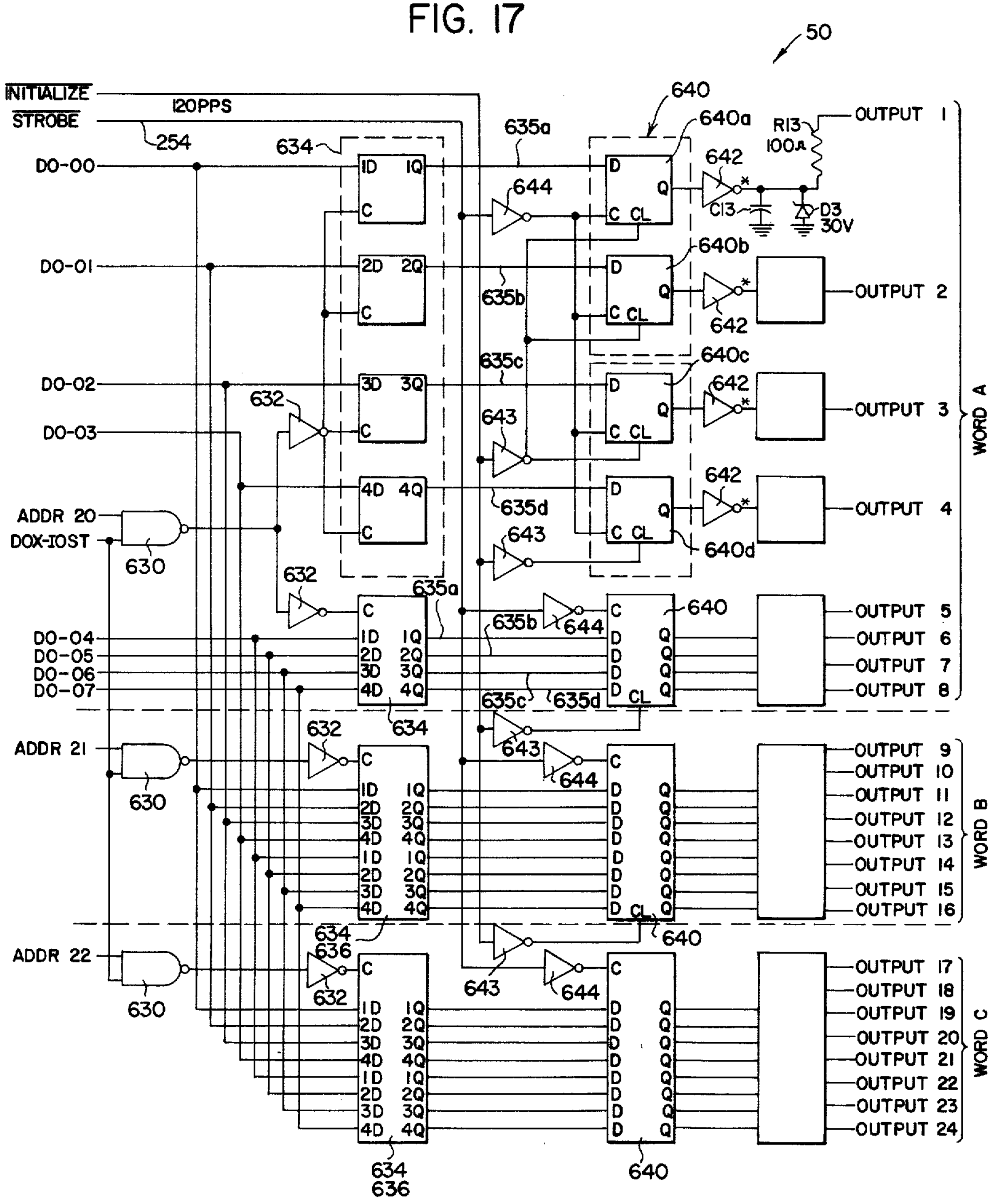
FIG. 17 is a schematic view illustrating the output boards employed in accordance with the preferred embodiment of the present invention.

The input-output circuits 170 of the decoder and control unit 14 are shown in FIGS. 3D and 14. FIG. 14 is somewhat simplified and are separated from the total circuit as found basically in FIG. 3D. The input-output circuits 170 primarily involve a combination of a power inverter 500 connected to an output line DO and a NOR gate 502 connected to an input line DI. These two components are combined with one of the EB lines of the computer to input or output information from the computer upon a given program command. The output information is strobed out through the output boards 50, 52, as shown in FIG. 17. The strobing of the input information is accomplished within the circuits 170. Since each of the eight input-output circuits is substantially identical, only the input-output circuit associated with EB05 will be described in detail. This description applies equally to the other circuits. During input to the computer through line EB05, a binary logic forming 1 bit of a word appears on input line DI-05 designated line 504. When the input function command is provided, as a pulse from function decoder 220, a $\overline{DIX}$ appears in line 506. Since positive logic is used in this portion of the controller, the $\overline{DIX}$ signal is a low logic, i.e. logic 0. This then unlatches all of the NOR gates 502. If a binary logic 0 appears in input line 405 at the time of the $\overline{DIX}$ signal, high logic appears in output line 508. This forward biases transistor Q6 which grounds computer bus EB05. This places a low logic within the computer for the input information. If a logic 1 appears in line 504, line 508 is low. This releases line EB05 to have a logic above ground, which is the not true condition in the negative logic of the computer.

During the period when there is no $\overline{DIX}$ pulse, the NOR gates 506 are latched with a low output to release line EB05. In this floating condition, information from the computer on line EB05 is inverted by power inverter 500 and applied to output line DO-05.

In this manner, when the $\overline{DIX}$ command is in existence, the computer receives information from the input lines DI. When there is no $\overline{DIX}$ signal, the EB lines can be used for output logic. This gives a multiplexing of input and output to the computer for reducing the number of computer lines necessary to service controller B. As will be explained later, strobing of the output lines is accomplished in the output board. The input lines are strobed by the $\overline{DIX}$ command in the circuits shown in FIG. 14. The particular use of the input information is often controlled by an address from decoder 100. After each of the DI lines has been properly coded in binary, the $\overline{DIX}$ signal is provided to strobe this information into the computer through the EB buses of the computer. Resistor R31 assures that if a low logic is not present on the DI line, the line is at a high logic. This pull up resistor is used only to assure proper transmission of computer words into the computer.

INITIALIZATION CIRCUIT

Initialization circuit 160 is used when the controller B is first started. Primarily the initialization clears several flip-flops throughout the circuits shown in FIGS. 3A-3E. The initialization circuit is best shown in FIGS. 3C and the upper portion of FIG. 7. NOR gate 510 has an input connected to $\overline{EXC\text{-}IOST}$ and $\overline{ADD29}$ and an output 512 connected to the clocking terminal C of the initialization D flip-flop 514. The preset and D terminals of the D-type flip-flop 514 are connected to high logic of 5 volts. Line 520 extends from the Q terminal of this flip-flop, and line 522 extends from the $\overline{Q}$ terminal. These output lines are connected to power inverters 524, 526, respectively. The output of inverter 526 is the previously mentioned initialization line 310. Output 528 of inverter 524 is the inversion of line 310, i.e. $\overline{\text{INITIALIZATION}}$. The clear or reset terminal CL of flip-flop 514 is controlled by a circuit 530 including three parallel branches having resistor R14, capacitor C2 and Zener diode D1 and resistor R16 connected in parallel in a series circuit including resistor R15. Line 531 extends between the junction of diode D1 and resistor R16 to couple the base of transistor Q2 to this junction. The collector of transistor Q2 is connected to lower end of resistor R17, the upper end of which is connected to the 5 volt $V_{cc}$. The output 532 of circuit 530 is inverted by inverter 533 and applied to the reset or clear terminal of flip-flop 514.

When power is first applied to the controller B, 5 volts are applied to resistors R15, R17; however, the voltage rise to 5 volts is not instantaneous. It follows a curve similar to the curve adjacent resistor R17. Capacitor C2 is discharged which grounds the upper end of diode D1. Since the Zener diode has not broken down, transistor Q2 is reverse biased and nonconductive. Consequently, line 532 moves rapidly to a high logic which is inverted by inverter 533 and ultimately applies a low logic to flip-flop 514. This clears the flip-flop and applies a low logic at the Q terminal and a high logic at the $\overline{Q}$ terminal. With this condition, line 522 has a high logic which produces a low logic in initialization line 310. This sets all D type flip-flops within the circuit when the logic on the line 310 is applied to the reset or clear terminals thereof. A high logic then appears on the $\overline{\text{INITIALIZATION}}$ line 528. After capacitor C2 charges through resistor R15, the breakdown voltage of Zener diode D1, about 3.6 volts, is exceeded. This causes a voltage drop across resistor R16 and forward biases transistor Q2. With the transistor conductive, line 532 has a low logic. This removes the low logic from terminal CL of flip-flop 514 and allows it to be operated by a positive going pulse at the clock terminal C. This pulse occurs when both $\overline{\text{EXC-IOST}}$ and $\overline{\text{ADD29}}$ are simultaneously logic 0, i.e. true. Consequently, at EXC, ADD 29 the high value on the D terminal of flip-flop 514 is transferred to its Q terminal. This reverses the logic on lines 520, 522 and, thus, the logic on lines 310, 528. Additional resetting of the flip-flops by line 310 is then blocked. Consequently, for a very short time, as soon as power is turned on the initialization line 310 is logic 0 for resetting the flip-flops. Thereafter, the high logic continues on this line. The reverse is true of the inverted line 528. If the power is interrupted for a short period of time, capacitor C2 maintains its charge as it discharges through resistor R14. This maintains the circuit 530 in the steady state condition. However, an interruption of power exceeding approximately 50 milliseconds will allow for discharge of the capacitor to a voltage below the breakdown voltage of diode D1, which will require the initialization stage of circuit 530 as explained above.

MISCELLANEOUS CIRCUITS OF THE DECODER AND CONTROL UNIT

The description above involves the structure and function of the basic circuits contained within the decoder and control unit 14 of controller B. As seen in FIGS. 3A–E there are certain other minor circuits which have not been considered. These do not perform major functions in the controller; however, for the purpose of explaining the basic characteristics of the total circuit, these miscellaneous circuits will be briefly explained.

In some instances, it is desired to stop the internal timing of the controller and allow external timing. This is accomplished by a circuit illustrated on FIGS. 3B, 3C and 3D. The circuit is better shown totally in FIG. 7. Stop time flip-flop 540 is cleared by a low logic on the initialization line 310. The flip-flop 540 is controlled by previously discussed NAND gate 480 having an output 484 and a second NAND gate 542. The logic on line 484 is inverted by inverter 544 and applied to line 546 which is attached to the D terminal of flip-flop 540. This provides the transfer logic for the flip-flop. Line 548 from NAND gate 542 is connected to the clocking terminal C of flip-flop 540. NAND gates 480, 542 are controlled jointly by line DI-00, ADD20, SENS and $\overline{\text{IOST}}$. As shown in column 216 of FIG. 5, SENS, ADD20 lights the stop time lamp and allows external timing, such as timer 46 shown in FIG. 2.

When an external timing function is to take precedence over all timing functions within the controller, a logic 0 is presented in input line DI-00. The logic of this line is inverted by inverter 500. It is noted that the input-output strobe IOST is also inverted. With a logic 0 on DI-00 and a logic 1 on ADD20, SENS line and the IOST line, all inputs to NAND gate 480 are 1. This provides a logic 0 in line 484 and a logic 1 in line 546 at the D terminal of the flip-flop 540. When the strobe pulse IOST appears, its inverted form is applied to the nand gate 542. This is a logic 0 which causes a logic 1 in line 548. Since this is a positive going pulse, the logic 1 appearing at the D terminal of flip-flop 540 is transferred to the Q terminal thereof. This provides a logic 0 at the $\overline{Q}$ terminal grounding line 552. This actuates the stop time light 72*a* shown in FIG. 2A. It is appreciated that other arrangements could be accomplished stopping the time internally of the controller when external timing is to be accomplished. However, the above explained circuit is one circuit for accomplishing this function.

Figure 15:
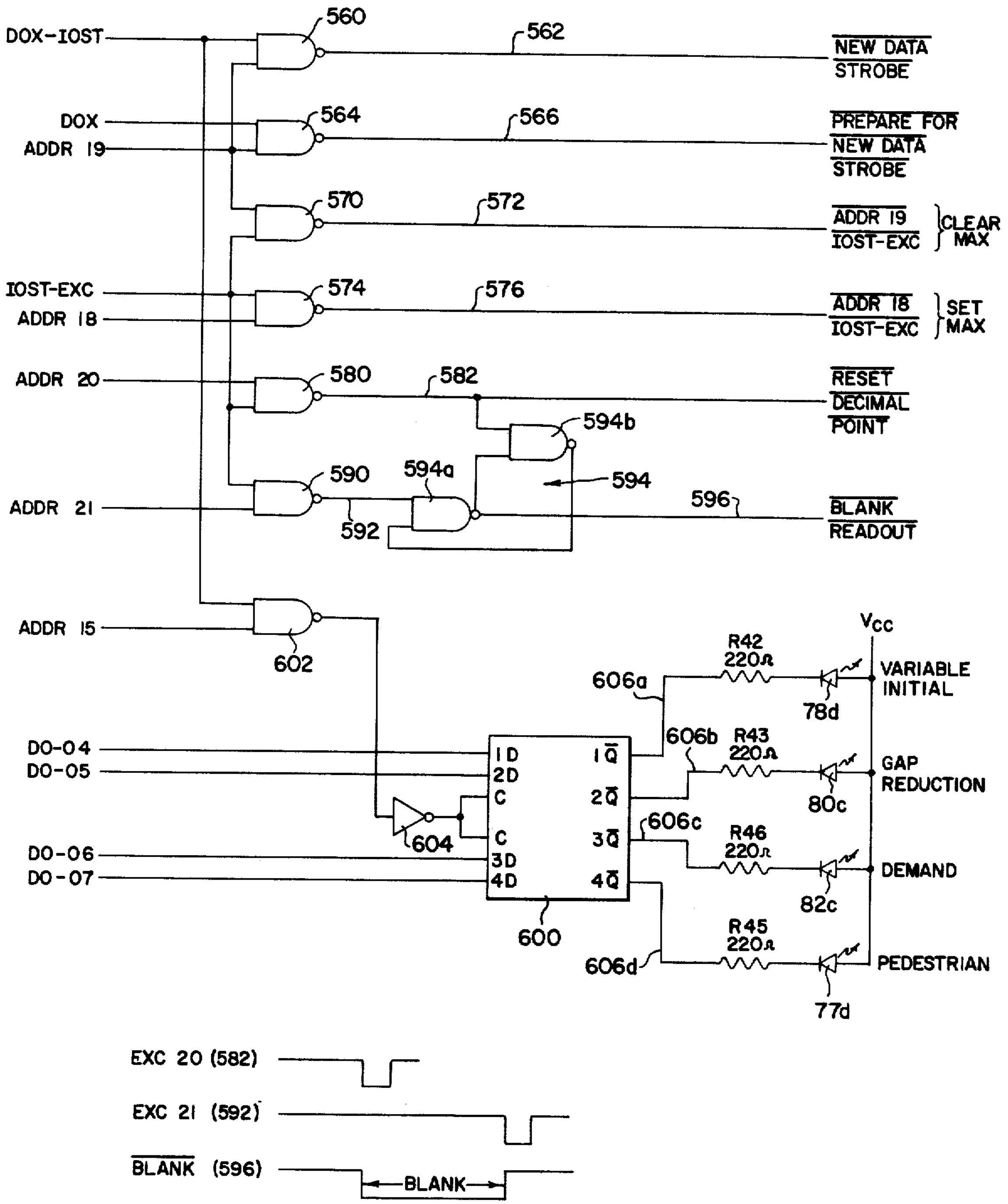
FIg. 15 is a simplified logic circuit showing certain characteristics of the decoder and control unit shown in FIG. 3 together with the graph with the blanking function of this unit.

The decoder and control unit 14 also includes certain relatively simple circuits for providing commands to the time-feature display and control panel 22 shown in FIG. 2A. FIG. 15 illustrates certain circuits for accomplishing these functions. These circuits are also shown in FIG. 3B, 3D and 3E.

As shown in FIG. 3B and FIG. 15, NAND gate 560 creates a New Data Strobe, inverted, in line 562 when a logic 1 appears at DOX-IOST and ADD 19. The DOX-IOST is created by the function decoder circuit as shown in FIG. 6. This function is called up by the proper coding of the function buses FB01 and FB00. NAND gate 564 creates an inverted Prepare for New Data Strobe in output line 566 upon receipt of positive logic from function command DOX and ADD 19. The Prepare for New Data Strobe occurs first while there is an IOEN pulse and the New Data Strobe then occurs at the IOST pulse. This assures preparation and then insertion of new data as will be explained later.

When ADD 19 occurs with function command EXC-IOST, NAND gate 570 creates a clear MAX signal in output line 572. When ADD 18 appears with EXC-IOST a NAND gate 574 creates a set maximum signal in its output 576. These signals control the most significant digit in window 70*a* which is used only with MAX 1 or MAX 2. Upon receipt of ADD 20 and function command EXC-IOST, NAND gate 580 produces an inverted Reset Decimal Point signal in line 582 to blank out all decimal points in window 70*a*, as shown in FIG. 3E.

These circuits are all straight forward combinations of function commands together with corrected addresses which are brought up, if required, during a cycle of the computer program. These output commands are all ground true, i.e. logic 0 if active. This is indicated by the inverted form of the signals which are directed toward the front panel circuitry shown in FIG. 4A for purposes to be explained later.

The readout Blank command signal, which is ground true, is created upon receipt of ADD 20 and function command EXC-IOST. See FIGS. 3E and 15. The blanking circuit includes a NAND gate 590 having an output 592 connected to flip-flop 594 which includes NAND gates 594*a*, 594*b* and has an output 596 directed to the front panel 22 as a Blank signal. Lines 582, 592 are normally logic 1. This is shown in the graph at the lower portion of FIG. 15. When an EXC, ADD 20 command is received, the logic of line 582 is logic 0. This sets flip-flop 594 to a logic 0 output in line 596. This is shown in the bottom graph of FIG. 15. After setting the flip-flop, line 582 may vary without changing the output in line 596. Consequently, disappearance of ADD 20 has no effect on the blanking feature. When EXC, ADD 21 command is received, line 592 has a 0 logic. This resets the flip-flop 594 to an output logic 1 in line 596. This removes the blanking signal. The blanking period between ADD 20 and ADD 21 is indicated in the bottom graph of FIG. 15. Consequently, when address 20 is executed the blanking cycle starts with the blanking cycle continued until address 21 is executed. This feature is also tabulated in column 214 of FIG. 5.

To control the lights on the front panel 22, there is provided a decoder 600 shown in FIGS. 3D and 15. This decoder is actuated, or clocked, by NAND gate 602 having its output directed to the clocking terminals of decoder 600 through an inverter 604. When an ADD 15 command is received with an output function command DOX-IOST, NAND gate 602 has a low logic output. This is inverted by inverter 604 and applied to the decoder 600. When this happens, the decoder decodes the binary logic appearing on output line DO-04 to DO-07. According to the logic output on these lines, which is the condition of the memory for this particular function, one of the output circuits 606*a*–606*d* is actuated. This actuates one of the lights indicated in FIG. 15 and shown in FIG. 2A.

GENERAL DISCUSSION OF DECODER AND CONTROL UNIT

The above detailed description of the circuitry found in FIGS. 3A-E includes the circuits contained in decoder and control unit 14. The left hand terminals of FIGS. 3A–C are connected to the computer. The right hand terminals of FIGS. 3A, B, D and E are connected basically to the time-feature display and control panel 22 and to the input and output boards for inputting and outputting information through unit 14 into the central processing unit 14 into the central processing unit 10. The various function, address and data commands into and out of the computer are called up by a program, which may take a variety of forms to perform the functions of the controller B. The particular software utilized in the program does not form a part of the present invention since various programs could be written to employ the invention of the circuits for directing information into and out of a general purpose digital computer.

INPUT BOARDS

Figure 16:
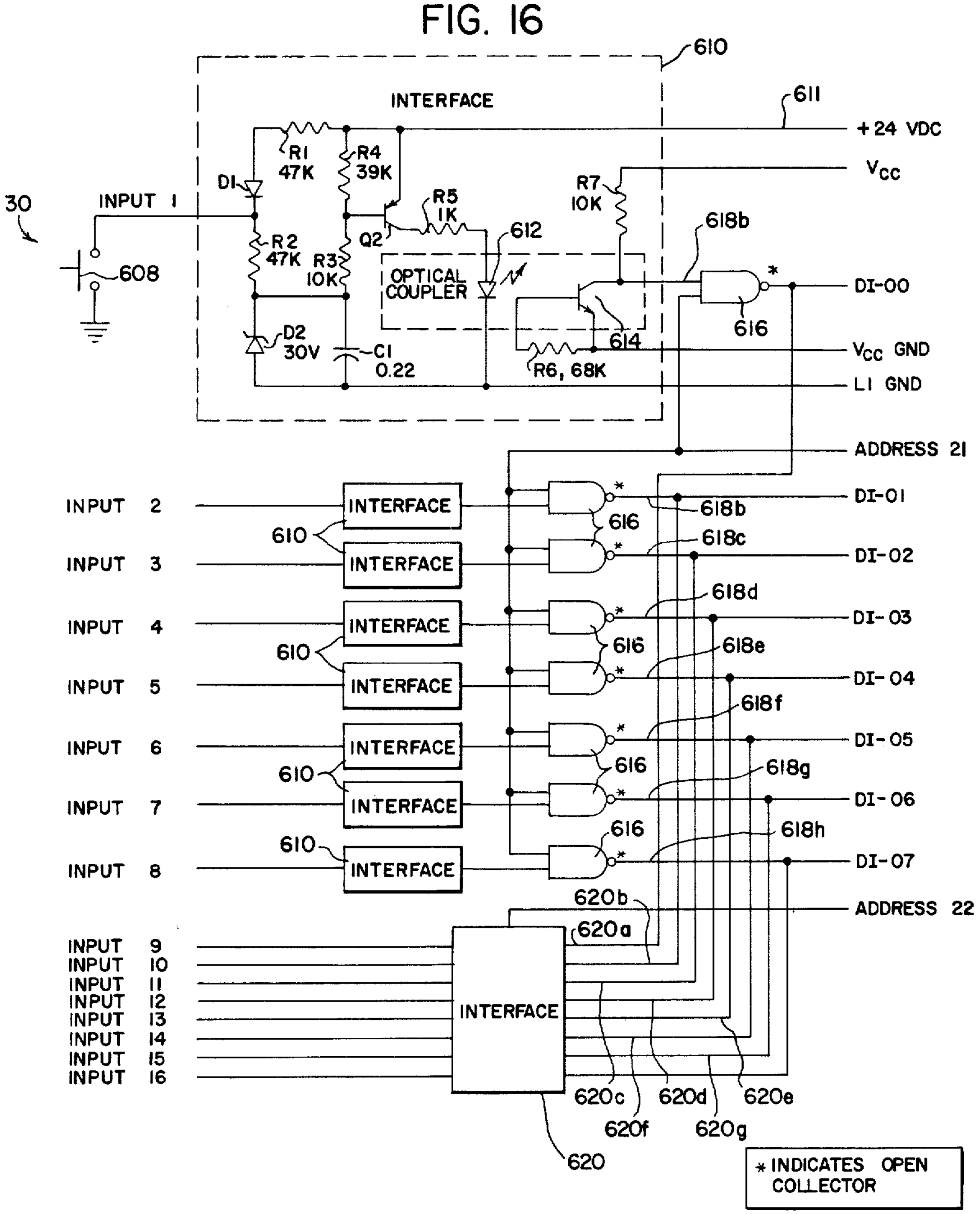
FIG. 16 is a schematic view illustrating the input boards employed in accordance with the preferred embodiment of the present invention.

As shown in FIG. 2, three input boards 30–34 are provided to input information into the decoder and control unit 14. The input information is directed to unit 14 by input lines DI-00 through DI-07. Consequently, 8 separate bits of binary information can be provided to the decoder and control unit simultaneously. FIG. 16 schematically illustrates one of the input boards. Of course, the other input boards are substantially identical. Referring now in detail to the input board 30 shown in FIG. 16, a detector 608 schematically illustrated as a switch is used at each of the separate inputs 1–8 for the first word of input information. As will be explained later, inputs 9–16 are multiplex with inputs 1–8 by separate addressing with ADD 21–31 concurrent with a DIX command created by the coding of FB00, FB01. This is shown in column 210 of FIG. 5. For instance, the first word of board 30 (inputs 1–8) is directed by lines DI-00 to DI-07 to the input circuits of FIG. 14 when ADD 21 is provided by decoder 100. When lines FB00, FB01 command an input, DIX is applied to the input-output circuits to direct the information at inputs 1–8 to computer lines EB-00 through EB-07. Each of the inputs 608 may be a separate detector in the intersection as shown in FIG. 1. Or this input can be other externally controlled indicator equipment.

In accordance with this embodiment of the invention, address ADD 21 actuates the first word of input information through board 30. Each of the inputs is coupled with an interface 610, each including resistors R1-7, switching transistor Q2, a 30 volt Zener diode D2 and a capacitor C1. A 24 volt d.c. source is connected to line 611. When switch 608 is open, diode D2 does not break down and transistor Q1 is non-conductive. When the switch 608 is closed, transistor Q2 is forward biased into conduction to light a light emitting diode 612. This diode is exposed to a light responsive transistor 614 which controls NAND gate 616 having an output 618*a*. With switch 608 open and transistor 614 non-conductive, line 618*b* is positive. When ADD 21 appears, DI-00 will be logic 0 to indicate an open switch at input 1. When input 1 is grounded, transistor 614 is conductive and line 618*b* is grounded. Consequently, the output 618*a* of NAND gate 616 is logic 1 indicating the closed condition of switch 608.

By providing a light coupled interface, there is no tendency to introduce high voltages into the control unit 14 which could cause damage. In addition, if the input 1 is coupled onto a 110 A.C. line by mistake, this high voltage is bypassed through 30 volt diode D2 to the line ground LI/GND. Consequently, this inadvertent connection will not cause destruction of the board 30. Of course, other circuits could be used to provide both the over-voltage protection characteristic and the light coupling interface arrangement.

Assuming that ADD 21 is initiated the same time as the function lines FB00–FB01 are coded for data input, i.e. HL, a high logic is applied to the address terminal of NAND gates 616. The outputs 618*a–h* of NAND gates 616 are coupled to the data input lines DI-00 through DI-07 which transmit the code of inputs 1–8 to the terminals of unit 14 as shown in FIGS. 3D and 14. The second word for board 30 is controlled by ADD 22 in the same manner as ADD 21 controls the first word of input data information. The output lines 620*a–h* correspond to the output lines 618*a–h* and are also connected to the same input lines DI-00 through DI-07.

The first bits of all input words are control line DI-00. The other seven bits jointly control the other lines DI-01 through DI-07. The NAND gates 616 assure that the proper logic is transmitted to unit 14. This is possible by allowing a negative logic on the lines DI-00 through DI-07 to be controlling. Since all NAND gates 616 for non-addressed words will have a logic 1, a logic 1 output of the NAND gate 616 for the addressed word will apply a logic 1 to the input line. A logic 0 output of the NAND gate 616 for the addressed word will apply a logic 0 to the input line. This circuit reduces the number of required input lines to unit 14.

The other input boards 32 and 34 are identical to input board 30 and are connected to the same input lines DI-00 through DI-07. However, these second and third boards use addresses ADD 23, ADD 24 and addresses ADD 25, ADD 26, respectively, for inputting the information to the control unit 14. It is noted that addresses 27–31 for the data input command as shown in column 210 of FIG. 5 are not used in the preferred embodiment of the present invention. These additional addresses could be used with successive boards for increasing the multiplexing of information to the input lines DI-00 through DI-07.

OUTPUT BOARDS

As shown in FIG. 2, two separate output boards 50, 52 are provided for directing signals from the controller to externally controlled signals or other appropriate devices. These boards primarily provide for accurate distribution of output signals from the control unit 14. They can take a variety of structural forms; however, in accordance with the illustrated embodiment of the invention, as shown in FIG. 17, each of the boards, such as board 50, has a capacity of directing from unit 14 binary logic in the form of word A, word B or word C according to the address received by the board during the program cycle. Since each of the words is obtained essentially in the same manner, only the circuitry involved in developing word A, upon receipt of ADD 20 and the DOX-IOST output command will be described. This description will apply equally to the circuitry involved in developing words B and C.

NAND gate 630 produces a low logic when ADD 20 and command DOX-IOST are simultaneously received. This low logic is converted to a high logic by inverters 632 connected to the clocking terminal of a quad-latch flip-flop set 634 having the respective D terminals connected to output lines DO-00 through DO-03 and to the clocking terminal of a second quad-latch flip-flop set 636 having the D terminals connected to output lines DO-04 through DO-07. The Q terminals of quad-latch flip-flop set 634 are connected by lines 635*a–d* to the D terminals of a set of D-type flip-flops 640 having individual internal flip-flops 640*a–b*. The output of the flip-flops in set 640 are each connected through inverters 642 to an output circuit each of which includes capacitor C13, breakdown diode D3 and resistor R13. Diode D3 allows for a breakdown at about 30 volts so high voltage can not be directed to the output board from the external output lines 1–24. The external output lines are connected to an appropriate external unit for controlling the necessary function determined by the logic appearing in the output lines. The INITIALIZATION line is connected through inverter 643 to the clear or reset terminals CL of the individual D-type flip-flops. The 120 pps STROBE line 254 is connected through inverters 644 to the clocking terminals of the D flip-flops within flip-flop set 640.

In operation, referring particularly to the external output lines 1–4, upon receipt of the ADD 20, DOX-IOST command, a positive going pulse is applied to the clock terminals in the quad-latch flip-flop 634. This transfers the logic on unit 14 output lines DO-00 through DO-03 to the Q terminals of the quad-latch flip-flop. In this position, this logic is then applied to the D terminals of the D-type flip-flops 640*a–d*. The board 50 then awaits a negative going strobe pulse which is inverted to a positive going pulse by inverter 644. This clocks the D logic of the flip-flops 640*a–d* to the Q terminal. There the logic is inverted by inverter 642 and used for the appropriate output circuitry. At the same time, during the existence of ADD 20, the logic of output lines DO-04 through DO-07 is shifted from the quad-latch flip-flop 636 to the D inputs of the second set of D-type flip-flops 640 where it is strobed into external output lines 5–8. This completes the transmission of word A. It is seen that the transmission requires first the existence of ADD 20 and the output command determined by function lines FB00, FB01 as illustrated in column 212 of FIG. 5. Since the DOX-IOST, ADD 20 appears for a very short time between the pulse of the 120 pps strobe line 254, ADD 20 instantaneously clocks quad-latches 634, 636 to transfer of information to the Q terminals of the latches. This directs the information to the D terminals of D flip-flops 640*a–d* and allows subsequent strobing of this information by the slower 120 pps strobe in line 254. This strobing transfers the information to the Q terminals of the flip-flops 640*a–d* for use in the output circuits 642. In this manner, all of the addresses through the output boards can be called up to transfer words to the D-type flip-flops awaiting subsequent strobing into the output circuits. All of the information is transferred at the same time by the strobe pulse even though it is multiplexed into the output D-type flip-flops. For the purposes of simplicity, the output circuit involving inverter 642, capacitor C13, diode D3 and resistor R13 are contained in block form in all outputs subsequent to output 1. In addition, for the lower portion of word A and the words B and C, the quad-latch and D-type flip-flop circuits are also schematically illustrated in block form.

PHASE DISPLAY AND CONTROL PANEL

Figure 18:
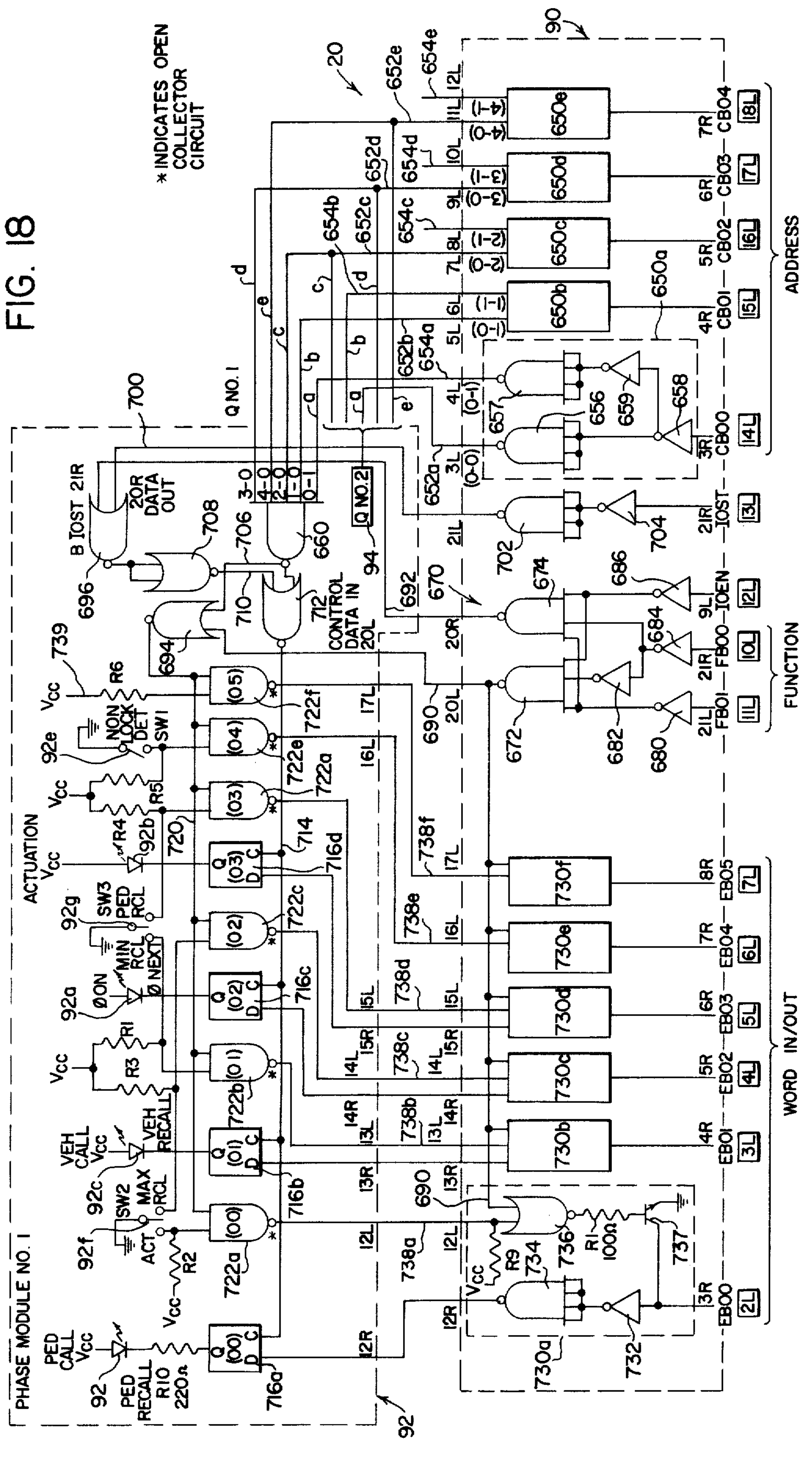
FIG. 18 is a schematic logic diagram illustrating the front phase display and control panel shown in FIG. 2.

The phase display and control panel 20, as shown in FIG. 2C, has the capability of inputting information to the computer through the central control unit 10 and for using information to light certain lights on the panel. FIG. 18 illustrates, somewhat schematically, the circuitry used in this panel for accomplishing the intended purpose. As previously mentioned, there is a buffer circuit 90 connected to a series of phase modules 92, the number of which depends upon the number of phases controlled by controller B. In order to utilize the lights and switches on the phase modules, it is necessary to provide a circuit for addressing a particular module for receiving and transmitting information to the digital computer. When receiving information, it is in the form of lights, when transmitting information from the module to the computer it is in the form of sensing the position of several switches on the module. Since each of the phase modules is identical, only phase module 92 is described in detail. The buffer circuit 90 is common to all phase modules by a multiplexing arrangement, which will be apparent from a description of circuits found in FIG. 18.

To select a particular phase module for receiving and sending information, each of the separate phase modules has an address which is received by buffer 90 through lines CB00–CB04. The addresses for the particular phases are shown in columns 210, 212 of FIG. 5. It is noted that each of the modules has the same address irrespective of whether the data is being inputted from switches in the panel to the computer (column 210) or outputted from the computer to the module lights (column 212). For instance, phase module 92, which corresponds to phase 1, has a code on the CB buses or lines of HHHHL. This can be translated into binary as 11110. Whenever the CB buses include this logic, module 92 actuated for inputting or outputting data according to the coding on lines FB00, FB01. It is remembered that inputting and outputting relates to the computer and not to the module; therefore, when data is being inputted, it flows from the module to the computer.

The decoder of the buffer circuit 90 includes circuits 650*a–e* having non-inverted output lines 652*a–e* and inverted output lines 654*a–e*. To show the inverted form, a code appears at the upper portion of the buffer above the decoding circuits. "0" refers to non-inverted, and "1" relates to inverted form. For instance, referring to output lines 652*a*, 654*a*, the code 0-0 indicates the non-inverted form of the logic on bus CB00. The code 0-1 refers to the inverted form of the logic on bus CB00. As further illustration, line 654*d* is coded 3-1 which relates to the inverted form of the logic on bus CB03. Each of the decoding circuits is identical; therefore, only decoding circuit 650*a* is explained in detail. This circuit includes four inverters 656, 657, 658 and 569. By a review of the inverters, it is noted that line 652*a* has two inversion steps which produces a non-inverted output. Line 654*a* has three inverters; therefore, the output is in an inverted form. The lines 652*b–e* and 654*a* are connected to lines *a–e* of NAND gate 660. The non-inverted outputs of circuits 650*b–e* are connected to lines *b–e*, respectively of NAND gate 660. The inverted output 654*a* is connected to line *a* of the NAND gate 660. With this type of connection, when the logic in the CB buses is 11110, each of the lines *a–d* connected to the input of NAND gate 660 is logic 1. This produces a logic 0 output for the NAND gate 660 of the first phase module to activate this module. The other modules are connected to the outputs of decoder circuits 650*a–e* so that when their address as set forth in FIG. 5 appears on the CB buses, all of the inputs to the NAND gate 660 of that particular phase module are logic 1. This then actuates whichever phase module is being addressed by the CB logic. An example of this feature is shown with respect to module 94 which is schematically represented on FIG. 18 in block form. Referring to FIG. 5, the logic for the second phase module is 11101. Consequently, the circuits 650*a–e* must be connected to phase module 94 so that the logic appearing on bus CB01 is inverted. This can be seen in FIG. 18 wherein line *b* connected to phase module 94 is coupled with inverted output 654*b* of decoder circuit 650*b*. The remainder of the lines are with the non-inverted output of circuits 650*a*, 650*c*, 650*d*, and 650*e*. Consequently, when the second phase address is directed to the buffer circuit 90 through lines CB00–CB04, a NAND gate 660 in phase module 94 is actuated to produce a logic 0 output. This can be continued for the remainder of the phase modules so that they can be successively addressed for input and output of information. In one cycle each of the modules is addressed for input and output.

After a particular phase module has been actuated by 0 logic output from NAND gate 660 of the particular phase, the input and output circuits become active. To select whether information is to be sent from the module to the computer to indicate switch positions or from the computer to the module to indicate light actuations, there is provided a function selector circuit 670, shown in FIG. 18. This circuit includes NAND gates 672, 674 having inputs with inverters 680, 682, 684 and 686 connected to computer lines FB01, FB00 and IOEN. The output of circuit 670 is through lines 690, 692 connected to NOR gates 694, 696, respectively. NOR gate 696 has a second input 700 which is controlled by the IOST strobe through the inverters 702, 704. Referring now to the basic control NAND gate 660, its output 706 is connected to the input of NOR gate 694 which also receives the logic in line 690. NOR gate 708 receives the output of NOR gate 696 to produce an inverted logic in line 710 connected to the input of NOR gate 712, which also includes an input connected to the output line 706 of NAND gate 660. The output 714 of NOR gate 712 is coupled to the clock terminal C of four output flip-flops 616*a–d* having Q terminals connected to panel lights 92*d*, 92*c*, 92*a*, and 92*b*, respectively. The circuit as so far explained controls the output of coded information on the EB line to control the various lights on the panel. To input information from the switches on the panel, the output 720 of NOR gate 694 is connected to the input of NAND gates 722*a–f* each of which, except for NAND gate 722*f* is controlled by the position of one of the panel switches 92*e–g*.

Buffer 90 includes EB bus control circuits 730*a–f* coupled to data buses EB00–EB05, respectively. Circuits 730*a–f* function similar to the input-output circuits through control unit 14, and they include an output branch having inverters 732, 734 and an input branch including NOR gate 736 placed in series with a resistor R1 and transistor 737. All of the NOR gates 736 have an input coupled with line 690 from NAND gate 672 of the function selector circuit 670. A second input to each of these NOR gates are inputs 738*a–f* coupled to the output of NAND gates 722*a–f*, respectively.

Figure 18A:
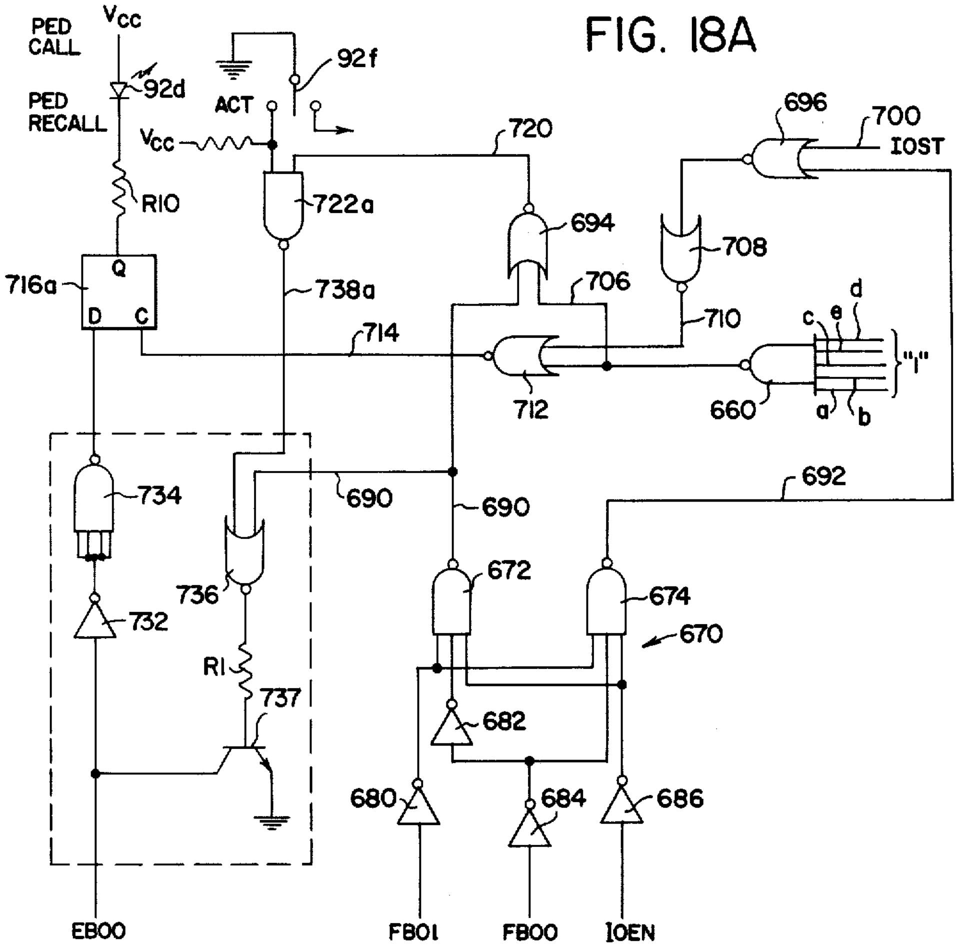
FIG. 18A is a logic diagram of a portion of the circuit shown in FIG. 18.

In operation, when the logic on FB00 is high and the logic on FB01 is low, i.e. input, information on the condition of the various switches 92*e–g* is transmitted through the EB data lines to the computer. When the function control buses FB-00 and FB-01 are both low, i.e. output, the computer information is directed from the EB data lines to the various lights 92*a–d*. FIG. 18A illustrates the input-output feature with respect to only the pedestrian call, recall light 92*d* and the vehicle actuation portion of switch 92*f*. These functions are controlled by flip-flop 716*a* and NAND gate 722*a*. It is appreciated that the other lights and switches are controlled with corresponding flip-flops and NAND gates, respectively. Assume that data is to be outputed from the computer to actuate light 92d shown in FIG. 18A. For the output function, buses FB00 and FB01 are at low logic. When the window created by IOEN appears, IOEN is also low logic. Consequently, low logic is applied to the three input terminals of the function selector circuit 670. Function bus FB00 is inverted twice before reaching the input of NAND gate 672. Consequently, the logic on line 690 is a logic 1. Since all inputs of NAND gate 674 are logic 1, the output of this NAND gate is logic 0. The logic 1 on line 690 is directed to the input of NOR gate 736. This latches the output to resistor R1 to a logic 0 which reverse biases transistor 737 and makes it non-conductive. Consequently, the EB00 line can float and its logic is not affected by transistor 737. This basically inhibits any input to line EB00 from switch 92*f*. However, there is another inhibitor also. Line 690 is connected to the input of NOR gate 694. Consequently, the logic 1 is applied to this NOR gate to produce a logic 0 output in line 720. This is directed toward the input of NAND gate 722*a* latching the output 738*a* to a logic 1. This logic 1 is directed through line 738*a* to the input of NOR gate 736. This is another latching input for this NOR gate. Logic 0 of line 692 is directed to the input of NOR gate 696. When line 700 receives the strobing pulse IOST through the two inverters 702, 704, the output of NOR gate 696 is a logic 1. This produces a logic 0 in line 710 which is applied to the input of NOR gate 712 which receives also the logic 0 from NAND gate 660. The two logic 0 into NOR gate 712 produces a logic 1 in line 714. This is applied to the clock terminal C of D-type flip-flop 716a so that the condition of the D terminal is transmitted to the Q terminal of the flip-flop. A logic 0 appears in line EB00 when light 92*a* is to be actuated. This logic 0 is inverted twice to produce a logic 0 at the D terminal of flip-flop 616*a*. Upon receiving the clock pulse in line 714 at the IOST pulse, a logic 0 is shifted to the Q terminal of flip-flop 716*a* grounding resistor R10 causing actuation of light 92*d*. If the light is to be flashing, there is provided a circuitry not shown for causing a pulsation from the input voltage $V_{cc}$. The same operation is used for directing information from the computer through the various other flip-flops 716*b–d*. If the light is not to be initiated, a logic 1, representing a not true condition, is directed to computer data bus EB00. This produces a logic 1 at the D terminal of flip-flop 716*a*. A clocking pulse in line 714 at the IOST pulse clocks the logic 1 condition to the Q terminal. This does not ground resistor R10 and, therefore, does not cause actuation of the light.

For inputting information from the various switches to the computer data lines EB00–EB05, function bus FB00 is high and function bus FB01 is low. This is shown in column 210 of FIG. 5. With this logic, double inversion of the logic on FB00 produces a logic 1 to the input of NAND gate 672. This provides a logic 0 on line 690. This unlatches NOR gate 694 so it can be controlled by logic on line 706. At the same time, a logic 1 appears in line 692 because the logic 1 of function line FB00 has been inverted only once before application to NAND gate 674. Logic 1 in line 692 is directed to the input of NOR gates 696 producing an output logic 0 which is inverted in line 710 by NOR gate 708. The logic 1 in line 710 latches the output 714 of NOR gate 712 to a logic 0, thus, preventing clocking of the flip-flop 716*a*. Consequently, there is no transfer of logic from the D terminal to the Q terminal of flip-flops. This inhibits operation of the lights during this particular cycle of the computer. With a logic 0 in both lines 690 and 706, the output 720 of NOR gate 694 is a logic 1. This unlatches NAND gate 722a for operation.

Assuming that the switch 92*f* is closed momentarily to create an actuation, the second input to NAND gate 722a is grounded. This produces a logic 0 at the input and a logic 1 in line 738*a* which is connected to the second terminal of NOR gate 736. The other terminal receives a logic 0 from line 690. Consequently, the output of NOR gate 736 is a logic 0 which reverse biases transistor 737. Line EB00 is thus released and allowed to produce an untrue logic which is a high logic to the computer control unit 10.

Assuming now that switch 92*f* is opened, this produces a logic 1 at the second input of NAND gate 722*a* corresponding to the voltage of $V_{cc}$. When this logic 1 is combined with the logic 1 of line 720, the output of NAND gate 722*a* is a logic 0. This is applied through line 738*a* to the second input of NOR gate 736 to create a logic 1. This forward biases transistor 737 and grounds line EB00. Since EB00 has a ground true logic, the computer senses the open condition of switch 92*f*. The other switches of the panel 20 operate in a similar manner using another one of the control circuits 730*b–f*.

Assuming now that the particular phase is not selected by the decoding circuits 650*a–e*. In this situation, at least one logic 0 is applied to the input of NAND gate 660. This produces a logic 1 in output line 706. This logic 1 latches NOR gates 694, 712 with a logic 0 output. Consequently, there can be no clocking of the flip-flops 716*a–d* and no operation of NAND gates 722*a–f*. A logic 1 always appears at the output of these NAND gates which releases transistor 737 from the various buses EB00–EB05. Since transistor 737 floats in all phases not addressed, a ground on EB-00 indicates that the addressed module switch is open and a floating EB-00 indicates that the switch is closed. It is noted that FIG. 18 contains only buses EB00-EB05; however, the other two buses can be used on the front panel for other functions.

The above operations of the front panel generally take place once each computer cycle which is 0.1 second. Consequently, the input and output appears to take place simultaneously from the external circuit of the module 92. This scanning operation is so rapid that the lights appear to be either steady on, flashing or off. The condition of the various switches is repeatedly inserted into the computer during cycling of the program and the existence of the input logic and function lines FB00, FB01.

Line 739 having a resistor R6 is connected to NAND gate 722f and produces an input on line EB05 only when a module is plugged into a given phase socket of controller B. The computer scans each socket and uses a particular socket only if a true is received from line 739.

RING STATUS MODULE

In some instances, it is desirable to provide a module adjacent one of the phase modules shown in FIGS. 1 and 2C for displaying, on a series of lights, the particular signalization being completed in a given ring including two or more particular phases. If a single ring is used, it would be possible to use a simple single module for indicating which signalization was being allocated at any given time in that single ring. In accordance with one feature of controller B, it is possible to use a plurality of rings in intersection A. To indicate the signalization in a particular ring in a multiple ring installation, it is possible to provide a module having the basic circuitry illustrated in FIG. 18B. This particular module is capable of displaying the signalization being carried out in three separate rings.

AS shown in column 212 of FIG. 5, addresses 16, 17 and 18 are employed for activating the ring status module for any one of three separate rings. Assume that the module or circuit is going to display a light indicating when the initial green is being timed for the first ring of a multiple ring traffic controller. Address 16 will appear in the CB lines. Coding of these lines is found in FIG. 5. The FB00 and FB01 function lines are both at logic 0 indicating an output function. Address 16 is then applied to the circuit shown in FIG. 18B to determine whether or not a particular function of the ring is active. A switch 900 has three positions and is shown in the first position. This applies a logic 1 to inverter 902 and a logic 0 to inverter 904 each of which has input resistors 902*a*, 904*b*, respectively. The output of the inverters 902*b*, 904*b*, respectively are directed to a set of gates including NAND gate 906, NAND gate 908, NOR gate 910 and NAND gate 912. These gates have outputs 906*a*, 908*a*, 910*a*, and 912*a*, respectively. A NAND gate 914 having an output 914*a* is controlled by line 910*a* and lines 654*a*, 652*b* which correspond to the inverted form of CB00 and the noninverted form CB01, respectively, as shown in FIG. 18. NOR gates 920, 922, 924 having outputs 920*a*, 922*a*, 924*a*, respectively, are controlled by the previously mentioned gates in FIG. 18B. The outputs of these NOR gates are directed through inverters 930, 932, 934 having output lines 932*a*, 932*b*, 932*c*, respectively, to a NAND gate 940 having an output 940*a*. This output is inverted by inverter 950 having an output 950*a*. The output decoded line 692 and the strobe line 700, explained in connection with the circuitry of FIG. 18, are directed to a NOR gate 960 having an output 960*a*, which is inverted by a NOR gate 962 having an output 962*a*. This output, together with output 950*a*, is directed to the input side of NOR gate 970 having an output line 970*a* directed to the clocking terminal C of a D-type flip-flop 980 having a D terminal connected to input lines 980*a* and a Q terminal connected to output line 980*b*. The output 980b controls the illuminated diode 990. It is appreciated that a plurality of flip-flops 980 could be provided to indicate the condition of several functions in a particular ring; however, for simplicity only the initial green light is illustrated. To add additional features to be read in a particular ring, additional parallel flip-flops controlled by line 970*a* could be provided.

In operation, the CB lines of the computer are directed to the circuitry shown in buffer circuit 90 of FIG. 18. These lines are decoded to provide either inverted or non-inverted form of the logic on the CB lines as previously discussed. Assume that address 16 is being provided to indicate that the conditions existing in the first ring are to be displayed in the circuitry shown in FIG. 18B. Switch 900 is in the position shown; therefore, the logic 0 appears in line 902*b* and a logic 1 appears in line 904*b*. The logic 0 is applied to NAND gate 912 latching the output 912*a* to a logic 1. This same logic 0 in line 902*b* is applied to NOR gate 910 to unlatch this gate. The logic 1 in line 904*b* is applied to NAND gate 908 and NOR gate 910. This produces a logic 0 in output line 910*a*. This is the coding provided by the manually controlled external switch 900. Referring now to the CB lines, NAND gate 906 receives the non-inverted form of CB02 in line 652*c*, the non-inverted form of CB03 in line 652*d* and the inverted form of CB04 in line 654*e*. The network for providing these logic forms is similar to the network employed to direct the coded signal to NAND gate 680 in FIG. 18. Reviewing FIG. 5, the logic applied to NAND gate 906 during ADD 16 produces a 0 output in line 906*a*. NAND gate 908 receives the non-inverted form of CB01 through line 652*b*, the non-inverted form of CBOO through line 652*a* and the logic 1 from line 904*b*. This produces a 0 logic in output line 908*a*. The logic 0 in line 906*a* applies a logic 0 to NOR gates 920, 922 and 924. This logic 0 combined with the logic 0 in line 908*a* produces a logic 1 in line 920*a*. Logic 1 in line 920*a* applies a logic 0 to NAND gate 940. This produces a logic 0 in line 950*a*. When the IOEN window appears, the logic 0 appears in line 692 when the FB lines are coded for the output of information from the computer. Logic 0 appears in line 700 during the IOST strobe which causes a logic 1 in line 960*a*. This produces a second logic 0 to the input of NOR gate 970. The two logic 0 inputs produce a logic 1 in line 970*a* to clock flip-flop 980. This transfers the logic from computer line EBOO to the output line 980*b*. If the logic in line EBOO is true, i.e. logic 0, line 980*b* is grounded. This activates light 990 indicating that for ring 1 the initial green period is being timed. The other EB lines contain other information for use in this series. Since there are eight of these lines, eight separate pieces of information can be simultaneously displayed by the circuit as shown in FIG. 18B by adding additional flip-flop circuits.

In general operation, address 16 appears which combines with the hard wired circuitry of switch 900 to produce a logic 0 in line 932*a*. Any other of the addresses 16, 17 or 18 would not produce this logic 0. Window IOEN has appeared at the same time as the address; however, nothing happens until the strobe IOST appears in line 700. This then strobes the NOR gate 970 to clock the flip-flops 980. If another ring is to be monitored by the circuit shown in FIG. 18B, switch 900 is changed to one of the other two positions. This produces a different logic in lines 902*b*, 904*b*. This different logic codes the gates 906–912 to properly decode the logic in the input lines to read a different ring. If the switch 900 were in another position, the address 16 would have no effect upon the NOR gate 970 even when the strobe appears. In either of the other positions, a logic 1 is applied to inverter 904. This produces a logic 0 in line 904*b*. This logic 0 produces a logic 1 in line 908*a* to cause a logic 0 in line 920*a*. If the logic in line 902b is logic 0 of logic 1, there is still no effect on the NAND gate 940.

Figure 18B:
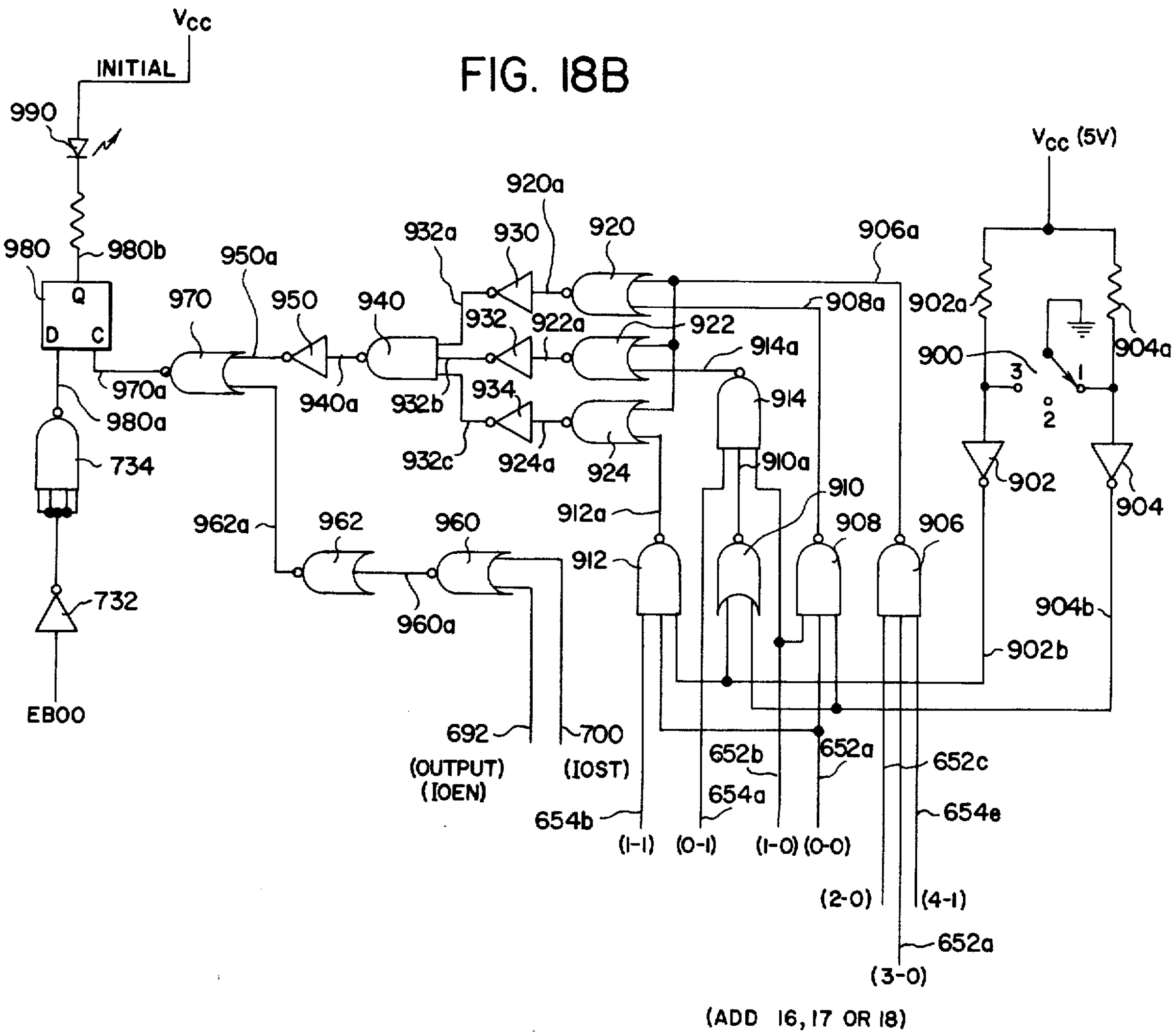
FIG. 18B is a logic diagram showing schematically the operation of a ring status module to be used in a controller.

In practice, the circuit shown in FIG. 18B is constructed in modular form and has a number of output indicator lights for each of the phases as shown in FIG. 1. This module has sufficient terminals to correspond with the terminals of the phase modules so that they can be plugged into the same areas as the phase module for proper operation. It is noted that the inputs from the CB lines through the circuit shown in FIG. 18B passes through the buffer circuit 90 as does the information to the phase module 92, as shown in FIG. 18. This allows proper coding of the CB lines for identifying the operation of either the phase module or the ring status module.

TIME-FEATURE DISPLAY AND CONTROL PANEL

Referring now more specifically to FIGS. 4A–C and 19A–B, the circuitry contained on the time-feature display and control panel 22 is set forth in detail. The circuitry will be explained with certain aspects of its operation before going into the basic operation of front panel 22.

Figure 19A:
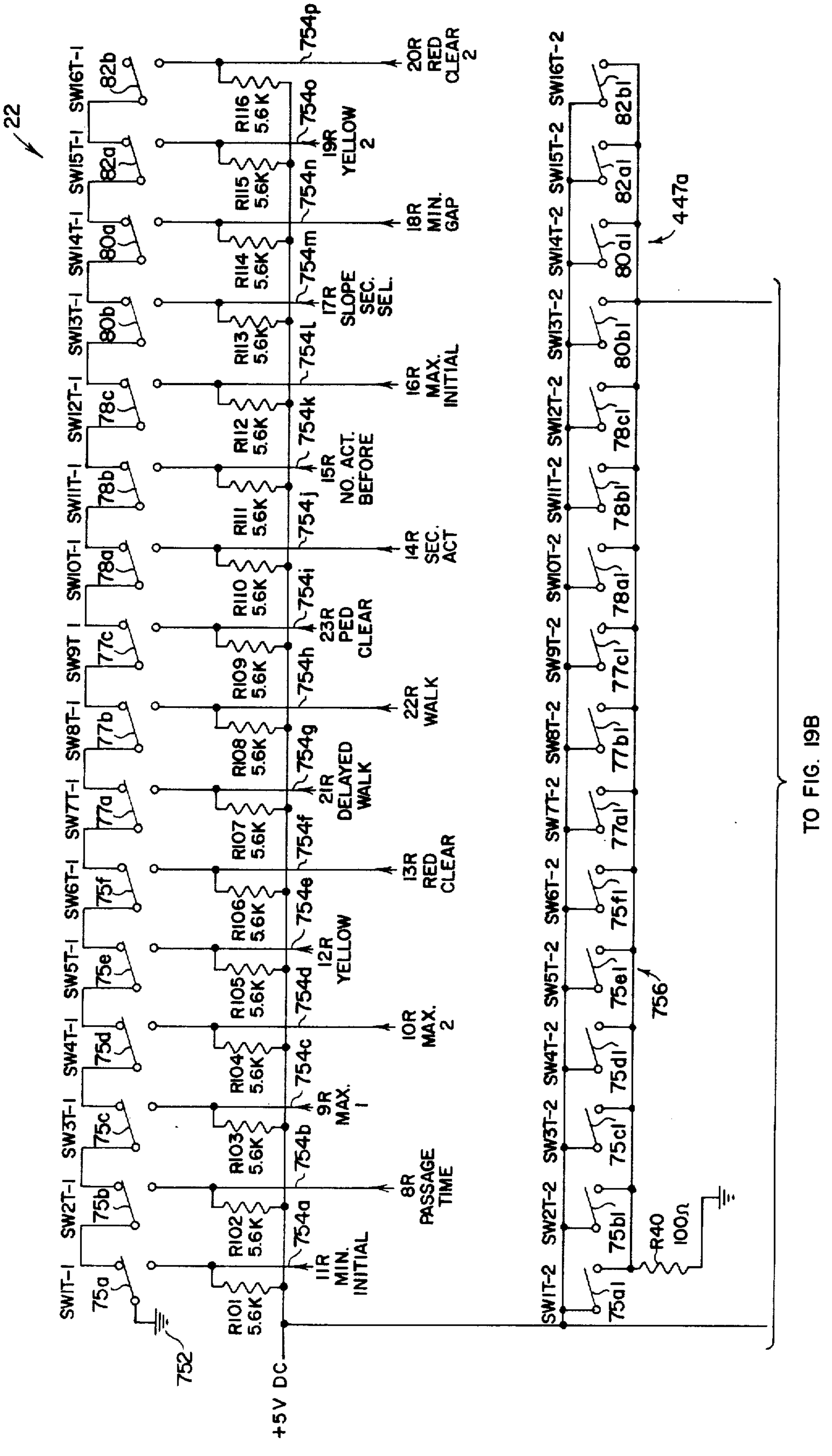
FIGS. 19A–B are wiring diagrams of the switch networks employed in the time-feature and control panel shown in FIG. 2.
Figure 19B:
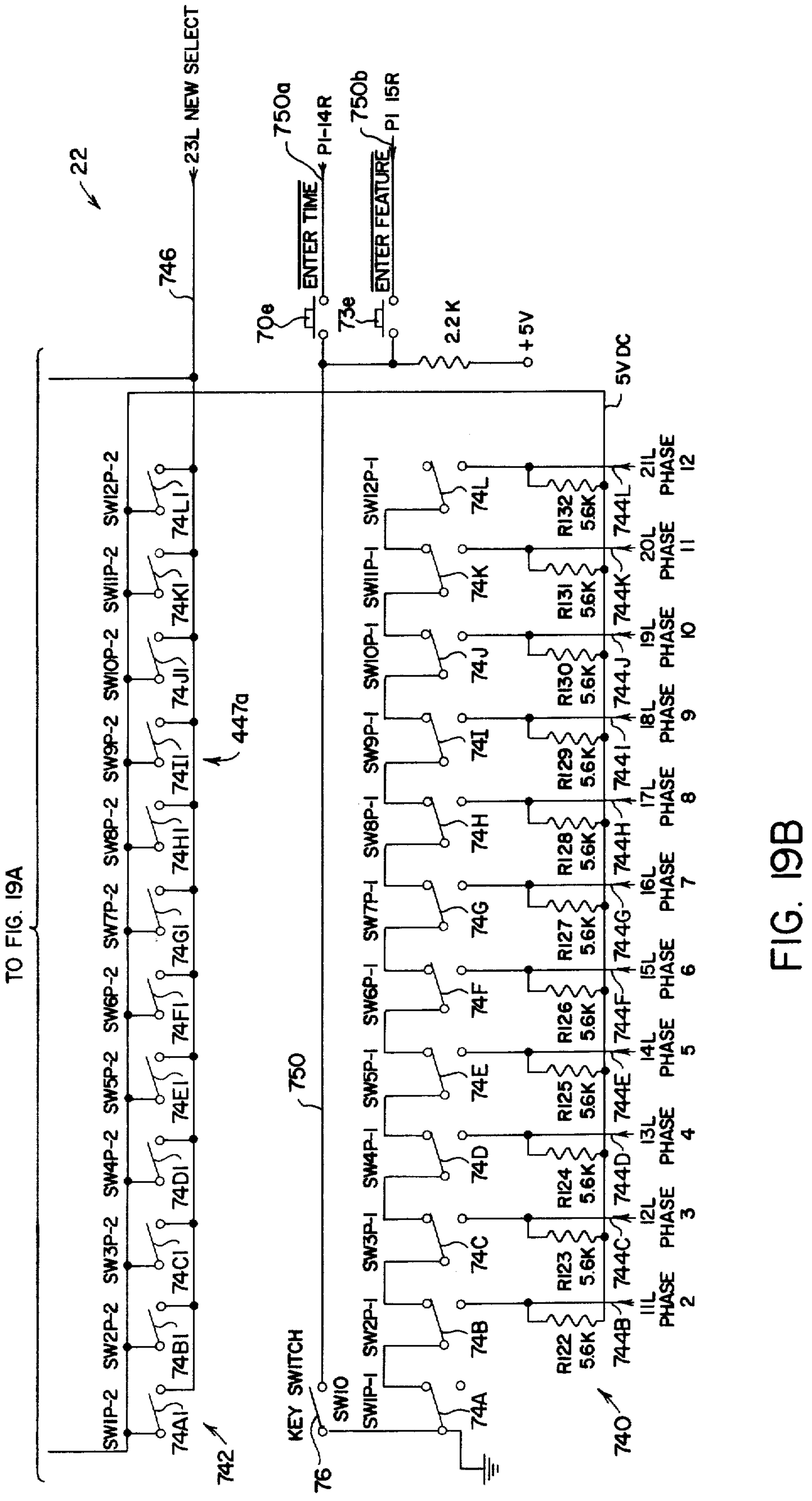

Referring now to FIGS. 19A, B which are to be taken together, the details of the phase select switches of subpanel 74, as shown in FIG. 2A, are found in switch networks 740, 742. Network 740 shows the phase select switches 74A–L having an upper position and a lower position. The output for phases 2–12 are contained on lines 744B–L. When one of the switches 74B–L are moved to the downward position, the corresponding output line 744B–L is grounded. In the up position, these ouput lines are connected to a 5 volt d.c. power supply through resistors R122–R132. Consequently, when a switch is depressed, i.e. moved to the downward position, a logic 0 is placed on the associated output line 744A–L. When the switch is not depressed, i.e. the switch is in the upward position, the output line for the particular phase has a logic 1. It is noted that switch 74A does not have an output line. If a phase is being selected and phases 2–4 have a logic 1, this is indicative of selecting phase 1. In this manner, an output for the first phase is not required and this phase is automatically selected if no other phase is actuated. Switch network 742 includes switches 74A1–74L1 corresponding to the switches in network 740, and the switches in network 742 are operated in conjunction with the switches of network 740. When a switch in network 740 is actuated, one of the switches in network 742 is momentarily closed. This applies a logic 1 of approximately 5 volts to output line 746 which is the new select line for setting new select flip-flop circuit 440, shown in FIG. 3E, to a logic 1 output for subsequent sensing by NAND gate 450 and ADD 22. As pressure is released from a switch in subpanel 74, the new select switches are again opened. Only a momentary pulse is required to set the flip-flop circuit 440. Associated with network 740 is the enter time button 70*e* and the enter feature button 73*e*. When key switch 76, which is the enabling switch, is closed, actuation of switch 70*e* places a logic 0 on line 750*a*. This line sets the enter time flip-flop 400, shown in FIGS. 3E, to a logic 1 output on lines 412 for sensing by NAND gate 140 at ADD 24. In a similar manner, if the enter feature button 73*e* is depressed, a logic 0 is applied to output line 750*b*, which is used to set a logic 1 output in the enter feature flip-flop 420 shown in FIG. 3E. The push buttons in subpanel 74 are interconnected similar to a push button radio so that only one button can be depressed at once. Depressing of one button opens switch associated with a previously depressed button. If two switches are accidentally pushed together, only the one on the left in FIG. 19B is grounded.

Referring now to FIG. 19A, a similar dual switch network arrangement is illustrated. The main switch network 752 contains switches 75*a–f*, 77*a–c*, 78*a–c*, 80*a*, 80*b*, 82*a*, and 82*b* of panel 22 shown in FIG. 2. Associated with these switches are output lines 754*a–p*, respectively. When one of these switches is open, a positive logic is applied to the output line. When the switch is closed, the output line is grounded to produce a logic 0 output. As in the case of the switches in subpanel 74, the switches in network 752 includes corresponding switches 75 al–fl, 77 al–cl, 78 al–cl, 80 al–80 bl, 82 al, and 82 bl in an auxiliary switch network 756. When one of these switches in network 752 is closed, a mechanical interconnect momentarily depresses the corresponding one of the switches in auxiliary network 756. This produces a 0 logic on the new select line 746. This 0 logic is inverted by inverter 447 on FIG. 3E to set the new select flip-flop 440 as previously mentioned. Only one of the switches in network 752 is to be closed at any one time; therefore, there are mechanical interconnects to open one switch when the other is closed. Several well known structures are available for the interconnect of switches in panels 740, 752.

Figure 4A:
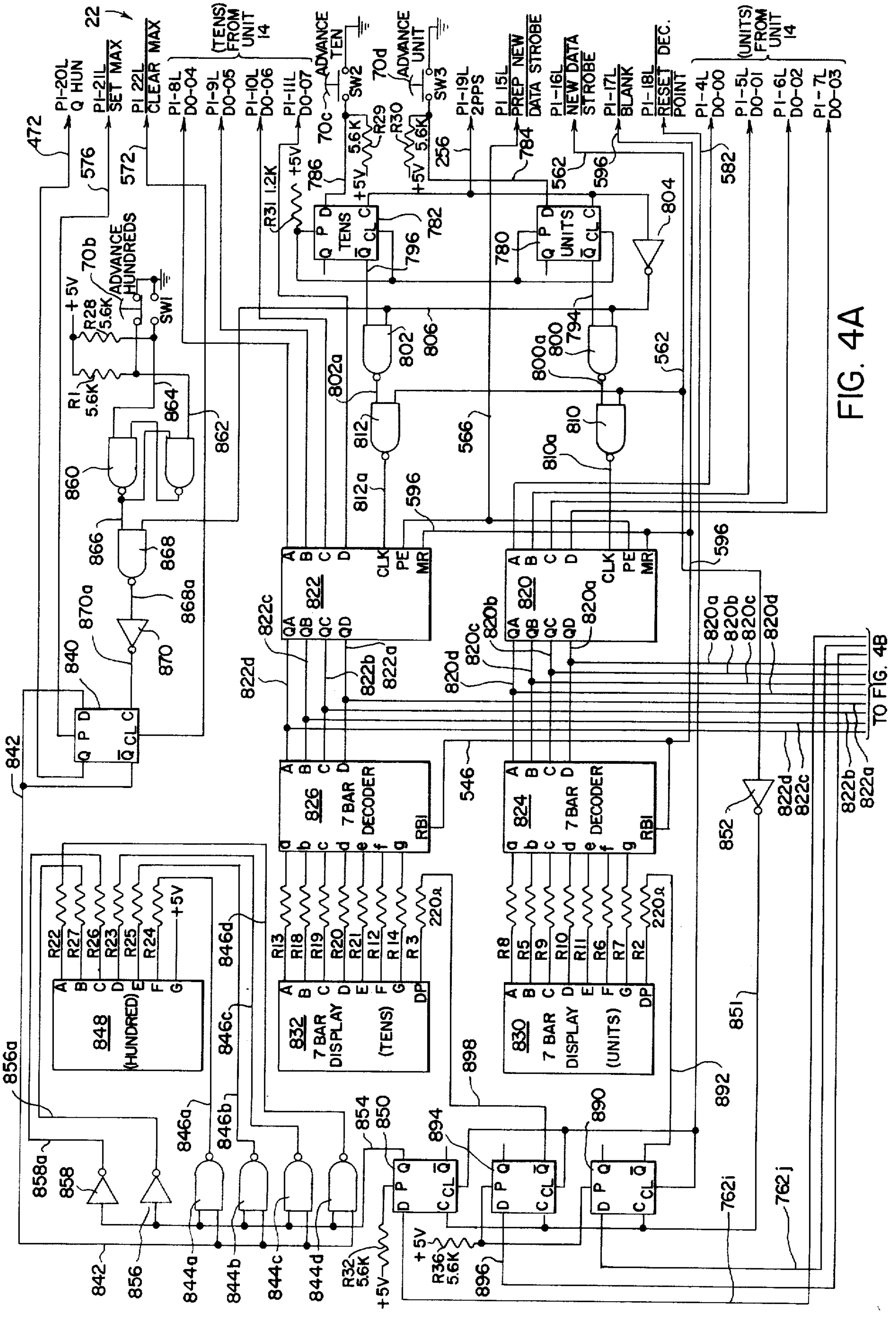
FIGS. 4A–C show the circuits incorporated in the time-feature display and control unit shown in FIG. 2.
Figure 4B:
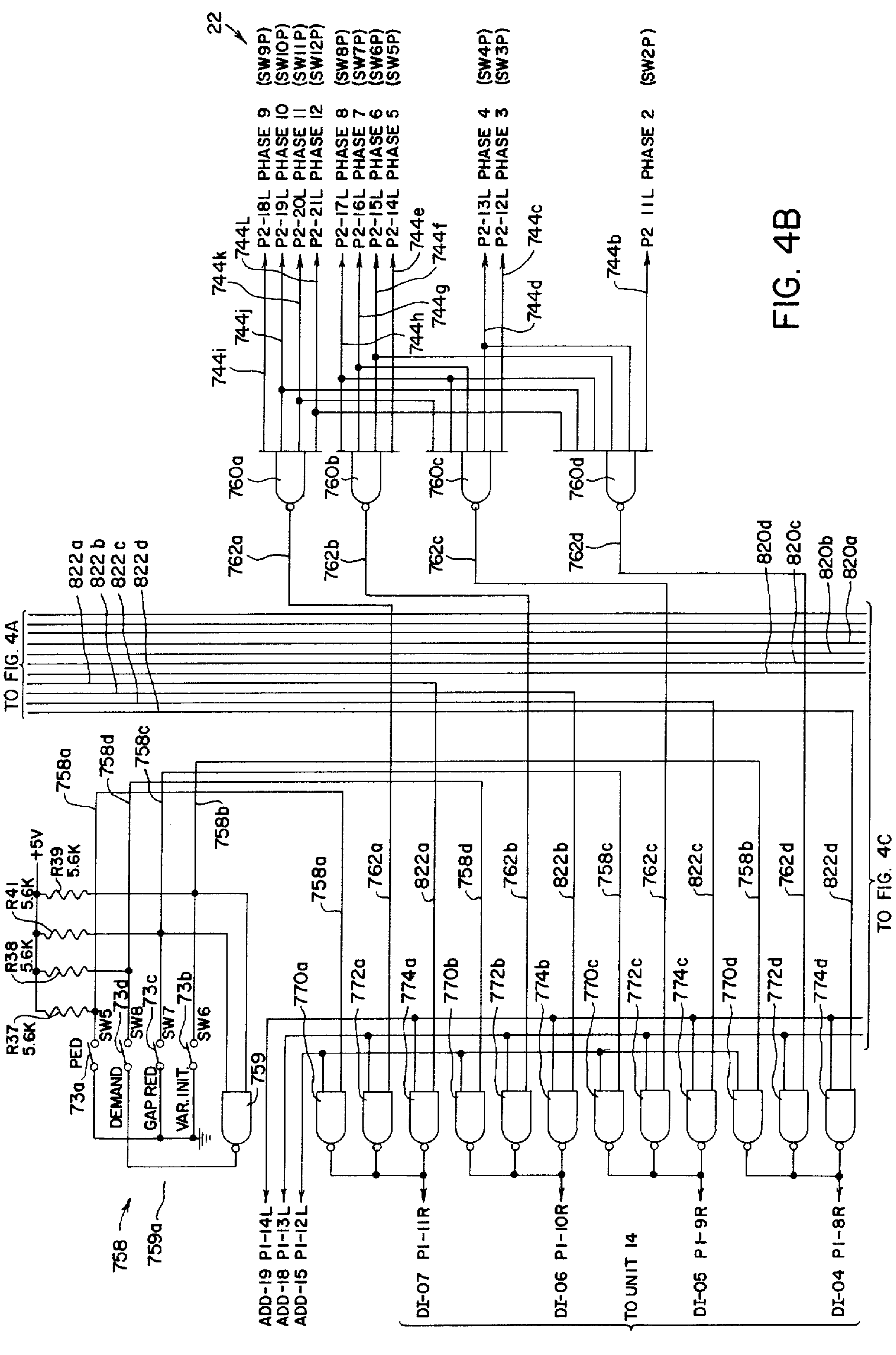
Figure 4C:
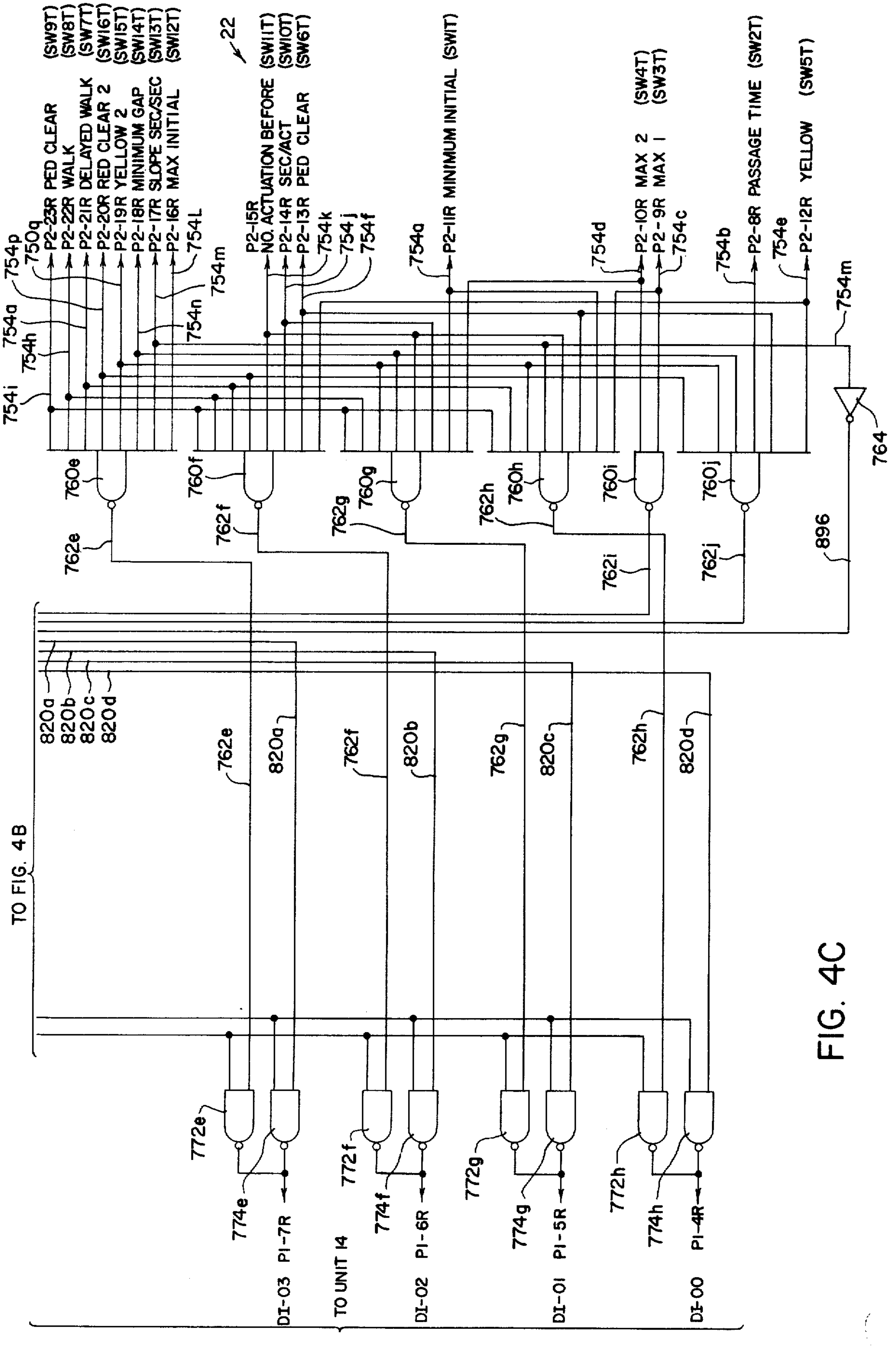

Referring now to FIGS. 4A–C, showing the details of the circuitry associated with panel 22, the right hand input lines shown in FIGS. 4B–C are connected to the switches in networks 740, 752. To show this interconnection, the output lines for these networks are identified with their appropriate function designation in these two figures. The left hand portions of these figures show input lines DI-00 through DI-07 which are connected to the correspondingly designated lines in the control unit 14, as best shown in FIG. 3D. In the transfer of logic from the switches to the input data lines, there are provided NAND gates 760*a–h* with corresponding outputs 762*a–h*. NAND gates 760*i*, 760*j* have outputs 762*i*, 762*j*, respectively, which are connected to circuitry of FIG. 4A, for a purpose to be described later. In a similar manner, inverter 764 inverts the signal from input line 754*m* associated with subpanel switch 80*b*, and directs this inverted signal to other circuitry of FIG. 4A.

Switch network 758 shown on FIG. 4B contains the buttons 73*a–d* of subpanel 73 shown in FIG. 2A and is used to enter features into the digital computer C when certain standard features are desired for the controller B. This switch network includes output lines 758*a–d* associated with the respective toggle switches 73*a–d*. A NAND gate 759 has an input connected with output lines 758*b* and 758*c*. These lines are associated with the gap reduction and variable initial special features. If either switch 73*b* or 73*c* is closed, one of the inputs to NAND gate 759 is grounded to logic 0. This produces a logic 1 output in line 759*a* directed to switch 73*b* associated with the demand mode of operation. Consequently, when a logic 1 appears on line 759*a*, the closing of the demand switch 73d maintains a 5 volt signal on line 758*d*. Thus, the switch 73*d* is inoperative. if neither switch 73*b* or 73*c* is closed, a logic 1 appears in lines 758*b*, 758*c* which logic is directed to the input of NAND gate 759. This produces a logic 0 in line 759*a*. Consequently, closing of switch 73*d* then directs a ground or logic 0 signal through line 758*d*. Consequently, the demand mode of operation can be programmed only if both the gap reduction and variable initial modes are inoperative.

When switch 73*e*, shown in FIGS. 2A and 19B, is depressed and the switch 76 is closed, the logic of the switch network 758 is transferred to the memory unit 12 to indicate whether or not the various standard features are to be incorporated into the computer program cycle. If a toggle switch in subpanel 73 is in the activated, upper position, this feature is entered. In a like manner, if one of the toggle switches is in the downward position, the subroutine for the associated standard feature is not entered into the memory unit 14 for processing by the computer. To accomplish this, when switch 73*e* is closed, a logic 0 appears in line 750*b*. Referring now to FIG. 3E, this logic 0 in line 750*b* creates a logic 1 in output line 432 of NAND gate 422. When the computer program, in the enter feature subroutine, senses address 25, the set condition of flip-flop 420 is read. This then requires the program to enter the information on network 758 into the memory through NAND gates 770*a–d* when address 15 appears. The external control signal EXC at address 25 then resets the enter feature flip-flop. The flip-flop 420 remains reset until the enter feature button 73*e* is again depressed in conjunction with the closing of switch 76. To remove a standard feature subroutine, the toggle switch corresponding to that routine is moved into the inactive, downward position. The enter feature button 73*e* is then depressed. This sets the enter feature flip-flop. This then causes the address 15 at the input command to again decode network 758 to insert the condition of the various toggle switches into the memory unit 12. This then indicates whether or not any of the previously inserted standard features have been removed by the network 758. It is appreciated that the closing of switch 73*e* whith switch 76 causes the computer to read the condition of network 758 to insert or remove subroutines corresponding to the various features. If the subroutine is inserted an appropriate light on panel 22 is lighted for the particular phase in which the feature has been inserted. The special features are inserted into a particular phase determined by the setting of the switches in network 740 shown in FIG. 19B. The setting of these switches is decoded and directed to the memory through NAND gates 760*a–d* and NAND gates 722*a–d* at address 18. The coding of these NAND gates indicates the particular address of the memory into which the coded condition of network 758 is to be inserted so that it corresponds to a particular phase directed by a switch on subpanel 74, shown in FIG. 2A.

To control the information contained on lines DI-00 through DI-07 there are provided NAND gates 770*a–d* controlled by address ADD 15, NAND gates 772*a–h* controlled by address ADD 18, and NAND gates 774*a–h* controlled by address ADD 19. When the addresses 15, 18 or 19 are logic 1, the respective NAND gates are receptive to input information from the various switches and from the circuits disclosed on FIG. 4A.

Referring now more particularly to FIG. 4A, this figure primarily illustrates the circuitry for displaying and changing the digits in window 70*a* of subpanel 70 shown in FIG. 2A. Consideration will first be given to the circuitry for displaying the units and tens digit appearing in this window. D-type flip-flops 780, 782 have their preset terminals P and reset or clear terminals CL connected to a 5 volt power supply. This prevents presetting or resetting of the flip-flops. The D terminals are normally coupled through lines 783, 786, respectively, with a 5 volt power supply. this applies a logic 1 to the D terminals under normal conditions. To change this condition, manually operated advance buttons 70*d*, 70*c* are used to ground lines 784, 786, respectively. The buttons are shown in FIG. 2A. The $\overline{Q}$ terminals of flip-flops 780, 782 are coupled by lines 794, 796, respectively, to the input side of NAND gates 800, 802, respectively. The other inputs of these NAND gates are coupled with the 2 pps line 256 through an inverter 804, for a purpose to be described later. This pulse line 256 is also connected to the clocking terminals C of flip-flops 780, 782. The outputs 800*a*, 802*a* of NAND gates 800, 802 are coupled to the inputs of NAND gates 810, 812 having outputs 810*a*, 812*a*, respectively, connected to the clock terminals of combined latch counters 820, 822. The counters 820, 822 accept binary logic from the DO lines, which are coded to represent a numerical value in the memory unit 12 and at a selected memory address. This acceptance is made possible by the prior resetting of the counters by the blanking pulse in line 596 applied to terminals MR. Then the Prepare for New Data Strobe appears and while in existence, the short New Data Strobe clocks the counters to insert the data then appearing in the DO lines. This initial clocking is by directing a logic 0 to NAND gates 810, 812. After the initial clocking of the DO line logic into counters 820, 822, additional clocking pulses created in lines 810*a*, 812*a* by flip-flops 780, 782, up count the output logic of counters 820, 822 by 1 digit upon each positive pulse.

Latch counter 820 transfers the unit binary code on output lines DO-00 through DO-03, or any up counted change thereof, to output lines 820*a–d*, which are connected to the input of a 7-Bar decoder 824. In like manner, latch counter 822 transfers the binary code of the tens digit appearing in output lines DO-04 through DO-07, or any up counted change thereof, to output lines 822*a–d*, which are directed to the input of a second 7-Bar decoder 826. The 7-Bar decoders are standard components receiving the appropriate logic from the latch counters and transmitting it to standard 7-Bar display units 830, 832. It will be noted that the outputs 822*a–d* are also coupled to the inputs of NAND gates 7741–*d*, respectively, shown in FIG. 4B, and the outputs 820*a–d* of decoder 820 are also coupled with the inputs of NAND gates 774*e–h* shown in FIG. 4C. The purpose of these interconnections will be explained later in connection with changing the memory condition for manually changing the time settings and other information displaced in window 70*a*.

Referring now to FIGS. 20A–C, the operation of the circuitry for advancing the output of latch counters 820, 822 is set forth in detail. Since the operation of counters 820, 822 are identical, FIGS. 20A–C relate only to the operation of counter 820. This description applies equally to the tens counter 822. Referring now to FIG. 20A, this figure illustrates the logic condition before a strobe is received on New Data Strobe line 562 and with advance switch 70*d* open. As shown in FIG. 3B. strobe line 562 is a logic 0 when in existence. Consequently, it is illustrated as inverted logic. During non-existence, line 562 has a logic 1. Since the D terminal of flip-flop 780 is a logic 1 with switch 70*d* open, the first positive going pulse in line 256 transfers the D terminal logic to the Q terminal. This produces a logic 1 at the Q terminal and a logic 0 at the Q terminal. Logic 0 applied to the input of NAND gate 800 through line 794 latches the NAND gate to an output logic 1 in line 800*a*. This logic 1 combined with the logic 1 on the data strobe line 562 causes NAND gate 810 to have an output on line 810*a* of logic 0. Consequently, there is no clocking pulse to the decoder 820. Pulses on line 256 are inverted on line 806; however, they have no effect because of the latched condition of NAND gate 800. Referring now to FIG. 20B, with the switch 70*d* still open, a New Data Strobe signal is applied to line 562. This produces a logic 1 to the clocking terminal CLK of counter 820 to activate the counter for transferring the logic on the DO lines to the QA–QD terminals of counter 820. This applies the memory binary code to the 7-Bar decoder 824. Still the pulses on line 256 have no effect because gate 800 is still latched by the 0 logic in line 794. This is a steady state condition for the display of the memory condition in window 70*a* shown in FIG. 2A.

If it is desired to change the output logic of the counter 820 and display a new units digit in window 70*a*, it is necessary to pulse the clocking terminal CLK of counter 820. This can be done by manually depressing switch 70*d* as shown in FIG. 20C. When this happens, the D terminal of flip-flop 780 is grounded. On the first positive going pulse in line 256 the logic 0 at the D terminal is transmitted to the Q terminal. This produces a logic 1 at the $\overline{Q}$ terminal connected to line 794. This unlatches NAND gate 800 so that the 2 pps pulsing cycle can appear in output line 800*a*. Since the strobe line 562 includes the IOST which is combined in NAND gate 234 of FIG. 3B, it exists only for 100 ns and is logic 1 during the remainder of the time. this unlatches NAND gate 810, as shown in FIG. 20C, so that the pulses can appear in line 810*a* for up counting the output of counter 820. This up counting appears in the 7-Bar decoder 824 and in the 7-Bar display 830. Consequently, when depressing the button 70*d*, every half second the output display in the 7-Bar display 830 is counted up by 1. Of course after reaching nine, it again goes to zero. There is no interconnection between the unit and the tens; therefore, it is necessary to up count both the unit digits and the tens digits to produce a new number with both digits changed. Inverter 804 inverts the 2 pps signal in line 256 so that the input to NAND gate 800 is always a logic 0 when the pulse is a logic 1. This prevents simultaneous unlatching of gate 800 with the changing of logic on line 794. This prevents any possible error due to the exact time the button 79*d* is depressed.

In controller B the most significant digit appearing in window 70*a* of FIG. 2A occurs when MAX 1 or MAX 2 is to be displayed on the panel 22. This value will be either digit 0 or digit 1; therefore, a complex display unit is not required for the most significant digit. As shown in FIG. 4A, a hundreds D-type flip-flop 840 has ist preset terminal P connected to the $\overline{\text{SET MAX}}$ line 576. The $\overline{\text{CLEAR MAX}}$ line 572 is coupled to the reset or clear terminal CL of flip-flop 840. The Q terminal is coupled with the Q hundreds line 472 connected as one input to the sense NAND gate 470 shown in FIG. 3E and in FIG. 13. When logic 1 appears at the Q terminal, the NAND gate 470 can be sensed to set the internal flip-flop of digital computer C through line EBOO, as previously discussed. A logic 0 on line 472 has no effect on the NAND gate 470. Line 842 directs the logic of the $\overline{Q}$ terminal of flip-flop 840 to the D terminal of the flip-flop and to NAND gates 844*a–d* having outputs 846*a–d*, respectively. These outputs are connected to the F, E, D, and A terminals of a 7-Bar display unit 848. A logic 0 in line 842 latches the NAND gates 844*a–d* to produce a logic 1 output in lines 846*a–d*. This prevents actuation of the display 848 with respect to four of its seven display diodes or bars. It is appreciated that the 7-Bar display 848 only requires the operation of six bars to form either a hundreds digit of 1 or 0. Six bars around the periphery form the digit 0. Two bars at one side of the display form the digit 1. Consequently, if bars A, D, E and F are inhibited by ones in lines 846*a–d* and bar G is permanently blanked, only two of the bars can be lighted. This would display a digit 1 output. On the other hand, if a logic 1 appears in line 842, NAND gates 844*a–d* are not latched and can be controlled, as will be explained later, to activate all six bars of the display unit 848 to form the digit 0.

Flip-flop 850 provides the control over NAND gates 844*a–d*. This flip-flop has its preset terminal P connected to a 5 volt supply so that there can be no preset. The clear terminal CL is connected to line 582 which is the Reset Decimal Point line. when this line is logic 0 which occurs at EXC-IOST for address ADD 20, flip-flop 850 is cleared, for a purpose to be discussed later. The clocking terminal C of flip-flop 850 is connected to line 851 including an inverter 852 for inverting the new Data Strobe line 562. Consequently, when a logic 0 appears on the new Data Strobe line at DOX-IOST for address ADD 19, line 851 becomes logic 1 to clock the logic at the D terminal to the Q terminal of flip-flop 850. The D terminal logic is provided from line 762*i* to the output of NAND gate 760*i*. This NAND gate has a logic 1 output whenever either switches 75*c*, 75*d* are depressed on the front panel 22 to display MAX 1 or MAX 2. The Q terminal of flip-flop 850 is connected to line 854 for controlling NAND gates 844*a–d* when a logic 1 appears in line 842. Line 854 also drives inverters 856, 858 having outputs 856*a*, 858*a* connected to terminals B, C, respectively, of display unit 848. This completes the description of the circuitry for displaying either logic 0 or logic 1 in the most significant digit displayed in window 70*a*, of FIG. 2A.

In operation, assume that the MAX 1 value for a particular phase is to be displayed and it inculdes the digit 1 for the most significant digit. the memory at EXC address ADD 18 would produce a SET MAX logic 0 in line 576. This logic 0 would cause the Q termianl of hundreds flip-flop 840 to be high to bring the $\overline{Q}$ terminal low. With this terminal low, line 842 has a logic 0 which inhibits NAND gates 844*a–d*. Consequently, only terminals B, C, of display 848 can be actuated. This actuation would produce a digit 1 in the most significant digit. However, this digit is not yet displayed. Switch 75*c* shown in FIG. 19A is depressed to read into display 848 the particular set digit of MAX 1 for the phase selected by a switch in subpanel 74. Consequently, line 762*i* is a logic 1 which is applied to the D terminal of flip-flop 850. When the New Data Strobe line 562 is strobed by an IOST pulse to provide a logic 0, a logic 1 appears in line 851. This clocks flip-flop 850 to transfer the logic 1 from the D terminal to the Q terminal. Consequently, logic 1 appears in line 854.

This logic has no effect upon NAND gates 844–*d* because they are latched to a logic 1 output by the logic 0 appearing in line 842. However, the logic 1 in line 854 is inverted by inverters 856, 858 to actuate bars B and C of the display 848. This procedure displays these two bars which represent the most significant digit 1. The other two digits in this operation could be controlled by the 7-Bar display units 830, 832.

Assume that the particular selected MAX 1 time did not include a digit 1 in the most significant digit. In that case, address ADD 19 is activated to produce a logic 0 in line 572. This line is connected to the reset or clear terminal of flip-flop 840. The output line 842 is a logic 1 which is applied to the NAND gates 844*a–d*. This unlatches the NAND gates. Consequently, when a logic 1 exists in line 854, each of thee NAND gates 844*a–d* has a logic 0 output. This grounds terminals F, E, D and A to combine with the previously grounded bars B, C to form a zero in the most significant digit displayed at window 70*a*.

As in the case of the tens and units, the hundreds digit of window 70*a* may be changed manually from that displayed by the process mentioned above. To accomplish this, there is provided a flip-flop 860 having inputs 862, 864. The first of these flip-flops is normally grounded and the second is normally connected to a 5 volt power supply. Output 866 of flip-flop 860 is connected to the input of NAND gate 868 having an output 868*a*. The logic of this output is inverted by an inverter 870 having an output 870*a* connected to the clocking terminal C of the hundreds flip-flop 840.

During normal operation, the manually controlled switch 70*b* is in the position shown in FIG. 4A. In this position, a logic 0 appears in line 862. This produces a logic 0 in output line 866. Consequently, NAND gate 868 is latched with a logic 1 output. This logic 1 output is inverted by inverter 840 to produce a logic 0 at the clocking terminal C. Consequently, no clocking takes place. Assume now that the digit displayed in window 70*a* is to be altered. Switch 70*b* is moved to the downward position grounding line 864 which causes line 862 to have a logic 1. In this condition, the output 866 of flip-flop 860 is a logic 1. This unlatches NAND gate 868 so that the 2 pps clocking pulse on line 806 is applied to the input of the NAND gate 868 and produces a pulsating output on line 868*a*. This clocking pulse is applied to the clock terminal C causing the flip-flop 840 to change states upon each positive going pulse. This alternately places a logic 1 or a logic 0 in display unit 848. Switch 70is then released and is spring biased to move upwardly. It is relased when the proper value is displayed in window 70*a*. The clocking of flip-flop 840 is made possible by connecting the $\overline{Q}$ terminal to the D terminal so that the D terminal always contains a logic opposite to the Q logic of flip-flop 840. The value of the new hundreds digit is inserted into the memory through Q hundreds line 472 and sense NAND gate 470.

Some of the time settings to be displayed in window 70a have a least significant digit of 0.1 second; therefore, it is necessary to allow insertion of a decimal point between the least the next least significant digits. To accomplish this function, FIG. 4A shows a flip-flop 890 having its preset terminal P connected to a 5 volt power supply. The reset or clear terminal CL is connected to the Reset Decimal Point line 582 which produces a logic 0 when address ADD 20 is activated as shown in column 214 of FIG. 5. The D terminal of flip-flop 890 is connected to line 762*j* which is the output of NAND gate 760*j* shown in FIG. 4C. The inputs to NAND gate 760*j* are those functions which are timed in 0.1 second increments. Although various features could be so timed, in accordance with the illustrated embodiment of the present invention, the features are red clearance 2, yellow clearance 2, minimum gap, passage time, red clearance and yellow clearance. When a switch on panel 22 corresponding to any of these features is closed, a logic 0 appears at the input of NAND gate 760*j*. This produces a logic 1 in line 762*j* so that the D terminal of flip-flop 890 is a logic 1. When the New Data Strobe pulse, which is the logic 0, appears in line 582, at the IOST pulse, the logic 1 on the D terminal is transferred to the Q terminal. This produces a logic 0 at the $\overline{Q}$ terminal connected to line 892. This grounds terminal DP of the 7-Bar display unit 830 causing a decimal point to appear between the least significant and next least significant digit in window 70*a*. If the function being displayed in window 70*a* is not one of the functions which requires a decimal point, then the output line 762*j* has a logic 0 which causes the logic 1 to appear in line 892. The DP terminal is thus not grounded and not actuated in 7-Bar display 830. In only one case in the operation of controller B is there to be a decimal point in the position between the most significant digit and the next most significant digit. This occurs when the display in window 70*a* is a slope in sec/sec. To display this decimal point when switch 80*b* of panel 22 is closed, there is provided a flip-flop 894 having its preset terminal coupled with a 5 volt power supply. The clear or reset terminal CL is coupled with Reset Decimal Point line 582, and the D terminal is attached to line 896 at the output of inverter 764, shown in FIG. 4C. The clocking pulse for flip-flop 894 appears on line 851, which is the inversion of the New Data Strobe line 562. When switch 80*b* in subpanel 80 of FIG. 2A is depressed, line 754*m* is grounded. This produces a logic 1 in line 896 to that a logic 1 appears at the D terminal of flip-flop 894. Upon receiving a strobing pulse from line 851, the logic 1 is transferred to the Q terminal. In this manner, a logic 0 appears at the $\overline{Q}$ terminal which is connected with the DP terminal of 7-Bar display 832 by line 898. This 0 logic grounds terminal DP to actuate the decimal point appearing between the most significant and the next most significant digit in window 70a.

Figure 21:
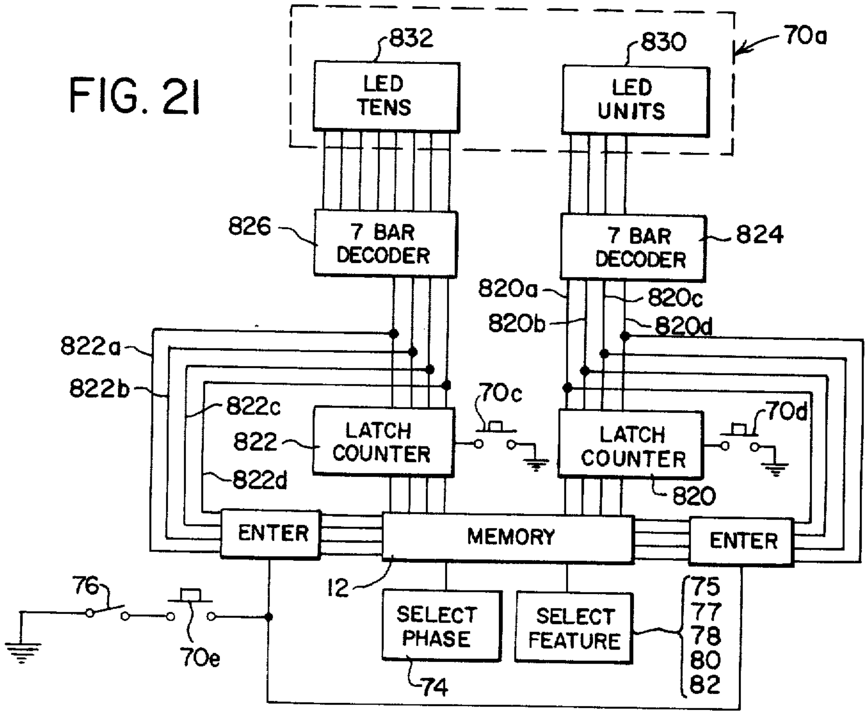

Referring now to FIG. 21, a schematic representation of the basic operating characteristics of the front panel 22 are illustrated in block diagram form. When a switch in subpanel 74 is closed, a particular phase is selected to have its function displayed in window 70*a*. Then, one of the several switches in subpanel 75, 77, 78, 80 or 82 is also depressed. This indicates a particular feature which is to be displayed in window 70*a*. For instance, if the yellow time for phase 4 were to be displayed, an operator would depress button 74*a*, shown in FIGS. 2A and 19B, and also button 74*e*, shown in FIGS. 2A and 19A. NAND gates 7601–*d*, shown in FIG. 4B, decode the phase selection panel 74. Since a logic 0 would appear on line 744*d*, the output of these NAND gates would be, reading from top to bottom, 0011. These codes are transferred through lines 7621–*d* to NAND gates 774*a–d*. Upon receipt of address ADD 18 for an input function, as shown in column 210 of FIG. 5, the coding of the NAND gates 760*a* is transferred through the control unit 14 to digital computer C. This addresses the particular phase for which the memory condition is to be displayed. It is noted that the computer coding on the CB line for phase 4 is HLHH. It is noted that this does not correspond to the coding of NAND gates 760*a–d*. The reason for this is that there is no coding of phase 1 because the computrer automatically recognizes this phase by the absence of the other phases; therefore, the internal coding for the selected phase 4 module is actually identified as computer phase 3 which is HHLL. This is the inverse of the coding on NAND gates 760*a–d* when switch 74*a* is closed. This complimenting of the phase coding is of no moment. The concept is to decode the network 76 so its proper logic in memory can be located.

Upon closing of switch 75*e* shown in FIG. 19A, NAND gates 760*e–h* are coded to transmit the proper coding representing the yellow function to NAND gates *772e–h*. Using these two words of information from the networks 740–752, the proper memory location for the yellow time of phase 4 is located and transmitted to the latch counters or decoding flip-flops 820, 822. This information is directed through output line DO-01 through DO-07 as shown in FIG. 4A to the respective decoders or latch counters 820, 822. The Prepare for New Data Strobe of line 566 clears these counters for receipt of the new data on the incoming lines. After the decoders have been blanked by a negative logic on line 596, the new output of the latch counters or decoders 820, 822 are decoded by 7-Bar decoders 824, 826 and displayed by 7-Bar display units 830, 832. The display of the time in window 70*a* has occurred because of the momentary depression of one of the switches in networks 742, 756. This caused a logic 1 to be transmitted through line 746 and inverter 747 to the new select flip-flop circuit 740. When this flip-flop was sensed during the program and found to be set, the program was initiated to read the phase address and the function and locate in memory the proper time for transmission to lines DO-00 through DO-07.

If the displayed time is to be changed, switches 70*c–d* are depressed. This advances the output of decoders 820, 822 and also advances the digit displayed in display units 830, 832. If switch 70*e* is now depressed, no action takes place because enabling switch 76 is not closed. Assume now that the new time set in display units 830, 832 is to be inserted into the memory 12, switch 76 is closed by a key and switch 70*e* is also closed. This places the logic 0 on line 750*a* shown in FIGS. 3E and 19B. Consequently, the enter time flip-flop circuit 400 is set so that upon receipt of address ADD 24 and a SENS command, the sense flip-flop 410 indicates to the computer that a new time is to be entered. When this happens, address ADD 19, as disclosed in column 212 of FIG. 5, allows lines 8201*–d* and 822*a–d* to be inputted through NAND gates 744*a–h*. This places the new time in the memory location previously interrogated. Thereafter, a blanking pulse is created by addresses ADD 20, ADD 21, as shown in FIG. 15 to blank the decoders 820, 822 and, thus, their display units. After this blanking, new information in memory is directed through lines DO-00 through DO-07 to the decoders or latch counters 820, 822 for display in units 830, 832. Consequently, the new condition of memory is now displayed in the panel 70. This same general procedure as schematically illustrated in FIG. 21 is continued to review and/or change the time setting of the various functions in the various phases of the controller B.

In FIG. 4C, it is noted that the passage time input line 754*b* is applied only to the decimal point creating NAND gate 760*j*. It is not applied to any of the decoding NAND gates 760*a–h*. This is for simplification of the circuit. If all NAND gates 760*a–h* had a high output this indicates that passage time is the closed switch. Of course, it would be possible to decode the closing of the passage time switch through the decoding NAND gates 760*a–h* if desired.

EXAMPLE OF TIME-FEATURE DISPLAY PANEL OPERATION

The general operation of all the circuits for the time-feature display and control panel has been explained in the above discussion; however, reference is made to FIG. 5 which indicates certain of the basic addressing steps for performing the functions of this panel and the other functions of the circuitry involved in controller B. For the purpose of example, the general operation of the control panel will be set forth in a series of simplified program steps that can be used with the features in basically FIGS. 3A–E and 4A–C. Since the programs are self explanatory and include a discussion of the results of each step, they are set forth below and require no detailed discussion.

The first basic simplified program is the panel up date program which reads as follows:

PANEL UPDATE

| STEP | PROGRAM COMMAND | RESULT |
|---|---|---|
| A | SENS, ADD 22 | Check to determine set of new select flip-flop 440. |
| B | STORE SENS | If set store information on new select flip-flop. |
| C | SENS, ADD 24 | Check enter time flip-flop 400. |
| D | STORE SENS | If flip-flop 400 is set, store information. |
| E | SENS, ADD 25 | Check enter feature flip-flop 420. |
| F | STORE SENS | If flip-flop 420 is set, store information. |
| G | IF NO ENTER FEATURE SKIP NEXT STEP | If the enter feature flip-flop is not set skip next step. |
| H | JUMP TO ENTER FEATURE SUBROUTINE | If previous step did not cause skip, program jumps to enter feature subroutine and, when completed, it does not come back to this program. |
| I | IF NO ENTER TIME SKIP NEXT STEP | If the enter time flip-flop is not set, skip next step. |
| J | JUMP TO ENTER TIME SUBROUTINE | If previous step did not cause skip, program jumps to enter time subroutine. When completed, it does not come back to this program. |
| K | IF NO NEW SELECT SKIP NEXT STEP | If the new select flip-flop is not set, skip the next step. |
| L | JUMP TO DISPLAY ROUTINE | If previous step did not cause skip, program jumps to display update subroutine to display time for function of this feature. |
| M–O | EXC, 22<br>EXC, 24 | Reset new select, enter time and enter |

PANEL UPDATE-Continued

| STEP | PROGRAM COMMAND | RESULT |
|---|---|---|
| | EXC, 25 | feature flip-flops. |
| P | REPEAT FOR ALL PHASES | This program recycles for each phase of controller. |

In FIG. 2E there is illustrated the basic executive program for the controller B. At step 326 which indicates page 3 of the memory and position hexadecimal 26, there is a command to jump to an update display subroutine and return to the executive routine after the update display routine has been completed. This is indicated as the JMC command which requires a jump to a subroutine and a mark in the current page for return and completing of the executive recycling program. The above update program is the one to which executive program jumps and completes. Basically, steps A–P are repeated for each of the active phases in the controller B. After all phases have been completed, the update program returns to the executive program shown in FIG. 2E. Steps A–F sense the new select, enter time, and enter feature flip-flips. If the enter time flip-flops and enter feature flip-flops are not set, and a new select flip-flop is set, this indicates that buttons have been pushed on the front panel to display a time for a certain function of a selected phase for which the update program is then being cycled. When that happens, step L occurs which is a jump to the display routine. This routine is an auxiliary program which displays the memory time setting for the particular phase and the function selected by the switches on panel 22. If none of the flip-flops are set, the update program resets all flip-flops in steps M–O. These are precautionary steps. Thereafter, the program repeats for the next phase. After all phases have been reviewed by cycling the update for each phase, the update program is terminated and an executive program is continued.

Assume that it is desirable to display the maximum initial for phase 4. Switches 74*a* and 79*c* of panel 22 are depressed. When the update program is called up and cycles to phase 4, the closing of either switch 74*a* or 78*c* sets the new select flip-flop 440. Consequently, on step A of the update program, the setting of the new select flip-flop is sensed and then stored in step B. Since there has been no enter time or enter feature actuation on the front panel, the other two flip-flops are not set. Consequently, steps G and I come into play and the enter feature and enter time routines are bypassed. When step K is reached, there is no skip command and step L comes into play. This causes the update program to progress into the display routine program which is illustrated in simplified form in the following program.

DISPLAYING PHASE 4 MAX INITIAL

| STEP | MANUAL | PROGRAM COMMAND | RESULT |
|---|---|---|---|
| A | Close Switch 74a | | Sets New Select Flip-Flop 440 |
| B | | SENS ADD 22 | Indicates New Select Set |
| C | Close Switch 78c | | Again sets New Select Flip-Flop |
| D | | SENS ADD 22 | Indicates New Select Set |
| E | | If New Select set, and Enter time not set, calculate address of time and function switches by DI, ADD 18 | Reads and stores words in NAND gates 760a-h |
| F | | EXC, ADD 18 | No effect because line 762i is high Thus no hundreds displayed |
| G | | EXC, ADD 19 | No effect because line 762i is high |
| H | | DO, ADD 15 | Clear feature lamps 77d, 78a, 80c, 82c, by NAND gate 602 and inverter 604. See Figure 15. |
| I | | DO, ADD 19 | First produces Prepare for New Data Strobe in line 566. This clears decoders 820, 822. When IOST appears, produces New Data Strobe in line 562. This latches NAND gates 810, 812 and clocks decimal flip-flops 890, 894. No effect because not in 0.1 second |
| J | | EXC, ADD 20 (BLANK) | Produces low logic on line 582 to set blank flip-flop and give low logic on line 596. This blanks panel units 820, 822, 824 and 826. Time data appears in lines DO-00 through DO-07. |
| K | | EXC, ADD 21 | Blank flip-flop is set and decoders cause display of time set in memory position 263, Page 2 position 99. (Maximum Initial for Phase 4 |

–Continued

| DISPLAYING PHASE 4 MAX INITIAL | | | |
|---|---|---|---|
| STEP | MANUAL | PROGRAM COMMAND | RESULT |
| L | | DO, ADD 19 | New Data Strobe places data on lines DO-00 through DO-07 |
| M | | DO, ADD 15 | Lights feature lights corresponding to activated features |
| N–P | | EXC, ADD 22<br>EXC, ADD 24<br>EXC, ADD 25 | Reset new Select Flip-Flop 440 and enter time and enter feature flip-flops |

The computer then progresses through the several steps in the display routine. This blanks the display panel and enters into the display panel the memory information for maximum initial of phase 4 and then removes the blanking by execution of address 21 in step K. After the time for the phase 4 maximum initial has been displayed, the new select flip-flop is executed by step N and the program then returns to the panel update to continue circulation through all of the remaining phases being monitored. After all phases have been checked, the program is returned to the executive program for completion.

Since the program is cycled every 0.1 second, the display caused by the selection of a function and a phase appears to be continuous. In this manner, all functions displayed in subpanel 70 and in the lower phase modules appear to be continuous displays although they are essentially displayed 10 times a second. This gives an appearance of several functions taking place at the same time because of the speed of the digital computer.

Assume not that the time for the maximum initial phase 4 is to be changed. The setting of the new select flip-flop by closing either switch 74*a* or switch 78*c*, causes the display of the maximum initial time for phase 4 as previously discussed. Then, switches 70*c* or 70*d* are depressed to advance the digits above these switches. When the proper new setting has been obtained, the enabling switch 76 is closed. Then the enter time switch 70*e* is closed. This gives a negative logic in line 750 of FIG. 3E to set the enter time flip-flop 400. Consequently, in the panel update program there will be a sensing of the new select flip-flop. This has been cancelled by the previous cycling through step L of the display program. Consequently, step A of the update program will not sense a setting of the new select flip-flop. At step C of the update program, there is a sense address 24 command which does sense the setting of the enter time flip-flop 400. Consequently, there is no skip command at step I and the update program progresses to the command at step J. This is a jump to enter time subroutine which then progresses to the enter time routine to enter the time now displayed in window 70*a* into the memory location for the maximum initial time of phase 4. The enter time routine is relatively simple, and it is set forth as two essential steps in the following simplified representation.

ENTER TIME SUBROUTINE

| STEP | PROGRAM COMMAND | RESULT |
|---|---|---|
| A | DI ADD 19 | Lines 820a–d and 822a–d added to memory at address of NAND gates 760a–h destroys prior time information |
| B | SENS ADD 19 | This reads Q terminal of hundreds flip-flop 840 and enters in memory as 0 or 1. |

It is noted that the information on lines 820*a–d* and lines 822*a–d* is entered into memory at the phase and function address from NAND gates 760*a–h*. At the same time, the Q terminal of flip-flop 840 is read to enter either a 0 or 1 into memory. Since this flip-flop is used only for MAX 1, MAX 2, it is not sensed by NAND gate 470 shown in FIG. 3E during this particular example. After the enter time subroutine has been completed, the program is terminated and the update program is continued in the next phase until all phases have been processed. After all phases have been scanned by the update program, the program command is returned to the executive program of FIG. 2E.

Although a variety of times can be initially set into the memory 12, the following is a list of the memory locations for certain functions and the initial computer setting for these memory locations.

PHASE 4 TIME SETTINGS

| (HEXADECIMAL) MEMORY LOCATION | FUNCTIONS | HEX/DEC. | (.1) | TIME |
|---|---|---|---|---|
| 203 | PASSAGE TIME | 18 | Yes | 2.4 |
| 20F | MAX 1 | 28 | No | 40 |
| 21B | MAX 2 | 28 | No | 40 |
| 227 | MIN. INITIAL | 08 | No | 8 |
| 233 | YELLOW | 28 | Yes | 4.0 |
| 23F | RED | 0A | Yes | 1.0 |
| 24B | SEC/ACT | 03 | No | 3.0 |
| 257 | NUMBER BEFORE | 03 | NO | 3.0 |
| 263 | MAX INITIAL | 12 | No | 18 |
| 26F | SEC/SEC | 02 | (.01) | .02 |
| 27B | MIN GAP | 14 | Yes | 2.0 |
| 287 | DEMAND YELLOW | 28 | Yes | 4.0 |

–Continued

PHASE 4 TIME SETTINGS

| (HEXADECIMAL) MEMORY LOCATION | FUNCTIONS | HEX/DEC. | (.1) | TIME |
|---|---|---|---|---|
| 293 | DEMAND RED | 0A | Yes | 1.0 |
| 29F | DELAY WALK | 05 | No | 5 |
| 2AB | WALK | 05 | No | 5 |
| 2B7 | RED CLEAR | 0A | No | 10 |

It is noted that the time is entered in hexadecimal form and is translated into seconds in the last column. In next to the last column, the condition of NAND gate 760*j* is indicated. If this NAND gate is used for the feature, the feature is in 0.1 second. If not, the feature is in seconds. This is true for all times except those underlined. At memory position 257 (hexadecimal) the number before actuation is in vehicles, instead of seconds. Also, at memory position 26F (hexadecimal) the ratio of seconds/seconds is located. This does not use flip-flop 760*j* because it is in hundreds instead of tens. This is also indicated on the above listing.

CONCLUSION

It is appreciated that the circuitry described above is to be used with a digital computer to produce basically the various functions described with respect to each of the separate circuits involved. The programming for accomplishing the several timing or controlling functions can be varied according to those times and functions which are to be inputted and outputted to the controller B. Various changes and modifications may be made in the various circuitry without departing from the intended spirit and scope of the present invention as defined in the appended claims.

Having thus defined our invention, we claim:

1. In a controller for controlling traffic signals displayed to at least two conflicting movements of traffic through an intersection, said controller including a memory unit to store at separate addresses, separate binary codes each representing a numerical value for use in a selected function of said controller, the improvement comprising: a switching network for manually selecting, from one of said addresses, one of said codes for a selected function; means for decoding said selected code to produce display numerals corresponding to the numerical value at said one address; a visual display means for displaying said display numerals; means for manually changing said display numerals displayed by said visual display means to a new value; means for providing a new code corresponding to said new value; and, means for then storing said new code in said memory unit at said one address.

2. T_ improvement as defined in claim 1 wherein said switching network includes a plurality of switches with the closure of a selected one or more of said switches corresponding to a selected function; means for allowing actuation of said switches corresponding to a single function at any given time; a encoding circuit for encoding said network to provide an output representative of the function selected by actuation of a switch or switches in said network; and means responsive to said output for addressing said memory unit to said one address.

3. The improvement as defined in claim 1 wherein said manual changing means includes a binary counter means having an input means for receiving said selected code from said memory unit and representative of the numerical value stored in said memory unit for said selected value and an output means connected to said decoding means for directing said selected code as output binary coded information to said decoding means, manually actuated counting means for changing successively by a single digit said output binary coded information to produce said new code and said memory storing means including means for selectively substituting said new code into said memory unit at said one address.

4. In a controller for controlling traffic signals displayed to at least two conflicting movements of traffic through an intersection, said controller including a memory unit for storing separate binary coded representations of numerical values for use in a selected function of said controller at separate coded addresses in said memory unit, the improvement comprising: a switch circuit for creating an address corresponding to one of said selected functions, circuit means for directing a coded signal corresponding to said address to said memory unit to create said binary representation of said one selected function in a series of parallel output lines; a decoder means for decoding said output lines and having an output means for creating a 7-Bar decoded representation of said binary representation in said parallel lines; and a 7-Bar display device for receiving said 7-Bar decoded representation and displaying digits corresponding with said decoded representation.

5. The improvement as defined in claim 4 including means for receiving said binary representation of said one selected function and means for manually converting said binary representation of said one selected function into a new binary representation and means for storing said new representation at said address of said memory unit.

6. In a controller for controlling traffic signals displayed to at least two conflicting movements of traffic through an intersection, said controller including a memory unit for storing binary coded representations of a numerical value for use in a selected function of said controller at separate coded addresses in said memory unit, the improvement comprising: a switch circuit for creating an address corresponding to one of said selected functions; circuit means for directing a coded signal corresponding to said address to said memory unit to create said binary representation of said one selected function in a series of parallel output lines; a counter means having an input connected to said parallel lines, a second series of parallel output lines, means for setting said counter means to a binary code in said second series of output lines corresponding to said binary representation in said first mentioned lines, means for manually changing the binary code in said second output lines; a decoder means for decoding said binary code in said second output lines and having an output means for creating a decoded representation of said binary code in said second output means; a display device for displaying a digit corresponding to said decoded representation; and, means for storing said binary code in said second output lines in said memory unit at said address of said selected function.

7. In a controller for controlling traffic signals displayed to at least two conflicting movements of traffic through an intersection, said controller including a memory unit for storing binary coded representations of a numerical value for use in a selected function of said controller at separate coded addresses in said memory unit, the improvement comprising: a switch circuit for creating an address corresponding to one of said selected functions; circuit means for directing a coded signal corresponding to said address to said memory unit to create said binary representation of said one selected function in a series of parallel output lines; updating means connected to said output lines for selectively changing at a pulsed rate said binary representation to a new binary code; and means for storing said new binary code in said memory unit at said address of said selected function.

8. The improvement as defined in claim 7 wherein said updating means includes a binary counter having an output, a setting means connected to said output lines for setting said output to said binary representation of said one selected function, and means for successively clocking said counter to create said new binary code in said output.

9. In a controller for timing a selected duration of a particular function for a traffic signal displayed to one of at least two conflicting movements of traffic through an intersection, said duration comprising a known number of increments, said controller including a digital computer controlled by a preestablished program having a series of sequential steps comprising a program cycle, the improvement comprising: a timing system including a flip-flop having a first selected output upon being clocked and a second output; means for clocking said flip-flop periodically at a given rate having a known period corresponding to said increments; means for preventing progress of said program through said cycle when said flip-flop has said second output; means for allowing said program to progress through said cycle when said flip-flop has said first selected output; means for creating said second output when said program is allowed to progress; and means responsive to a number of said program cycles corresponding to said known number for timing said selected duration.

10. In a controller for controlling a traffic signal displayed to one of at least two conflicting movements of traffic through an intersection, said controller including a digital computer controlled by a preestablished program having a series of sequential steps comprising a program cycle, the improvement comprising: a circuit external of said computer for controlling the time of the program cycle to a preselected, known time; said circuit including means for creating a control signal at a known rate corresponding to said known time; means for sensing the existence of said control signal; a program initiated sensing means for controlling said cycle time in response to the sensed existence of said control signal; and, said external circuit comprising a flip-flop having an output; means for clocking said flip-flop to produce said control signal at said output; means for actuating said clocking means at said known rate; and, means responsive to said output of said flip-flop for clearing said flip-flop whereby said control signal is removed from said output.

11. In a controller for controlling traffic signals displayed to at least two conflicting movements of traffic through an intersection, said controller including a digital computer with a memory unit, a lead connected to said computer, means for inputing traffic information into said computer on said lead and means for outputing signalization information from said computer on said lead, the improvement comprising: said outputing means including an output line means connected to said lead for outputing a single bit of binary information from said computer; and said inputing means including a first logic gate having a first input line means for inputing a single bit of input information to said logic gate; a second input line means for enabling said logic gate; and an output lead means for outputing a bit of binary information corresponding to said input information on said first input line means when said logic gate is enabled by said second input line means; and, a switch means connected to said output line means for controlling the logic state of said lead in accordance with the condition of said switch means, said switch means having a condition controlling means connected to said output lead of said logic gate and means for controlling the condition of said switch means in response to the single bit of binary inforamtion on said output lead means of said logic gate.

12. The improvement as defined in claim 11 including a second logic gate having first and second input leads and an output lead, means for connecting said output lead of said second logic gate with the first input line means of said first logic gate, means for enabling said first input lead of said second logic gate, and means for applying a logic signal corresponding to said traffic information to said second input lead of said second logic gate.

13. The improvement as defined in claim 12 wherein said means for applying a logic signal to said second input lead includes an interface circuit comprising an input portion for receiving a logic state corresponding to said traffic information, an output portion connected to said second input lead of said second logic gate, and means for interconnecting said input portion and said output portions, said interconnecting means including a radiation source, means for actuating said source in response to traffic information applied to said first portion and a radiation responsive means exposed to said radiation source for actuating said output portion in response to actuation of said radiation source.

14. The improvement as defined in claim 13 wherein said interconnecting means includes a voltage breakdown circuit having an input connected to said first portion, a grounded output and a voltage breakdown device in series with said input and said output of said breakdown circuit.

15. The improvement as defined in claim 11 including an interface circuit comprising an input portion for receiving said single bit of input information, an output portion connected to said first input of said first logic gate, and means for interconnecting said input and said output portions, said interconnecting means including a radiation source, means for actuating said source in response to traffic information applied to said first portion and a radiation responsive means exposed to said radiation source for actuating said output portion in response to actuation of said radiation source.

16. The improvement as defined in claim 15 wherein said interconnecting means includes a voltage breakdown circuit having an input connected to said first portion, a grounded output and a voltage breakdown device in series with said input and said output of said breakdown circuit.

17. The improvement as defined in claim 11 including a first D-type flip-flop having its D terminal connected to said output line means, a Q terminal and a clocking terminal; a second D-type flip-flop having its D terminal connected to the Q terminal of said first D-type flip-flop, a Q terminal connected to an output circuit having an output means for controlling one of said signals, and a clocking terminal; means for applying a first clocking pulse to said clocking terminal of said first flip-flop; means for applying a second clocking pulse to said clocking terminal of said second flip-flop; and means for creating said first clocking pulse prior to said second clocking pulse.

18. The improvement as defined in claim 17 including means for creating said first clocking pulse with a first pulse rate and means for creating said second clocking pulse with a second pulse rate substantially more than said first pulse rate.

19. In a controller for controlling traffic signals displayed to at least two conflicting movements of traffic throough an intersection, said controller including a digital computer with a memory unit to store separate binary logic for information corresponding to selected operations of the controller, the improvement comprising: an input-output circuit including an indicator light means for indication of a particular one of said selected conditions; means for actuating said indicator light means upon receipt of a first coded signal from said memory unit and corresponding to said one selected operation; first control means for activating said actuating means; a switch means for creating a second coded signal corresponding to a second of said selected operations; means for directing said second coded signal to said memory unit; second control means for activating said directing means; and, means for alternately actuating said first and second control means.

20. The improvement as defined in claim 19 wherein said first control means is a D-type flip-flop having its D terminal connected to a lead means connected to said memory unit, a Q terminal forming said indicator light actuating means and a clocking terminal, and said first control means including means for applying a clocking pulse to said clocking terminal whereby the coded signal from said memory unit and at said D terminal is transmitted to said Q terminal.

21. The improvement as defined in claim 20 wherein said directing means includes a logic gate having first and second inputs and an output, means for connecting said first input to said switch means for receiving a coded signal created by the position of said switch means; means for connecting said second input to said second control means, said second control means including means for selectively latching and unlatching said second input, and means connecting said output to said memory unit.

22. The improvement as defined in claim 21 including pulsing means for alternately creating a first pulse and a second pulse, first pulse responsive means for actuating said first control means upon existence of said first pulse and second pulse responsive means for actuating said second control means upon existence of said second pulse.

23. The improvement as defined in claim 22 wherein said pulsing means includes means for creating said first and second pulses at least one each approximately 0.1 seconds.

24. The improvement as defined in claim 19 wherein said directing means includes a logic gate having first and second inputs and an output, means for connecting said first input to said switch means for receiving a coded signal created by the position of said switch means; means for connecting said second input to said second control means, said second control means including means for selectively latching and unlatching said second input, and means connecting said output to said memory unit.

25. The improvement as defined in claim 24 including pulsing means for alternately creating a first pulse and a second pulse, first pulse responsive means for actuating said first control means upon existence of said first pulse and second pulse responsive means for actuating said second control means upon existence of said second pulse.

26. The improvement as defined in claim 25 wherein said pulsing means includes means for creating said first and second pulses at least one each approximately 0.1 seconds.

27. In a controller for controlling traffic signals displayed to at least two conflicting movements of traffic through an intersection, said controller including a digital computer with a memory unit to store separate binary logic for information corresponding to selected operations of the controller, the improvement comprising: an output circuit including an indicator light means for indication of a particulalr one of said selected operations; means for actuating said indicator light means upon receipt of a coded signal from said memory unit and corresponding to said one selected operation; and control means for activating said actuating means, said control means being a D-type flip-flop having its D terminal connected to a lead means communicated with said memory unit, a Q terminal forming said indicator light actuating means and a clocking terminal, and said control means including means for applying a clocking pulse to said clocking terminal whereby the coded signal from said memory unit and at said D terminal is transmitted to said Q terminal.

28. In a controller for controlling traffic signals displayed to at least two conflicting movements of traffic through an intersection, said controller including a digital computer with a memory unit to store separate binary logic for information corresponding to selected operations of the controller, the improvement comprising: an input circuit including a switch means for creating a logic corresponding to one of said selected operations; means for directing said logic to said memory; and control means for activating said directing means, said directing means including a logic gate having first and second inputs and an output; means for connecting said first input to said switch means for receiving a coded signal created by the position of said switch means; means for connecting said second input to said control means; said control means including means for selectively disabling and enabling said second input, and means connecting said output to said memory unit.

29. In a controller for controlling traffic signals displayed to at least two conflicting movements of traffic through an intersection, said controller including a memory unit to store at separate addresses, separate binary codes each representing a numerical value for use in a selected function of said controller, the improvment comprising: a switching network for manually selecting from one of said addresses one of said codes for a selected separate numerical value; means for decoding said selected code to produce display numerals; a visual display means for displaying said display numerals; means for manually changing said display numerals displayed by said visual display means to a new value; means for providing a new code corresponding to said new value; and, means for then storing said new code in said memory unit at said one address.

30. In a controller for controlling traffic signals displayed to at least two conflicting movements of traffic through an intersection, said controller including a memory unit for storing binary coded representations of separate numerical values for use in a selected function of said controller at separate coded addresses in said memory unit, the improvement comprising: a switching circuit for creating a memory address corresponding to one of said functions; means for displaying a numerical value; means for creating a binary code corresponding to said displayed numerical value of said displaying means; means for changing said displayed value to a selected second displayed value; and, manually actuated switch means for storing said binary code at said created memory address.

31. The improvement as defined in claim 30 including an element movable between first and a second position, and means responsive to said element being in said first position for inhibiting said storing means.

32. The improvement as defined in claim 30 including a key operated element movable by a key between a first and a second position, and means responsive to said element being in said first position for inhibiting said storing means.

33. In a controller for controlling traffic signals displayed to at least two conflicting movements of traffic through an intersection, said controller including a memory unit for storing binary coded representations of a numerical value for use in a selected function of said controller at separate coded addresses in said memory unit, the improvement comprising: a switch circuit for creating an address corresponding to one of said selected functions; circuit means for directing a coded signal corresponding to said address to said memory unit to create said binary representation of said one selected function in a series of parallel output lines; a logic storing means having an input connected to said parallel lines, a second series of parallel output lines, means for setting said storing means to a binary code in said second series of output lines corresponding to said binary representation in said first mentioned lines, means for manually changing the binary code in said second output lines; a decoder means for decoding said binary code in said second output lines and having an output means for creating a decoded representation of said binary code in said second output means; a display device for displaying a digit corresponding to said decoded representation.

34. The improvement as defined in claim 33 including means for storing said binary code in said second output lines in said memory unit at said address of said one selected function.

35. In a controller for timing a selected duration of a particular function for a traffic signal displayed to one of at least two conflicting movements of traffic through an intersection, said duration comprising a known number of increments, said controller including a digital means controlled by a preestablished program having a series of sequential steps comprising a program cycle, the improvement comprising: a timing system including a flip-flop having a first selected output upon being clocked and a second output; means for clocking said flip-flop periodically at a given rate having a known period corresponding to said increments; means for preventing progress of said program through said cycle when said flip-flop has said second output; means for allowing said program to progress through said cycle when said flip-flop has said first selected output; means for creating said second output when said program is allowed to progress; and means responsive to a number of said program cycles corresponding to said known number for timing said selected duration.

36. In a controller for controlling a traffic signal displayed to one of at least two conflicting movements of traffic through an intersection, said controller including a digital means controlled by a preestablished program having a series of sequential steps comprising a program cycle, the improvement comprising: a circuit external of said digital means for controlling the time of the program cycle to a preselected, known time; said circuit including means for creating a control signal at a known rate corresponding to said known time; means for sensing the existence of said control signal; a program initiated sensing means for controlling said cycle time in response to the sensed existence of said control signal; and, said external circuit comprising a flip-flop having an output; means for clocking said flip-flop to produce said control signal at said output; means for actuating said clocking means at said known rate; and, means responsive to said output of said flip-flop for clearing said flip-flop whereby said control signal is removed from said output.

37. In a controller for controlling traffic signals displayed to at least two conflicting movements of traffic through an intersection, said controller including a digital means with a memory unit, a lead connected to said digital means, means for inputing traffic information into said digital means on said lead and means for outputing signalization information from said digital means on said lead, the improvement comprising: said outputing means including an output line means connected to said lead for outputing a single bit of binary information from said digital means; and said inputing means including a first logic gate having a first input line means for inputing a single bit of input information to said logic gate; a second input line means for enabling said logic gate; and an output lead means for outputing a bit of binary information corresponding to said input formation on said first input line means when said logic gate is enabled by said second input line means; and, a switch means connected to said output line means for controlling the logic state of said lead in accordance with the condition of said switch means, said switch means having a condition controlling means connected to said output lead of said logic gate and means for controlling the condition of said switch means in response to the single bit of binary information on said output lead means of said logic gate.

38. The improvement as defined in claim 37 including a second logic gate having first and second input leads and an output lead, means for connecting said output lead of said second logic gate with the first input line means of said first logic gate, means for enabling said first input lead of said second logic gate, and means for applying a logic signal corresponding to said traffic information to said second input lead of said second logic gate.

39. The improvement as defined in claim 37 including a first D-type flip-flop having its D terminal connected to said output line means, a Q terminal and a clocking terminal; a second D-type flip-flop having its D terminal connected to the Q terminal of said first D-type flip-flop, a Q terminal connected to an output circuit having an output means for controlling one of said signals, and a clocking terminal; means for applying a first clocking pulse to said clocking terminal of said first flip-flop; means for applying a second clocking pulse to said clocking terminal of said second flip-flop; and means for creating said first clocking pulse prior to said second clocking pulse.

40. The improvement as defined in claim 39 including means for creating said first clocking pulse with a first pulse rate and means for creating said second clocking pulse with a second pulse rate substantially more than said first pulse rate.

41. In a controller for controlling traffic signals displayed to at least two conflicting movements of traffic through an intersection, said controller including a digital means with a memory unit to store separate binary logic for information corresponding to selected operations of the controller, the improvement comprising: an output circuit including an indicator light means for indication of a particular one of said selected operations; means for actuating said indicator light means upon receipt of a coded signal from said memory unit and corresponding to said one selected operation; and control means for activating said actuating means, said control means being a D-type flip-flop having its D terminal connected to a lead means communicated with said memory unit, a Q terminal forming said indicator light actuating means and a clocking terminal, and said control means including means for applying a clocking pulse to said clocking terminal whereby the coded signal from said memory unit and at said D terminal is transmitted to said Q terminal.

42. In a controller for controlling traffic signals displayed to at least two conflicting movements of traffic through an intersection, said controller including a digital means with a memory unit to store separate binary logic for information corresponding to selected operations of the controller, the improvement comprising: an input circuit including a switch means for creating a logic corresponding to one of said selected operations; means for directing said logic to said memory; and control means for activating said directing means, said directing means including a logic gate having first and second inputs and an output; means for connecting said first input to said switch means for receiving a coded signal created by the position of said switch means; means for connecting said second input to said control means; said control means including means for selectively disabling and enabling said second input, and means connecting said output to said memory unit.

43. A traffic signal controller for controlling a traffic signal for allocating right of way to a traffic movement passing through a controlled area wherein said right of way includes timed intervals for timing said right of way to a traffic movement, said traffic signal controller including: a memory unit having separate coded addresses to designate separate locations in said memory unit, each of said locations corresponding to one of said timed intervals; said memory unit including means for storing separate coded representations in said memory unit locations corresponding to the time duration that a selected one of said timed intervals is to be operative in said controller; manually actuatable switch means for selecting the memory unit coded address corresponding to a particular one of said timed intervals; means responsive to said switch means selected coded address for selecting the one of said stored separate coded representation in said memory unit at said location corresponding to said particular one of said timed intervals; means for decoding said selected separate coded representation into numerical display information represented by said selected separate coded representation; means for decoding said selected separate coded representation to produce a timing value; and means for timing said particular one of said timed intervals in response to said decoded timing value.

44. A traffic signal controller as defined in claim 43 including means for visually displaying said numerical display information representative by said selected separate coded representation as a number in a visual display device.

45. A traffic signal controller as defined in claim 44 including means for changing said number in said visual display device; means for decoding said number into a new coded representation; and means for storing said new coded representation into the memory location corresponding to said switch selected memory unit coded address.

* * * * *